United States Patent
Shibata et al.

(10) Patent No.: US 11,982,897 B2
(45) Date of Patent: May 14, 2024

(54) LIQUID CRYSTAL DISPLAY DEVICE

(71) Applicant: FUJIFILM Corporation, Tokyo (JP)

(72) Inventors: Naoya Shibata, Kanagawa (JP); Naoya Nishimura, Kanagawa (JP); Naoyoshi Yamada, Kanagawa (JP); Wataru Hoshino, Kanagawa (JP); Shinya Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 17/944,840

(22) Filed: Sep. 14, 2022

(65) Prior Publication Data

US 2023/0039106 A1 Feb. 9, 2023

Related U.S. Application Data

(63) Continuation of application No. PCT/JP2021/010135, filed on Mar. 12, 2021.

(30) Foreign Application Priority Data

Mar. 19, 2020 (JP) ................... 2020-049929
Dec. 21, 2020 (JP) ................... 2020-211164
Mar. 3, 2021 (JP) ................... 2021-033114

(51) Int. Cl.
*G02F 1/1335* (2006.01)
*G02F 1/13363* (2006.01)

(52) U.S. Cl.
CPC .. *G02F 1/133531* (2021.01); *G02F 1/133633* (2021.01); *G02F 2201/08* (2013.01); *G02F 2202/043* (2013.01)

(58) Field of Classification Search
CPC ................. G02F 1/133528–13355
See application file for complete search history.

(56) References Cited

U.S. PATENT DOCUMENTS

2009/0153783 A1 6/2009 Umemoto
2009/0322993 A1* 12/2009 Saitoh .................. G02B 5/22
349/194

(Continued)

FOREIGN PATENT DOCUMENTS

JP 2010033040 A * 2/2010 ............... G02B 5/22
JP 4902516 B2 3/2012

(Continued)

OTHER PUBLICATIONS

International Search Report issued in PCT/JP2021/010135 on May 25, 2021.

(Continued)

*Primary Examiner* — Mariceli Santiago
(74) *Attorney, Agent, or Firm* — Edwards Neils LLC; Jean C. Edwards, Esq.

(57) ABSTRACT

A liquid crystal display device includes a first polarizer, a liquid crystal cell, and a second polarizer in this order from a viewing side, in which a first light absorption anisotropic layer is disposed on the viewing side of the liquid crystal cell, a second light absorption anisotropic layer is disposed on a non-viewing side of the liquid crystal cell, the first and second polarizers each have an absorption axis in a film surface, the absorption axis of the first polarizer is orthogonal to the absorption axis of the second polarizer, an angle θ1 between a transmittance central axis of the first anisotropic layer and a normal line of the film is in a range of 0° to 45°, and an angle θ2 between a transmittance central axis of the second anisotropic layer and a normal line of the film is in a range of 0° to 45°.

20 Claims, 1 Drawing Sheet

(56) References Cited

U.S. PATENT DOCUMENTS

| | | |
|---|---|---|
| 2012/0081622 A1 | 4/2012 | Horikoshi et al. |
| 2019/0071571 A1 | 3/2019 | Takada et al. |
| 2020/0124921 A1 | 4/2020 | Hai |

FOREIGN PATENT DOCUMENTS

| | | | | |
|---|---|---|---|---|
| JP | 2012-078436 A | 4/2012 | | |
| JP | 2017-037150 A | 2/2017 | | |
| WO | 2017/195833 A1 | 11/2017 | | |
| WO | WO-2017195833 A1 * | 11/2017 | ............. | B32B 27/08 |
| WO | 2019/114099 A1 | 6/2019 | | |
| WO | WO-2020036119 A1 * | 2/2020 | ............. | B32B 27/36 |
| WO | WO-2020129729 A1 * | 6/2020 | ......... | C09K 19/2007 |

OTHER PUBLICATIONS

Written Opinion issued in PCT/JP2021/010135 on May 25, 2021.
International Preliminary Report on Patentability completed by WIPO on Sep. 20, 2022 in connection with International Patent Application No. PCT/JP2021/010135.
Office Action, which was issued by the Japanese Patent Office on Aug. 8, 2023, in connection with Japanese Patent Application No. 2022-508324.

* cited by examiner

LIQUID CRYSTAL DISPLAY DEVICE

CROSS-REFERENCE TO RELATED APPLICATIONS

This application is a Continuation of PCT International Application No. PCT/JP2021/010135 filed on Mar. 12, 2021, which was published under PCT Article 21(2) in Japanese, and which claims priority under 35 U.S.C. § 119(a) to Japanese Patent Application No. 2020-049929 filed on Mar. 19, 2020, Japanese Patent Application No. 2020-211164 filed on Dec. 21, 2020 and Japanese Patent Application No. 2021-033114 filed on Mar. 3, 2021. The above applications are hereby expressly incorporated by reference, in their entirety, into the present application.

BACKGROUND OF THE INVENTION

1. Field of the Invention

The present invention relates to a liquid crystal display device.

2. Description of the Related Art

In a case where an in-vehicle display such as a car navigation system is used, there is a problem in that light emitted upward from a display screen is reflected on a windshield or the like and interferes with driving. For the purpose of solving such a problem, for example, JP4902516B suggests a method of using a first polarizer that has an absorption axis in a plane and a second polarizer (light absorption anisotropic layer) in which an absorption axis of a dichroic substance is aligned at 0° to 45° with respect to a normal direction in combination. Here, a polarizer on a viewing side in a liquid crystal display device is used as the first polarizer.

SUMMARY OF THE INVENTION

However, the above-described viewing angle control method has a problem that the direction in which the viewing angle can be controlled is determined to a longitudinal direction or a lateral direction depending on the direction of the first polarizer having an absorption axis in the plane.

For example, in an in-vehicle application such as a car navigation system, reflection of light on the windshield can be prevented by disposing the absorption axis of the first polarizer having the absorption axis in the plane in the lateral direction so that the viewing angle in the longitudinal direction can be narrowed. In the description above, the longitudinal direction denotes the vertical direction, and the lateral direction denotes the horizontal direction orthogonal to the vertical direction.

Further, as described in JP4902516B, the center of the viewing angle is simply changed in the longitudinal direction only by inclining the absorption axis of the second polarizer in the longitudinal direction. In other words, visual recognition is unlikely to be made on any one side in the longitudinal direction and visual recognition is likely to be made on the other side.

Meanwhile, the need to further narrow the viewing angle in the lateral direction so that the center of the viewing angle is expected to be set in a specific direction (for example, the passenger seat) cannot be satisfied.

Therefore, an object of the present invention is to provide a liquid crystal display device which is capable of freely changing the center (position where visual recognition is most easily made) of the viewing angle and is capable of controlling the viewing angle in the longitudinal and lateral directions from the center of the viewing angle in a display image.

The present inventors found that the above-described problems can be solved by employing the following configurations.

(1) A liquid crystal display device comprising: a first polarizer; a liquid crystal cell; and a second polarizer in this order from a viewing side, in which a first light absorption anisotropic layer is disposed on the viewing side of the liquid crystal cell, a second light absorption anisotropic layer is disposed on a non-viewing side of the liquid crystal cell, the first polarizer and the second polarizer each have an absorption axis in a film surface, the absorption axis of the first polarizer is orthogonal to the absorption axis of the second polarizer, an angle $\theta1$ between a transmittance central axis of the first light absorption anisotropic layer and a normal line of the film is in a range of 0° to 45°, and an angle $\theta2$ between a transmittance central axis of the second light absorption anisotropic layer and a normal line of the film is in a range of 0° to 45°.

(2) The liquid crystal display device according to (1), in which at least one of the angle $\theta1$ or the angle $\theta2$ is not 0°, an angle $\varphi1$ between a plane including the transmittance central axis of the first light absorption anisotropic layer and the normal line of the film surface and the absorption axis of the first polarizer is in a range of 80° to 90°, and an angle $\varphi2$ between a plane including the transmittance central axis of the second light absorption anisotropic layer and the normal line of the film surface and the absorption axis of the second polarizer is in a range of 80° to 90°.

(3) The liquid crystal display device according to (1) or (2), in which the first light absorption anisotropic layer and the second light absorption anisotropic layer contain an organic dichroic coloring agent.

(4) The liquid crystal display device according to any one of (1) to (3), in which the first light absorption anisotropic layer and the second light absorption anisotropic layer are formed of a composition containing an organic dichroic coloring agent and a polymerizable liquid crystal compound.

(5) The liquid crystal display device according to (4), in which a content of the organic dichroic coloring agent per unit area in the first light absorption anisotropic layer and the second light absorption anisotropic layer is 0.30 g/m$^2$ or greater.

(6) The liquid crystal display device according to any one of (3) to (5), in which a degree of alignment of the first light absorption anisotropic layer and the second light absorption anisotropic layer at a wavelength of 550 nm is 0.90 or greater.

(7) The liquid crystal display device according to any one of (1) to (6), in which at least one of the first light absorption anisotropic layer or the second light absorption anisotropic layer has a region A and a region B with transmittance central axes different from each other.

(8) The liquid crystal display device according to any one of (1) to (7), in which at least one of the first light absorption anisotropic layer or the second light absorption anisotropic layer has a region C and a region D, and a transmittance at a wavelength of 550 mu in a direction inclined by 30° on a side of a film surface from a transmittance central axis of the region C in a plane including the transmittance central axis of the region C and a normal line of the film surface is different from a transmittance at a wavelength of 550 nm in a direction inclined by 30° on the side of the film surface from a transmittance central axis of the region D in a plane including the transmittance central axis of the region D and the normal line of the film surface.

According to the present invention, it is possible to provide a liquid crystal display device which is capable of freely changing the center (position where visual recognition is most easily made) of the viewing angle and is capable of controlling the viewing angle in the longitudinal and lateral directions from the center of the viewing angle in a display image.

DESCRIPTION OF THE PREFERRED EMBODIMENTS

Hereinafter, the present invention will be described in detail.

The description of constituent elements described below may be made based on typical embodiments of the present invention, but the present invention is not limited to such embodiments.

In addition, in the present specification, a numerical range shown using "to" indicates a range including numerical values described before and after "to" as a lower limit and an upper limit.

Further, in the present specification, the term parallel does not denote parallel in a strict sense, but denotes a range of parallel ±5°.

Further, in the present specification, the term orthogonal does not denote orthogonal in a strict sense, but denotes a range of orthogonal ±5°.

Further, in the present specification, the concepts of the liquid crystal composition and the liquid crystal compound also include those that no longer exhibit liquid crystallinity due to curing or the like.

Figure 1:
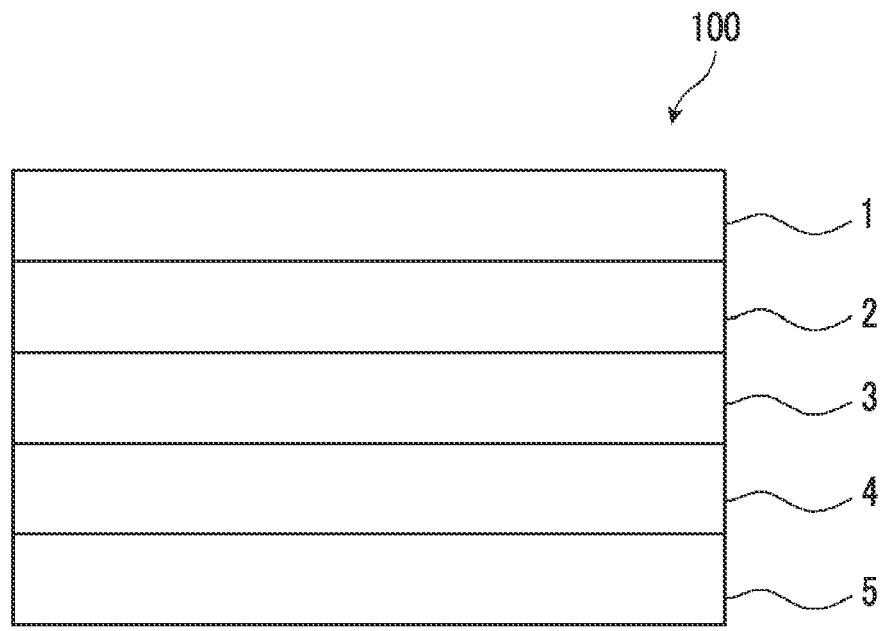
FIG. 1 is a cross-sectional view schematically illustrating an example of an embodiment of a liquid crystal display device of the present invention.

As illustrated in FIG. 1, a liquid crystal display device 100 according to the embodiment of the present invention is a liquid crystal display device including a viewing-side polarizer (first polarizer) 2, a liquid crystal cell 3, and a non-viewing-side polarizer (second polarizer) 4 in this order from a viewing side, in which a first light absorption anisotropic layer 1 is further disposed on the viewing side of the liquid crystal cell 3, and a second light absorption anisotropic layer 5 is disposed on a non-viewing side of the liquid crystal cell 3.

An absorption axis of the viewing-side polarizer is orthogonal to an absorption axis of the non-viewing-side polarizer. The term orthogonal denotes that an angle between the absorption axis of the viewing-side polarizer and the absorption axis of the non-viewing-side polarizer is in a range of 85° to 95°.

The first light absorption anisotropic layer is disposed on the viewing side with respect to the viewing-side polarizer, but the present invention is not limited to this aspect and the first light absorption anisotropic layer may be disposed on a side of the liquid crystal cell with respect to the viewing-side polarizer.

The second light absorption anisotropic layer is disposed on the non-viewing side with respect to the non-viewing-side polarizer, but the present invention is not limited to this aspect and the second light absorption anisotropic layer may be disposed on a side of the liquid crystal cell with respect to the non-viewing-side polarizer.

In the present invention, the direction of the absorption axis of the polarizer may be referred to as a longitudinal direction or a lateral direction, but typically in a state where a liquid crystal display device is used, the direction of a side of the liquid crystal display device which is close to the vertical direction is referred to as the longitudinal direction and the direction of a side of the liquid crystal display device which is close to the horizontal direction is referred to as the lateral direction.

[Substituent W]

A substituent W used in the present specification represents any of the following groups.

Examples of the substituent W include a halogen atom, an alkyl group having 1 to 20 carbon atoms, a halogenated alkyl group having 1 to 20 carbon atoms, a cycloalkyl group having 1 to 20 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an alkylamino group having 1 to 10 carbon atoms, an alkylaminocarbonyl group, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonia group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), and other known substituents.

The details of the substituent are described in paragraph [0023] of W2007-234651A.

Further, the substituent W may be a group represented by Formula (W1).

$$*\text{-LW-SPW-Q} \tag{W1}$$

In Formula (W1), LW represents a single bond or a divalent linking group, SPW represents a divalent spacer group, Q represents Q1 or Q2 in Formula (LC) described below, and * represents a bonding position.

Examples of the divalent linking group represented by LW include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=N—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)═C(Z')—C(O)O—, —O—C(O)—C(Z)═C(Z')—, —C(Z)═N—, —N═C(Z)—, —C(Z)═C(Z')—C(O)N(Z")—, —N(Z")—C(O)—C(Z)═C(Z')—, —C(Z)═C(Z')—C(O)—S—, —S—C(O)—C(Z)═C(Z')—, —C(Z)═N—N═C(Z')—(Z, Z', and Z" each independently represent a hydrogen atom, an alkyl group having 1 to 4 carbon atoms, a cycloalkyl group, an aryl group, a cyano group, or a halogen atom), —C≡C—, —N═N—, —S—, —S(O)—, —S(O)(O)—, —(O)S(O)O—, —O(O)S(O)O—, —SC(O)—, and —C(O)S—. LW may represent a group in which two or more of these groups are combined (hereinafter, also referred to as "L-C").

Examples of the divalent spacer group represented by SPW include a linear, branched, or cyclic alkylene group having 1 to 50 carbon atoms, and a heterocyclic group having 1 to 20 carbon atoms.

Here, the carbon atoms of the alkylene group and the heterocyclic group may be substituted with —O—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)═C(Z')—, —C(Z)═N—, —N═C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)═C(Z')—C(O)O—, —O—C(O)—C(Z)═C(Z')—, —C(Z)═N—, —N═C(Z)—, —C(Z)═C(Z')—C(O)N(Z")—, —N(Z")—C(O)—C(Z)═C(Z')—, —C(Z)═C(Z')—C(O)—S—, —S—C(O)—C(Z)═C(Z')—, —C(Z)═N—N═C(Z')— (here, Z, Z', and Z" each independently represent a hydrogen atom, an alkyl group having 1 to 4 carbon atoms, a cycloalkyl group, an aryl group, a cyano group, or a halogen atom), —C≡C—, —N═N—, —S—, —C(S)—, —S(O)—, —SO$_2$—, —(O)S(O)O—, —O(O)S(O)O—, —SC(O)—, —C(O)S—, or a group obtained by combining two or more of these groups (hereinafter, these groups will be collectively referred to as "SP-C").

Further, the hydrogen atom of the alkylene group and the hydrogen atom of the heterocyclic group may be substituted with a halogen atom, a cyano group, —Z$^H$, —OH—, —OZ$^H$, —COOH, —C(O)Z$^{Hʹ}$—C(O)OZ$^H$, —OC(O)Z$^H$, —OC(O)OZ$^H$, —NZ$^H$Z$^{Hʹ}$, —NZ$^H$C(O)Z$^{Hʹ}$, —NZ$^H$C(O)OZ$^{Hʹ}$, —C(O)NZ$^H$Z$^H$, —OC(O)NZ$^H$Z$^{Hʹ}$, —NZ$^H$C(O)NZ$^{Hʹʹ}$, —SH, —SZ$^H$, —C(S)Z$^H$, —C(O)SZ$^H$, and —SC(O)Z$^H$ (hereinafter, these groups will be collectively referred to as "SP-H"). Here, Z$^H$ and Z$^{Hʹ}$ each independently represent an alkyl group having 1 to 10 carbon atoms, a halogenated alkyl group, or -L-CL (L represents a single bond or a divalent linking group, and specific examples of the divalent linking group are the same as those for LW and SPW described above, CL represents a crosslinkable group, and examples thereof include a group represented by Q1 or Q2 in Formula (LC), and among these, a crosslinkable group represented by any of Formulae (P-1) to (P-30) is preferable).

<Light Absorption Anisotropic Layer>

The light absorption anisotropic layers (the first light absorption anisotropic layer and the second light absorption anisotropic layer) used in the present invention are not particularly limited except that the angle between the transmittance central axis and the normal line of the film (the normal direction with respect to the surface of the first light absorption anisotropic layer or the normal direction with respect to the surface of the second light absorption anisotropic layer) is in a range of 0° to 45°. Hereinafter, the first light absorption anisotropic layer and the second light absorption anisotropic layer will also be simply collectively referred to as "light absorption anisotropic layer".

The angle θ1 between the transmittance central axis of the first light absorption anisotropic layer and the normal line of the film (the normal direction with respect to the surface of the first light absorption anisotropic layer) is preferably greater than 0° and 45° or less, more preferably in a range of 5° to 40°, and still more preferably in a range of 10° to 40°.

The angle θ2 between the transmittance central axis of the second light absorption anisotropic layer and the normal line of the film (the normal direction with respect to the surface of the second light absorption anisotropic layer) is preferably greater than 0° and 45° or less, more preferably in a range of 5° to 40°, and still more preferably in a range of 10° to 40°.

As described above, it is preferable that the angle θ1 and the angle θ2 are not 0°. In the liquid crystal display device, it is preferable that at least one of the angle θ1 or the angle θ2 is not 0°.

The position of the center of the viewing angle can be adjusted by adjusting the angle θ1 and the angle θ2, For example, in a case where the angle θ1 and the angle θ2 are 0°, the liquid crystal display device is most easily seen as visually recognized from the front.

Here, the transmittance central axis denotes a direction in which the highest transmittance is shown in a case where the transmittance is measured by changing the inclination angle and the inclination direction with respect to the normal direction of the film (the normal direction with respect to the surface of the light absorption anisotropic layer).

An example of a method of measuring the transmittance central axis is described below.

The transmittance of P polarized light having a wavelength of 550 nm which is incident on the light absorption anisotropic layer is measured using AxoScan OPMF-1 (manufactured by Opto Science Inc.). During the measurement, while the polar angle which is an angle with respect to the normal direction of the light absorption anisotropic layer is changed for each angle from 0° to 60°, the transmittance of P polarized light having a wavelength of 550 nm in a case of incidence at an omniazimuthal angle and each polar angle is measured. As a result, the direction at which the highest transmittance is exhibited is defined as the transmittance central axis.

As described above, the center of the viewing angle of the liquid crystal display device can be deviated not only in the longitudinal and lateral directions from the front but also in an oblique direction by respectively adjusting the angle between the transmittance central axis of the first light absorption anisotropic layer and the normal line of the film and the angle between the transmittance central axis of the second light absorption anisotropic layer and the normal line of the film.

In order to control the transmittance central axis of the light absorption anisotropic layer, an aspect of aligning a dichroic substance (preferably an organic dichroic coloring agent) is preferable, and an aspect of aligning an organic dichroic coloring agent using alignment of a liquid crystal compound is more preferable.

Examples of the aspect include a light absorption anisotropic layer in which at least one kind of organic dichroic coloring agent is aligned vertically to a plane or at least one kind of organic dichroic coloring agent is aligned obliquely to a plane.

Examples of a technique of desirably aligning the organic dichroic coloring agent include a technique of preparing a polarizer formed of an organic dichroic coloring agent and a technique of preparing a guest-host liquid crystal cell. For example, the technique used in the method of preparing a dichroic polarizer described in JP1999-305036A (JP-H11-305036A) or JP2002-090526A and the technique used in the method of preparing a guest-host type liquid crystal display device described in JP2002-099388A or JP2016-027387A can also be used for preparation of the light absorption anisotropic layer used in the present invention.

For example, molecules of the organic dichroic coloring agent can be desirably aligned as described above in association with the alignment of host liquid crystals using the technique of the guest-host type liquid crystal cell. Specifically, the light absorption anisotropic layer used in the present invention can be prepared by mixing an organic dichroic coloring agent serving as a guest and a rod-like liquid crystal compound serving as a host liquid crystal, aligning the host liquid crystal, aligning molecules of the organic dichroic coloring agent along the alignment of the liquid crystal molecules, and fixing the alignment state.

It is preferable that the alignment of the organic dichroic coloring agent is fixed by forming a chemical bond in order to prevent fluctuation of the light absorption characteristics of the light absorption anisotropic layer used in the present invention depending on the use environment. For example, the alignment can be fixed by advancing polymerization of the host liquid crystal, the organic dichroic coloring agent, or a polymerizable component added as desired.

Further, the guest-host type liquid crystal cell having a liquid crystal layer that contains at least an organic dichroic coloring agent and a host liquid crystal on a pair of substrates may be used as the light absorption anisotropic layer used in the present invention. The alignment of the host liquid crystal (the alignment of the organic dichroic coloring agent in association of the alignment of the host liquid crystal) is made such that the alignment state thereof is maintained as long as the alignment can be controlled by the alignment layer formed on the inner surface of the substrate and an external stimulus such as an electric field is not applied, and the light absorption characteristics of the light absorption anisotropic layer used in the present invention can be set to be constant.

Further, a polymer film that satisfies the light absorption characteristics required for the light absorption anisotropic layer used in the present invention can be prepared by allowing the organic dichroic coloring agent to permeate into the polymer film and aligning the organic dichroic coloring agent along the alignment of the polymer molecules in the polymer film.

Specifically, a light absorption anisotropic layer can be prepared by coating the surface of the polymer film with a solution of the organic dichroic coloring agent and allowing the organic dichroic coloring agent to permeate into the film. The alignment of the organic dichroic coloring agent can be adjusted by, the alignment of a polymer chain in the polymer film, the properties thereof (chemical and physical properties of the polymer chain, a Functional group of the polymer chain, and the like), the coating method, and the like. The details of this method are described in JP2002-090526A.

In the light absorption anisotropic layer used in the present invention, the transmittance of P polarized light having a wavelength of 550 nm in a direction inclined by 30° on the side of the film surface from the transmittance central axis in the plane including the transmittance central axis and the normal line of the film surface (the surface of the optically anisotropic layer) is preferably 40% or less, more preferably 30% or less, and still more preferably 20% or less. The lower limit thereof is not particularly limited, but is 5% or greater in many cases, In this manner, the contrast of the illuminance between the direction of the transmittance central axis and the direction deviated from the transmittance central axis can be increased, and thus the viewing angle can be sufficiently narrowed.

In the light absorption anisotropic layer used in the present invention, the transmittance at a wavelength of 550 am in the direction of the transmittance central axis is preferably 65% or greater, more preferably 75% or greater, and still more preferably 85% or greater. The lower limit thereof is not particularly limited, but is 99% or less in many cases.

In this manner, the illuminance at the center of the viewing angle of the liquid crystal display device can be increased to improve visibility.

Since two layers of light absorption anisotropic layers are used in the liquid crystal display device according to the embodiment of the present invention, the illuminance at the center of the viewing angle is lower than that in a case where the light absorption anisotropic layer is formed of one layer. In order to decrease the illuminance at the peripheral portion as much as possible while attempting not to decrease the illuminance at the center of the viewing angle as much as possible, the degree of alignment of the light absorption anisotropic layer at a wavelength of 550 nm is preferably 0.80 or greater, more preferably 0.90 or greater, and still more preferably 0.95 or greater. The upper limit thereof is not particularly limited, but is 0.999 or less in many cases.

The degree of alignment can be acquired in the following manner.

The transmittance of P polarized light having a wavelength of 550 am which is incident on the light absorption anisotropic layer is measured using AxoScan OPMF-1 (manufactured by Opto Science Inc.). During the measurement, while the polar angle which is an angle with respect to the normal direction of the light absorption anisotropic layer is changed for each angle from 0° to 60°, the transmittance of P polarized light having a wavelength of 550 nm in a case of incidence at an omniazimuthal angle and each polar angle is measured. Next, after removal of the influence of surface reflection, the transmittance at the azimuthal angle and the polar angle with the highest transmittance is defined as Tm (0), and the transmittance at an angle obtained by inclining the polar angle by 40° from the polar angle with the highest transmittance in a direction of the azimuthal angle with the highest transmittance is defined as Tm (40). The absorbance is calculated by the following equation based on the obtained Tm (0) and Tm (40), and A (0) and A (40) are calculated.

$$A=-\log(Tm)$$

Here, Tin represents the transmittance and A represents the absorbance.

A degree S of alignment (degree of alignment at a wavelength of 550 nm) defined by the following equation is calculated based on the calculated A (0) and A (40).

$$S=(4.6 \times A(40)-A(0))/(4.6 \times A(40)+2 \times A(0))$$

Further, from the viewpoint of making the tint in the front direction neutral, the degree of alignment of the light absorption anisotropic layer at a wavelength of 420 nm is preferably 0.93 or greater.

The tint of the light absorption anisotropic layer containing a dichroic substance is typically controlled by adjusting the addition amount of the dichroic substance contained in the light absorption anisotropic layer. However, it was found that the tint bath in the front direction and an oblique direction cannot be made neutral only by adjusting the addition amount of the dichroic substance. It was found that the reason why the tint in the front direction and an oblique direction cannot be made neutral is that the degree of alignment at a wavelength of 420 nm is low, and thus the tint in the front direction and an oblique direction can be made neutral by increasing the degree of alignment at a wavelength of 420 am.

The degree of alignment of the light absorption anisotropic layer at a wavelength of 420 nm can be measured by the same method as the method of measuring the degree of alignment at a wavelength of 550 nm described above except that the wavelength is changed to 420 nm from 550 nm.

Further, the liquid crystal display device according to the embodiment of the present invention may include other light absorption anisotropic layers in addition to the first light absorption anisotropic layer and the second light absorption anisotropic layer within a range where the effects of the present invention are exhibited. The other light absorption anisotropic layers denote light absorption isotropic layers having a transmittance central axis at a position different from those of the first light absorption anisotropic layer and the second light absorption anisotropic layer.

Further, as described below, the liquid crystal display device according to the embodiment of the present invention may separately include a retardation layer, or the liquid crystal display device may include the above-described light absorption anisotropic layers (the first light absorption anisotropic layer and the second light absorption anisotropic layer) in a manner that these layers are disposed by being laminated.

(Liquid Crystal Compound)

It is preferable that the light absorption anisotropic layers (the first light absorption anisotropic layer and the second light absorption anisotropic layer) contain a liquid crystal compound. Since the light absorption anisotropic layers contain a liquid crystal compound, the dichroic substances can be aligned with a high degree of alignment while the precipitation of the dichroic substances is suppressed.

The liquid crystal compound is a liquid crystal compound that does not exhibit dichroism.

The liquid crystal compound can be generally classified into a rod-like type liquid crystal compound (rod-like liquid crystal compound) and a disk-like type liquid crystal compound (disk-like liquid crystal compound) based on the shape thereof.

A liquid crystal compound that does not exhibit dichroism in a visible region is preferable as the rod-like liquid crystal compound.

As the rod-like liquid crystal compound, both a low-molecular-weight liquid crystal compound and a polymer liquid crystal compound can be used. Here, "low-molecular-weight liquid crystal compound" denotes a liquid crystal compound having no repeating units in the chemical structure. Here, "polymer liquid crystal compound" is a liquid crystal compound having a repeating unit in the chemical structure.

Examples of the low-molecular-weight liquid crystal compound include liquid crystal compounds described in JP2013-228706A.

Examples of the polymer liquid crystal compound include thermotropic liquid crystal polymers described in JP2011-237513A. Further, the polymer liquid crystal compound may contain a crosslinkable group (such as an acryloyl group or a methacryloyl group) at a terminal.

The rod-like liquid crystal compound may be used alone or in combination of two or more kinds thereof.

From the viewpoint that the effects of the present invention are more excellent, the rod-like liquid crystal compound includes preferably a polymer liquid crystal compound and more preferably both a polymer liquid crystal compound and a low-molecular-weight liquid crystal compound.

It is preferable that the rod-like liquid crystal compound includes a liquid crystal compound represented by Formula (LC) or a polymer thereof. The liquid crystal compound represented by Formula (LC) or a polymer thereof is a compound exhibiting liquid crystallinity. The liquid crystallinity may be a nematic phase or a smectic phase, and may exhibit both a nematic phase and a smectic phase and preferably at least a nematic phase.

The smectic phase may be a higher-order smectic phase. The higher-order smectic phase here denotes a smectic B phase, a smectic D phase, a smectic E phase, a smectic F phase, a smectic G phase, a smectic H phase, a smectic I phase, a smectic J phase, a smectic K phase, or a smectic L phase. Among these, a smectic B phase, a smectic F phase, or a smectic I phase is preferable.

In a case where the smectic liquid crystal phase exhibited by the liquid crystal compound is any of these higher-order smectic liquid crystal phases, a light absorption anisotropic layer with a higher degree of alignment order can be prepared. Further, the light absorption anisotropic layer prepared from such a higher-order smectic liquid crystal phase with a high degree of alignment order is a layer in which a Bragg peak derived from a higher-order structure such as a hexatic phase or a crystal phase in X-ray diffraction measurement is obtained. The Bragg peak denotes a peak derived from the surface periodic structure of molecular alignment, and a light absorption anisotropic layer having a periodic interval of 3.0 to 5.0 Å is preferable.

$$Q1\text{-}S1\text{-}MG\text{-}S2\text{-}Q2 \qquad (LC)$$

In Formula (LC), Q1 and Q2 each independently represent a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphine group, a phosphinyl group, a phosphinyloxy group, a phosphinylamino group, a phosphono group, a silyl group, a hydrazine group, a ureido group, a boronic acid group (—B(OH)$_2$), a phosphate group (—OPO(OH)$_2$), a sulfate group (—OSO$_3$H), or a crosslinkable group represented by any of Formulae (P-1) to (P-30), and it is preferable that at least one of Q1 or Q2 represents a crosslinkable group represented by any of the following formulae.

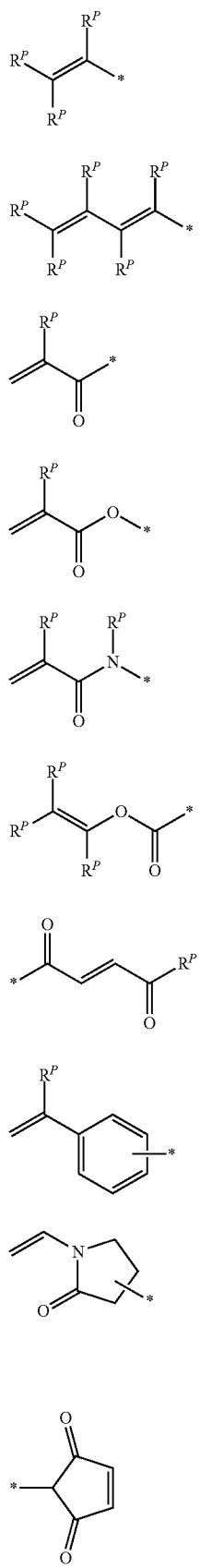

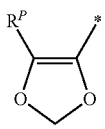
(P-23)

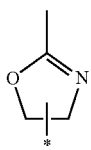
(P-24)

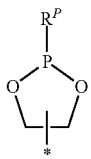
(P-25)

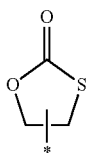
(P-26)

(P-27)

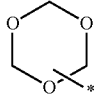
(P-28)

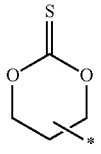
(P-29)

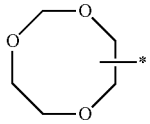
(P-30)

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonia group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sun group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), and a plurality of $R^P$'s may be the same as or different from each other.

Examples of preferable aspects of the crosslinkable group include a radically polymerizable group and a cationically polymerizable group. As the radically polymerizable group, a vinyl group represented by Formula (P-1), a butadiene group represented by Formula (P-2), a (meth)acryl group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), or a maleimide group represented by Formula (P-12) is preferable. As the cationically polymerizable group, a vinyl ether group represented by Formula (P-18), an epoxy group represented by Formula (P-19), or an oxetanyl group represented by Formula (P-20) is preferable.

In Formula (LC), S1 and S2 each independently represent a divalent spacer group, and suitable aspects of S1 and S2 include the same structures as those for SPW in Formula (W1), and thus the description thereof will not be repeated.

In Formula (LC), MG represents a mesogen group described below. The mesogen group represented by MG is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited and for example, particularly description on pages 7 to 16 of "Flussige Kristalle in Tabellen II" (VEB Deutsche Verlag fix Grundstoff Industrie, Leipzig, 1984) and particularly the description in Chapter 3 of "Liquid Crystal Handbook" (Maruzen, 2000) edited by Liquid Crystals Handbook Editing Committee can be referred to.

The mesogen group represented by MG has preferably 2 to 10 cyclic structures and more preferably 3 to 7 cyclic structures.

Specific examples of the cyclic structure include an aromatic hydrocarbon group, a heterocyclic group, and an alicyclic group.

From the viewpoints of exhibiting the liquid crystallinity, adjusting the liquid crystal phase transition temperature, and the availability of raw materials and synthetic suitability and from the viewpoint that the effects of the present invention are more excellent, as the mesogen group represented by MG, a group represented by Formula (MG-A) or Formula (MG-B) is preferable, and a group represented by Formula (MG-B) is more preferable.

$$*\!-\!(A1)_{\overline{a1}}\!-\!* \tag{MG-A}$$

$$*\!-\!(A2\!-\!LA1)_{\overline{a2}}\!-\!A3\!-\!* \tag{MG-B}$$

In Formula (MG-A), A1 represents a divalent group selected from the group consisting of an aromatic hydrocarbon group, a heterocyclic group, and an alicyclic group. These groups may be substituted with a substituent such as the substituent W.

It is preferable that the divalent group represented by A1 is a 4- to 15-membered ring. Further, the divalent group represented by A1 may be a monocycle or a fused ring.

Further, * represents a bonding position with respect to S1 or 52.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable.

The divalent heterocyclic group represented by A1 may be any of aromatic or non-aromatic, but a divalent aromatic heterocyclic group is preferable as the divalent heterocyclic group from the viewpoint of further improving the degree of alignment.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiopliene-diyl group, a thienooxazole-diyl group, and the following structures (II-1) to (II-4).

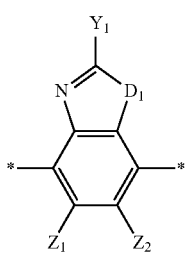

(II-1)

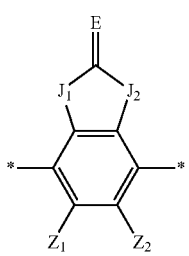

(II-2)

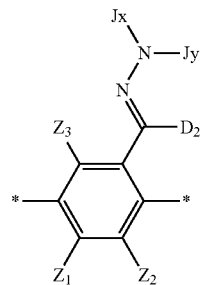

(II-3)

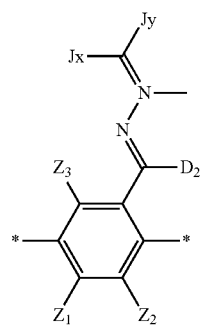

(II-4)

In Formulae (II-1) to (II-4), $D_1$ represents —S—, —O—, or $NR^{11}$—, $R^{11}$ represents a hydrogen atom or an alkyl group having 1 to 6 carbon atoms, $Y_1$ represents an aromatic hydrocarbon group having 6 to 12 carbon atoms or an aromatic heterocyclic group having 3 to 12 carbon atoms, $Z_1$, $Z_2$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, —$NR^{12}R^{13}$, or —$SR^{12}$, $Z_1$ and $Z_2$ may be bonded to each other to form an aromatic ring or an aromatic heterocyclic ring, $R^{12}$ and $R^{13}$ each independently represent a hydrogen atom or an alkyl group having 1 to 6 carbon atoms, $J_1$ and $J_2$ each independently represent a group selected from the group consisting of —O—, —$NR^{21}$— ($R^{21}$ represents a hydrogen atom or a substituent), —S—, and —C(O)—, E represents a hydrogen atom or a non-metal atom of a Group 14 to a Group 16 to which a substituent may be bonded, Jx represents an organic group having 2 to 30 carbon atoms, which has at least one aromatic ring selected from the group consisting of an aromatic hydrocarbon ring and an aromatic heterocyclic ring, Jy represents a hydrogen atom, an alkyl group having 1 to 6 carbon atoms which may have a substituent, or an organic group having 2 to 30 carbon atoms which has at least one aromatic ring selected from the group consisting of an aromatic hydrocarbon ring and an aromatic heterocyclic ring, the aromatic ring of Jx and Jy may have a substituent, Jx and Jy may be bonded to each other to form a ring, and $D_2$ represents a hydrogen atom or an alkyl group having 1 to 6 carbon atoms which may have a substituent.

In Formula (II-2), in a case where $Y_1$ represents an aromatic hydrocarbon group having 6 to 12 carbon atoms, the aromatic hydrocarbon group may be monocyclic or polycyclic. In a case where $Y_1$ represents an aromatic heterocyclic group having 3 to 12 carbon atoms, the aromatic heterocyclic group may be monocyclic or polycyclic.

In Formula (II-2), in a case where $J_1$ and $J_2$ represent —$NR^{21}$—, the substituent as $R^{21}$ can refer to, for example, the description in paragraphs [0035] to [0045] of JP2008-107767A, and the content thereof is incorporated in the present specification.

In Formula (II-2), in a case where E represents a non-metal atom of a Group 14 to a Group 16 to which a substituent may be bonded, =O, =S, =NR', or =C(R')R' is preferable, R' represents a substituent, and the substituent can refer to, for example, the description in paragraphs [0035] to [0045] of JP2008-107767A, and —NZ$^{41}$Z$^{42}$ (Z$^{41}$ and Z$^{42}$ each independently represent a hydrogen atom, an alkyl group, or an aryl group) is preferable.

Specific examples of the divalent alicyclic group represented by A1 include a cyclopentylene group and a cyclohexylene group, and the carbon atoms thereof may be substituted with —O—, —Si(CH$_3$)$_2$—, —N(Z)— (Z represents a hydrogen atom, an alkyl group having 1 to 4 carbon atoms, a cycloalkyl group, an aryl group, a cyano group, or a halogen atom), —C(O)—, —S—, —SO$_2$—, or a group obtained by combining two or more of these groups.

In Formula (MG-A), a1 represents an integer of 2 to 10 (preferably an integer of 2 to 4). The plurality of A1's may be the same as or different from each other.

In Formula (MG-B), A2 and A3 each independently represent a divalent group selected from the group consisting of an aromatic hydrocarbon group, a heterocyclic group, and an alicyclic group. Specific examples and suitable aspects of A2 and A3 are the same as those for A1 in Formula (MG-A), and thus description thereof will not be repeated.

In Formula (MG-B), a2 represents an integer of 1 to 10 (preferably an integer of 1 to 3), a plurality of A2's may be the same as or different from each other, and a plurality of LA1's may be the same as or different from each other. From the viewpoint that the effects of the present invention are more excellent, it is preferable that a2 represents 2 or greater.

In Formula (MG-B), LA1 represents a single bond or a divalent linking group. Here, LA1 represents a divalent linking group in a ease where a2 represents 1, and at least one of the plurality of LA1's represents a divalent linking group in a case where a2 represents 2 or greater.

In Formula (MG-B), examples of the divalent linking group represented by LA1 are the same as those for LW, and thus the description thereof will not be repeated.

Specific examples of MG include the following structures, the hydrogen atoms on the aromatic hydrocarbon group, the heterocyclic group, and the alicyclic group in the following structures may be substituted with the substituent W described above.

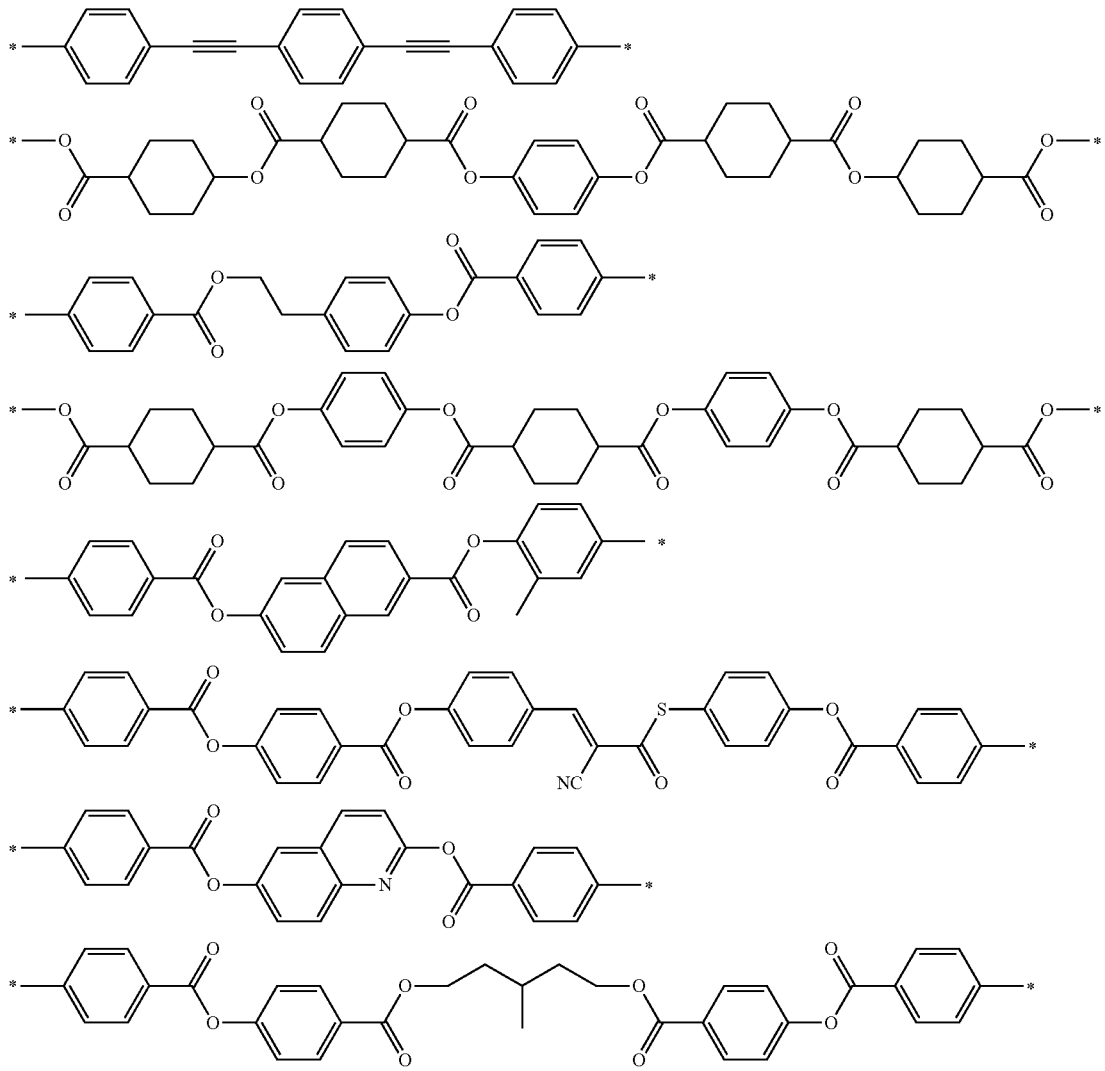

-continued
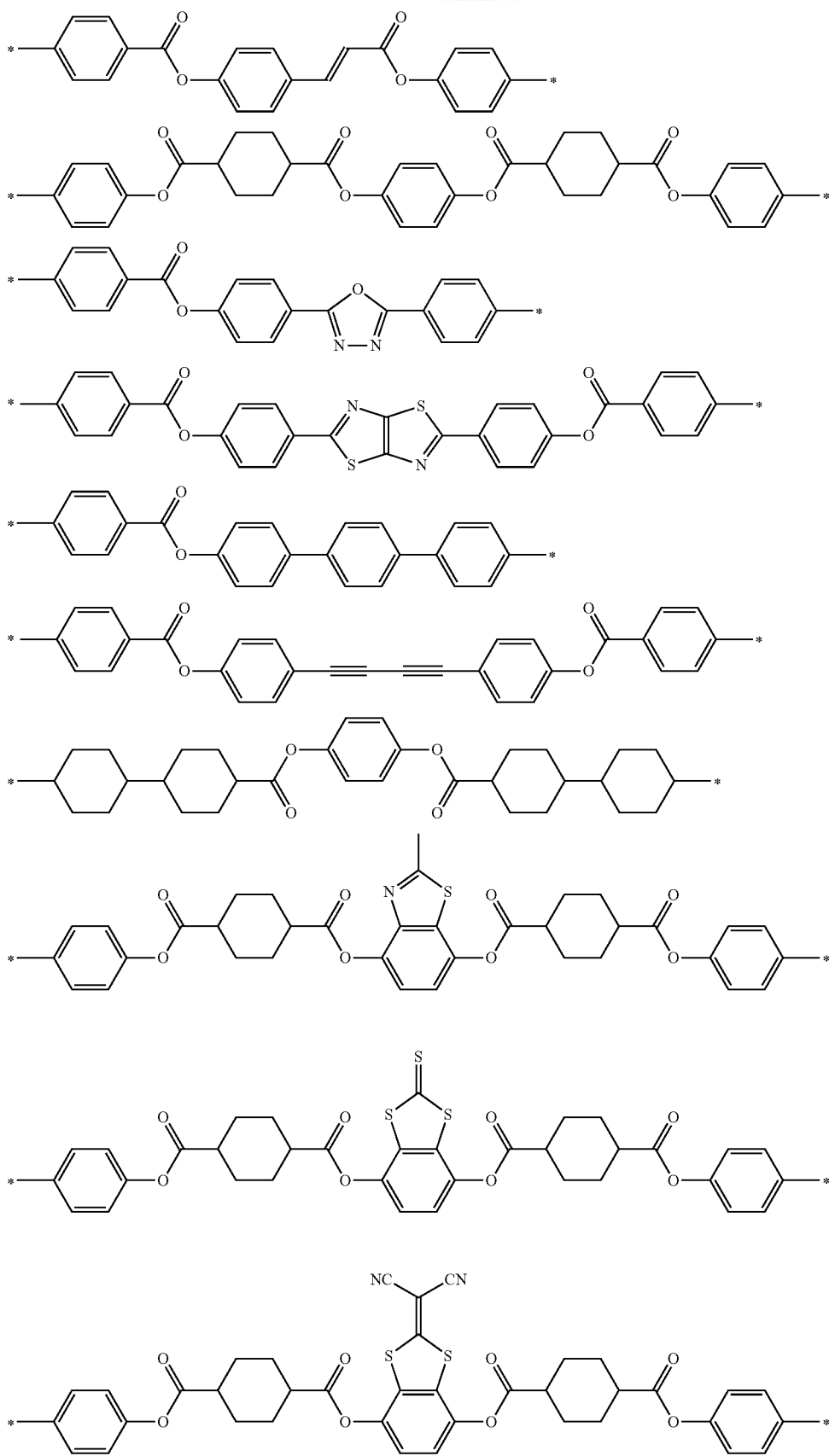

-continued
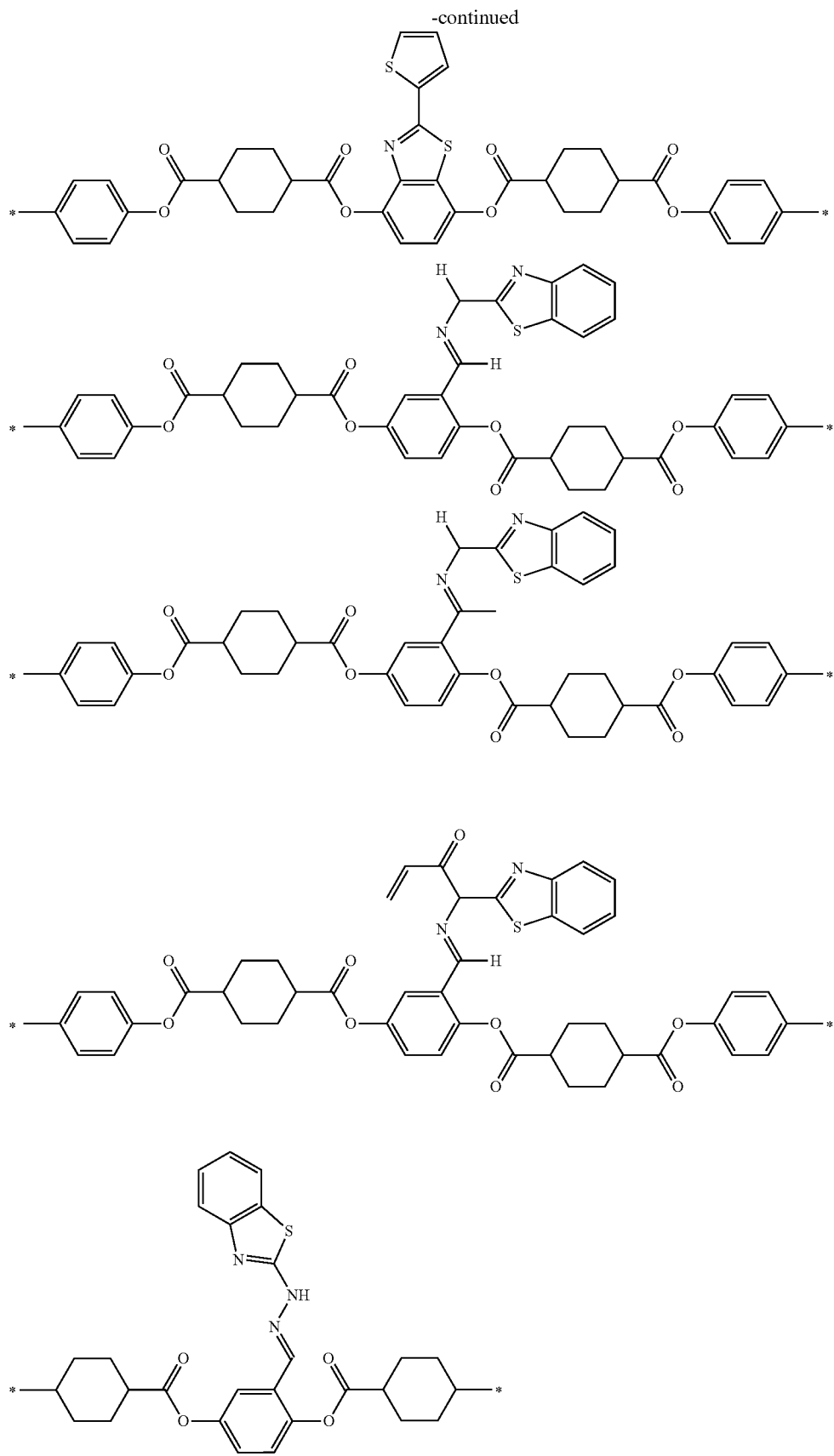

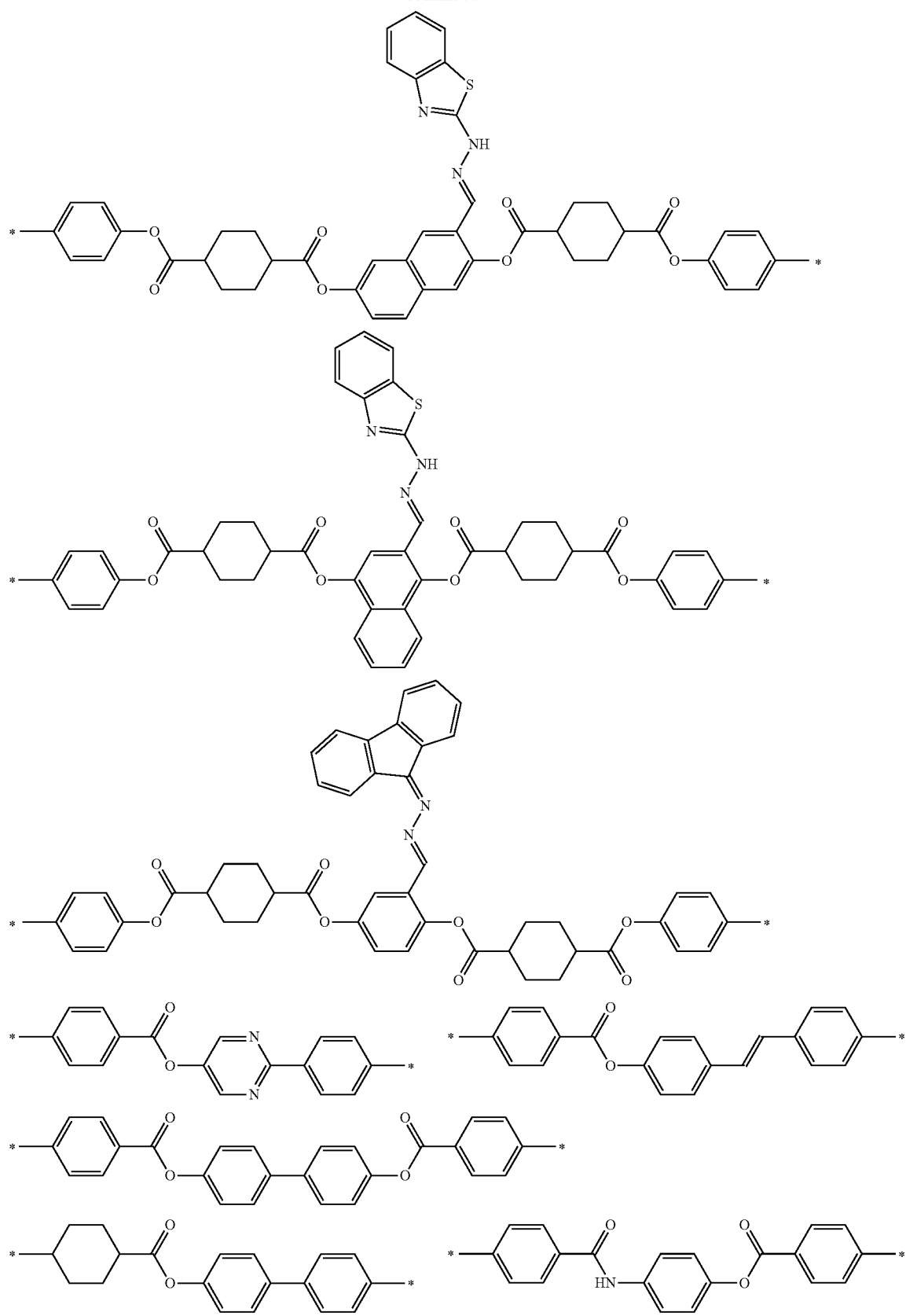

-continued
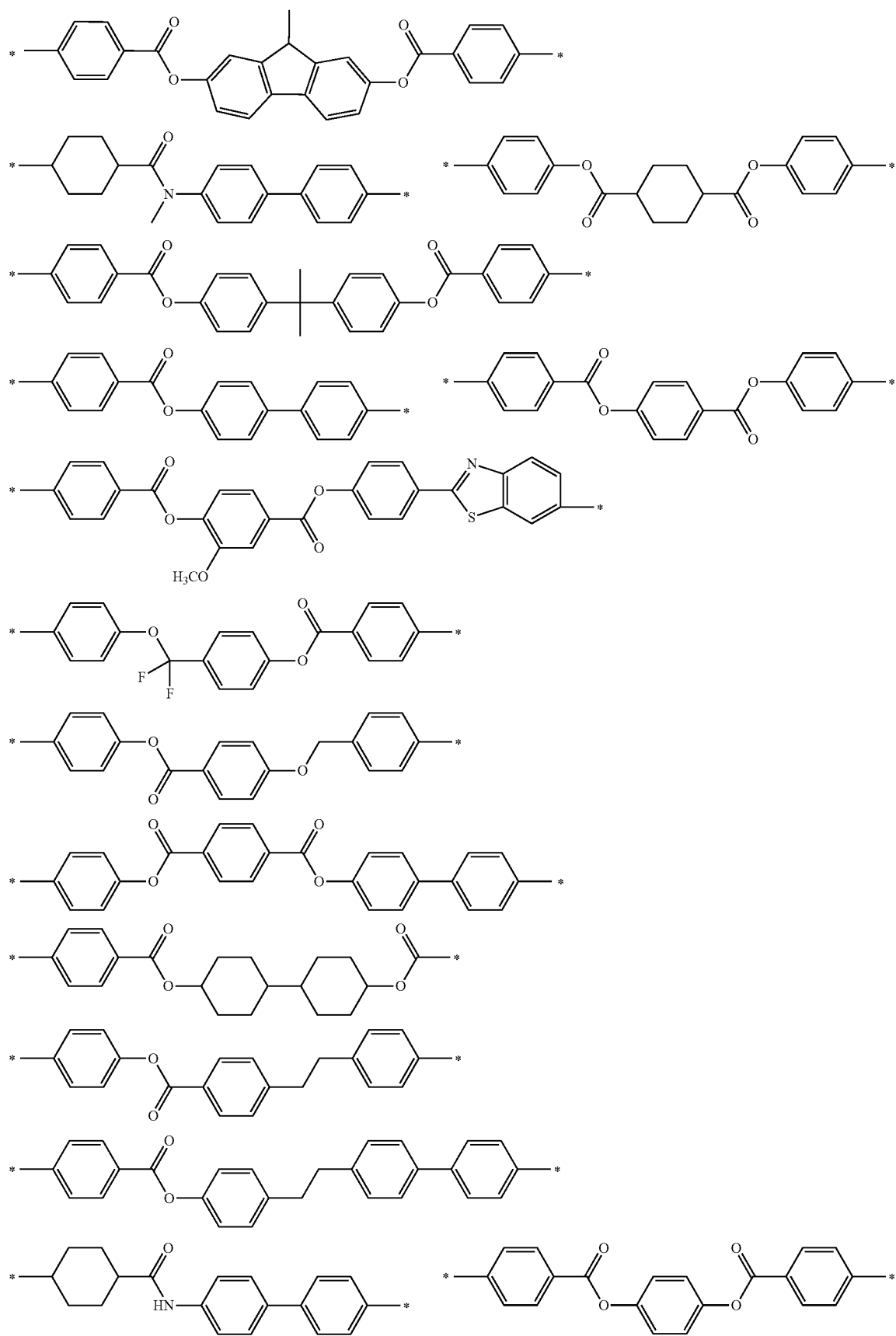

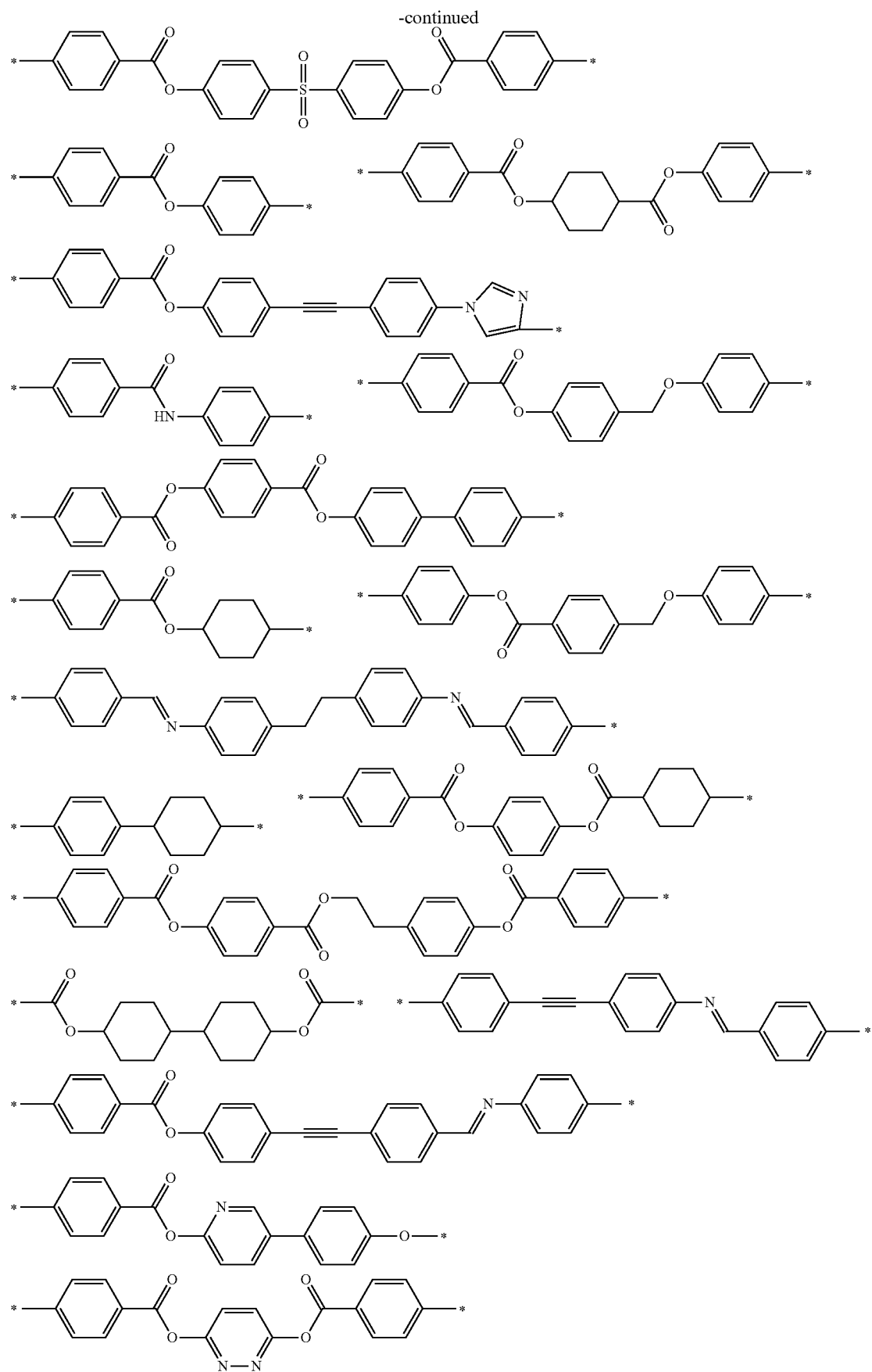

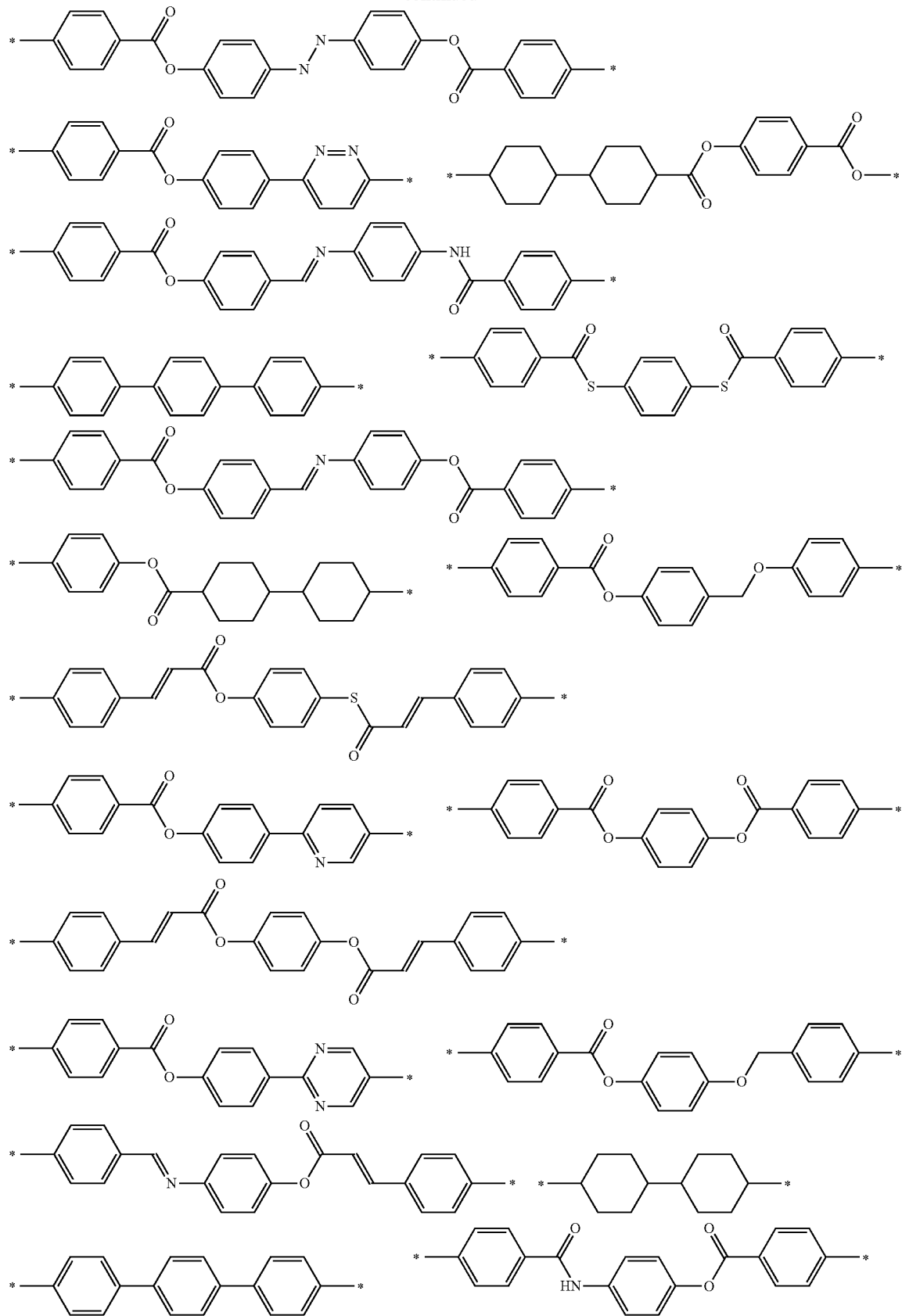

In a case where the liquid crystal compound represented by Formula (LC) is a low-molecular-weight liquid crystal compound, examples of preferable aspects of the cyclic structure of the mesogen group MG include a cyclohexylene group, a cyclopentylene group, a phenylene group, a naphthylene group, a thiorene-diyl group, a pyridine-diyl group, a pyridazine-diyl group, a thiophene-diyl group, an oxazole-diyl group, a thiazole-diyl group, and a thienothiophene-diyl group, and the number of cyclic structures is preferably in a range of 2 to 10 and more preferably in a range of 3 to 7.

Examples of preferable aspects of the substituent W having a mesogen structure include a halogen atom, a halogenated alkyl group, a cyano group, a hydroxy group, a nitro group, a carboxy group, an alkoxy group having 1 to 10 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an amino group, an alkylamino group having 1 to 10 carbon atoms, an alkylaminocarbonyl group, and a group in which LW in the Formula (W1) represents a single bond, SPW represents a divalent spacer group, and Q represents a crosslinkable group represented by any of Formulae (P-1) to (P-30), and preferred examples of the crosslinkable group include a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group.

Since the preferable aspects of the divalent spacer groups S1 and S2 are the same as those of the SPW, the description thereof will not be repeated.

In a case where a low-molecular-weight liquid crystal compound exhibiting smectic properties is used, the number of carbon atoms of the spacer group (the number of atoms in a case where the carbon atoms are substituted "SP-C") is preferably 6 or more and more preferably 8 or more.

In a case where the liquid crystal compound represented by Formula (LC) is a low-molecular-weight liquid crystal compound, a plurality of low-molecular-weight liquid crystal compounds may be used in combination, preferably 2 to 6 kinds of low-molecular-weight liquid crystal compounds are used in combination, and more preferably 2 to 4 kinds of low-molecular-weight liquid crystal compounds are used in combination. By using low-molecular-weight liquid crystal compounds in combination, the solubility can be improved and the phase transition temperature of the liquid crystal composition can be adjusted.

Specific examples of the low-molecular-weight liquid crystal compound include compounds represented by Formulae (LC-1) to (LC-77), but the low-molecular-weight liquid crystal compound is not limited thereto.

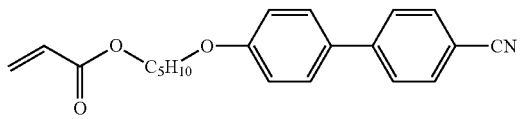

(LC-1)

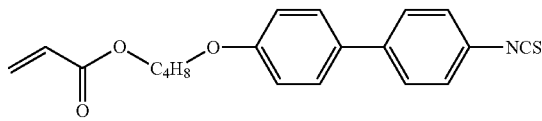

(LC-2)

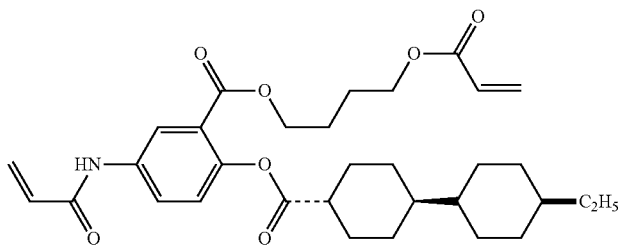

(LC-3)

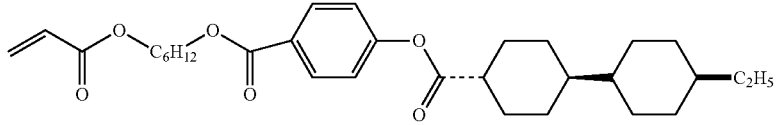

(LC-4)

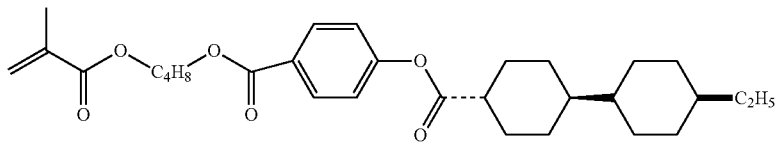

(LC-5)

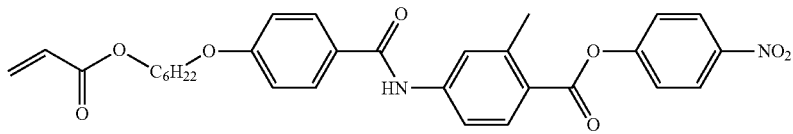

(LC-6)

-continued
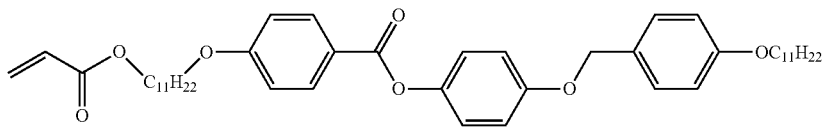
(LC-7)
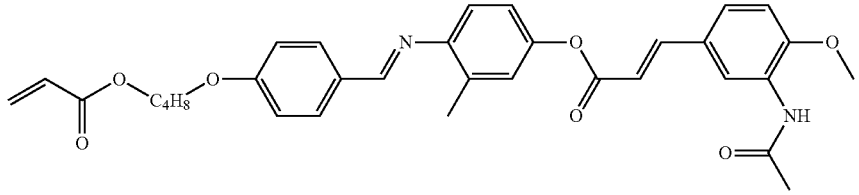
(LC-8)
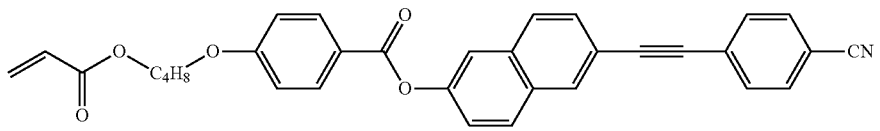
(LC-9)
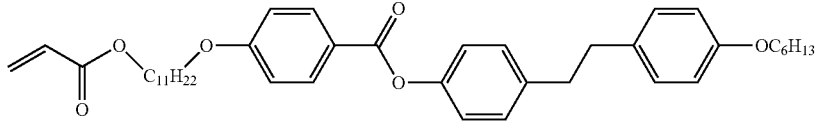
(LC-10)
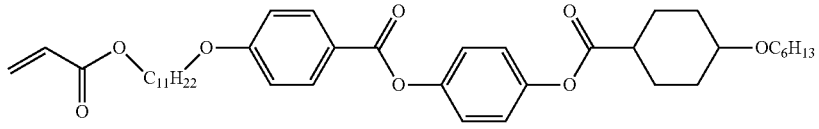
(LC-11)
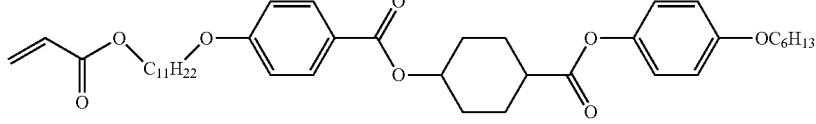
(LC-12)
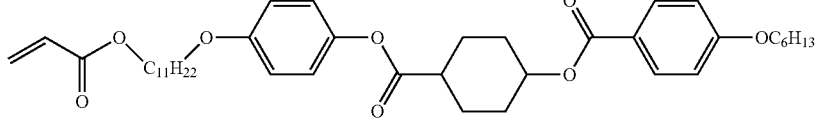
(LC-13)
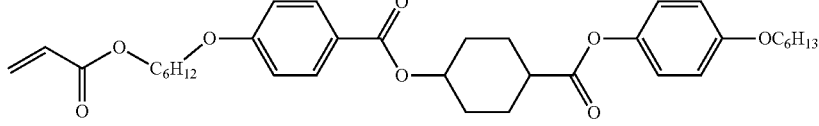
(LC-14)
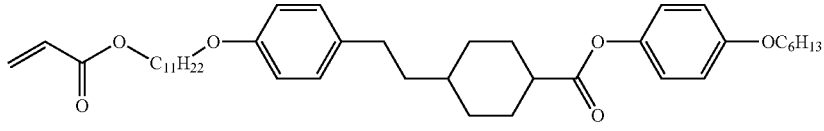
(LC-15)
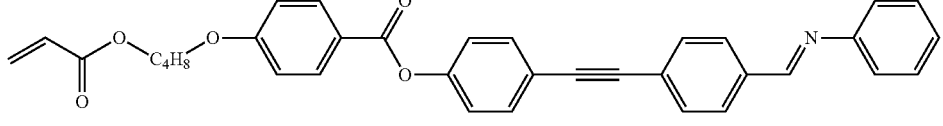
(LC-16)
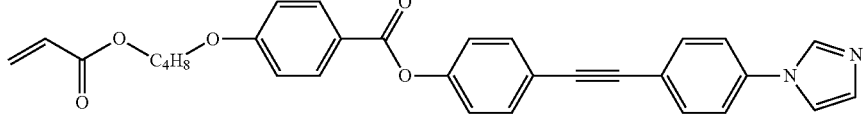
(LC-17)

-continued
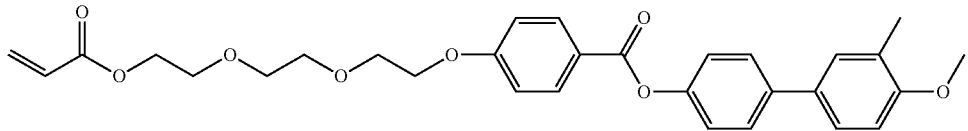
(LC-18)
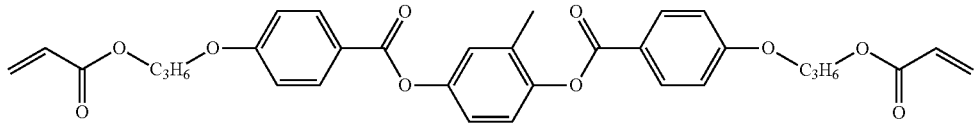
(LC-19)
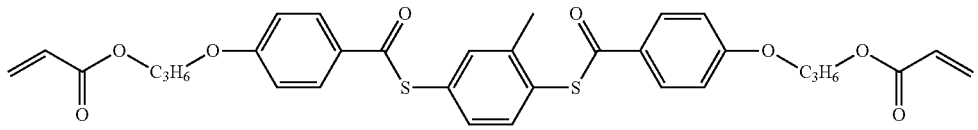
(LC-20)
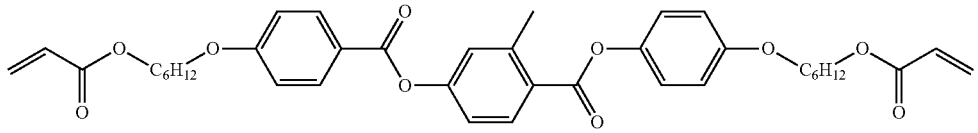
(LC-21)
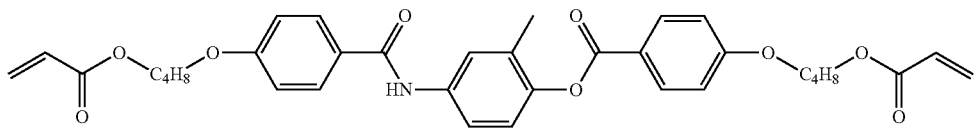
(LC-22)
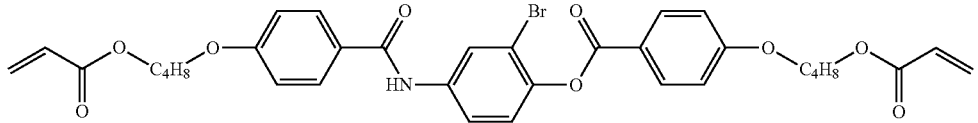
(LC-23)
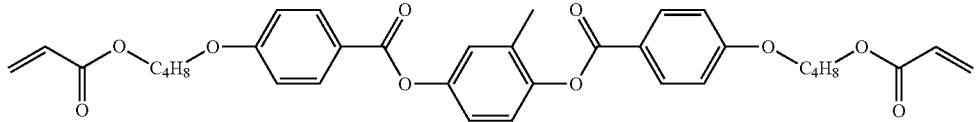
(LC-24)
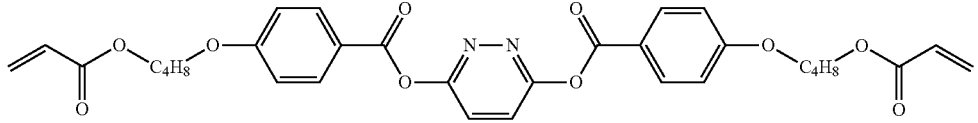
(LC-25)
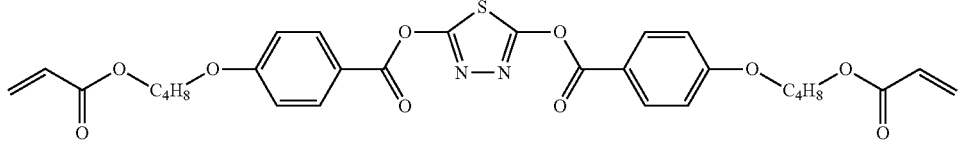
(LC-26)
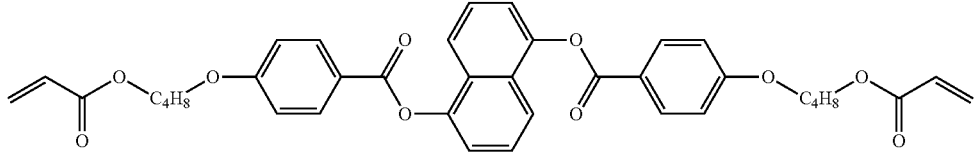
(LC-27)

-continued
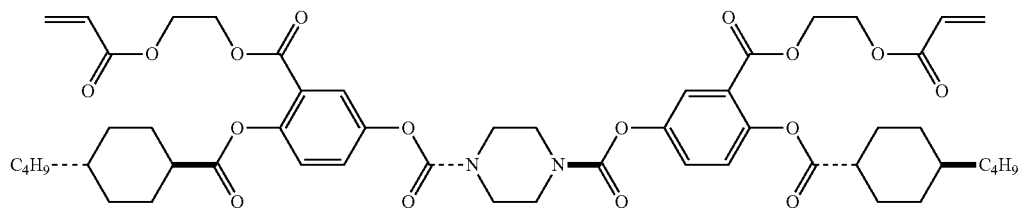
(LC-28)
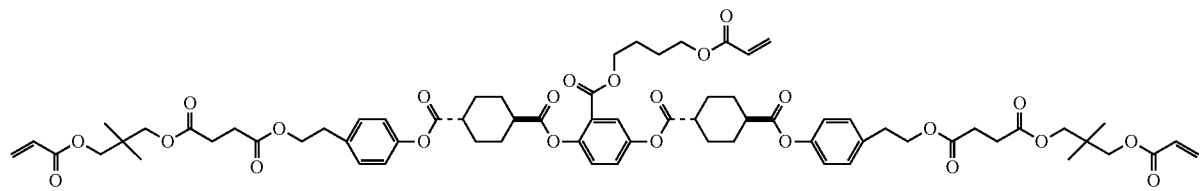
(LC-29)
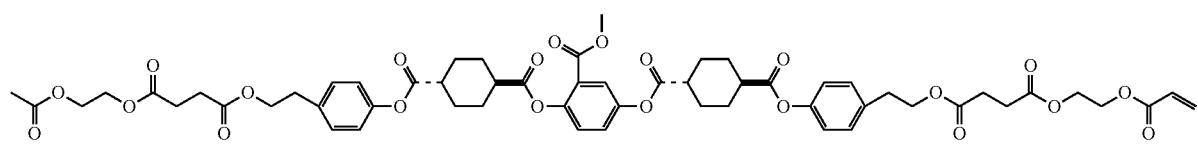
(LC-30)
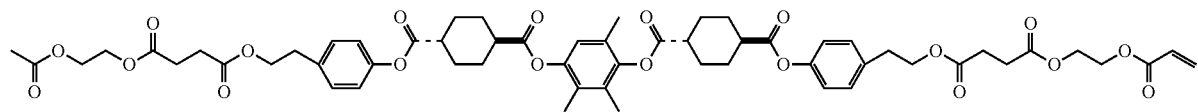
(LC-31)
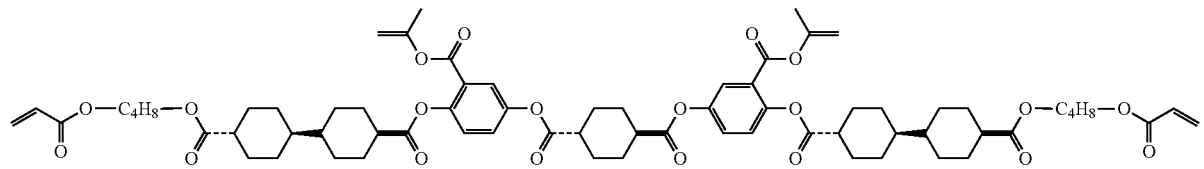
(LC-32)
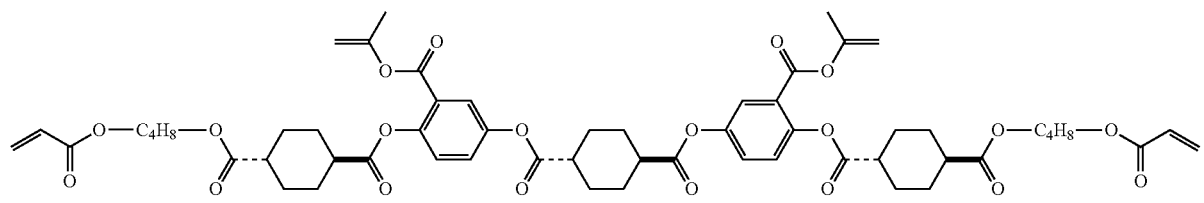
(LC-33)
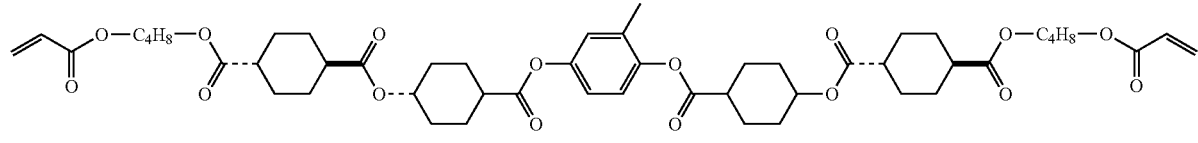
(LC-34)
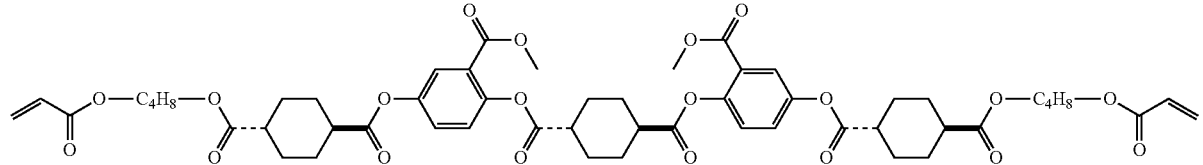
(LC-35)

-continued
(LC-36)
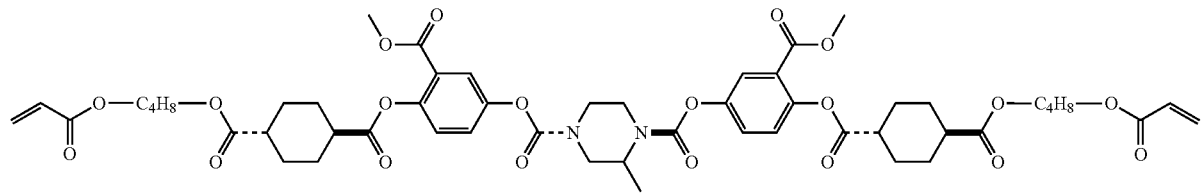
(LC-37)
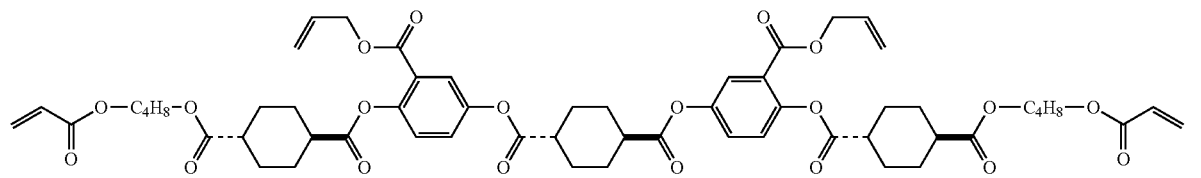
(LC-38)
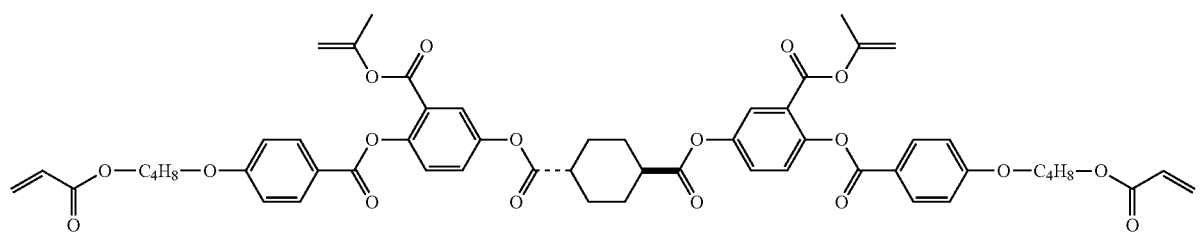
(LC-39)
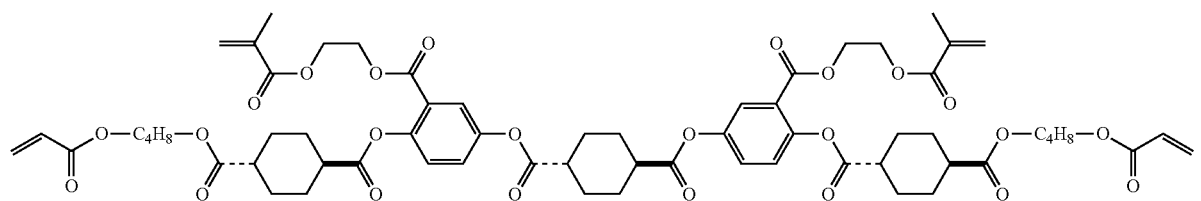
(LC-40)
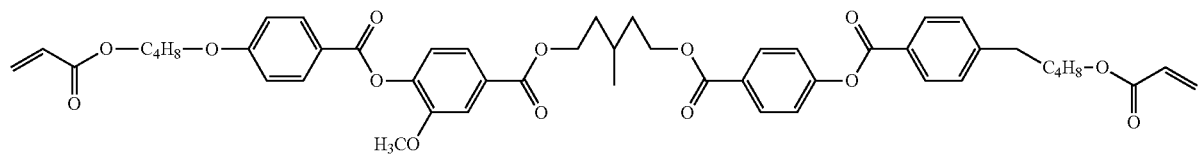
(LC-41)
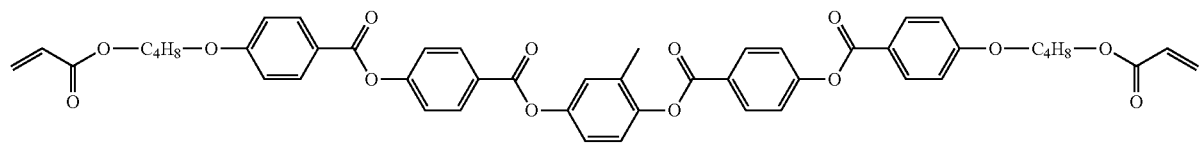
(LC-42)
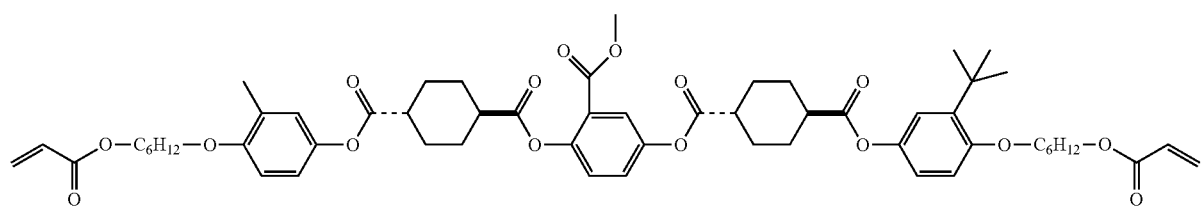

-continued
(LC-43)
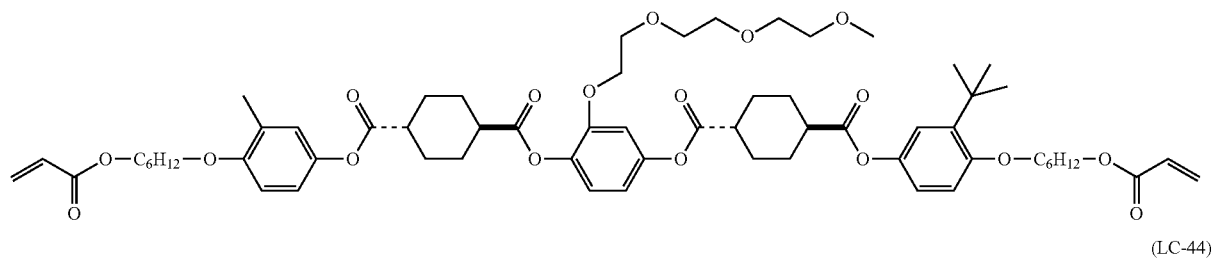
(LC-44)
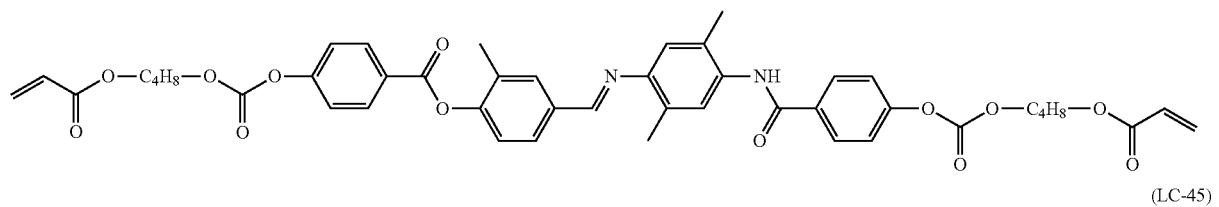
(LC-45)
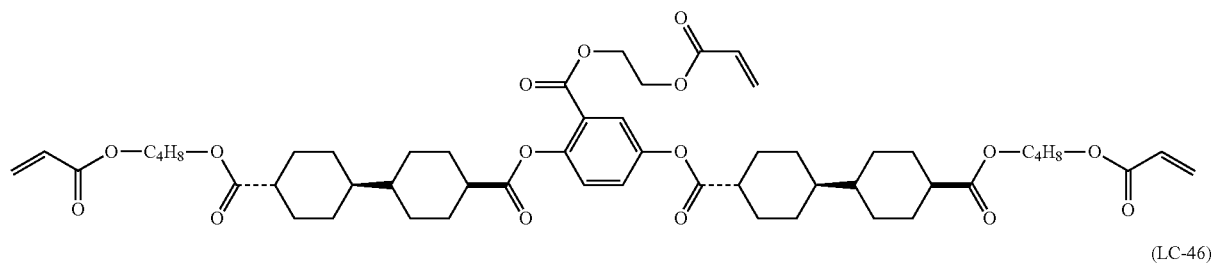
(LC-46)
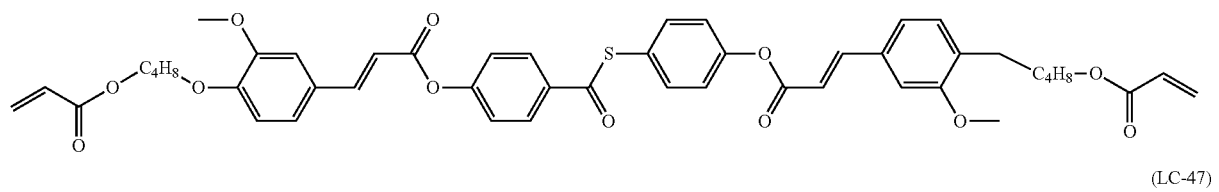
(LC-47)
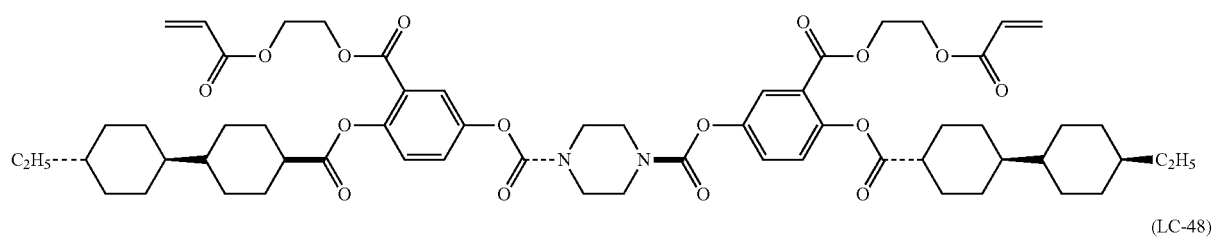
(LC-48)
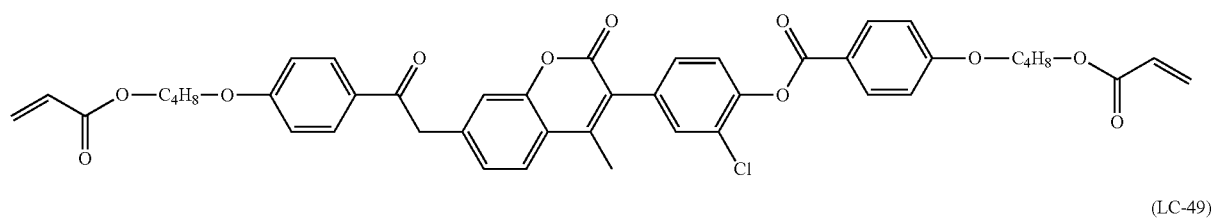
(LC-49)
(LC-50)
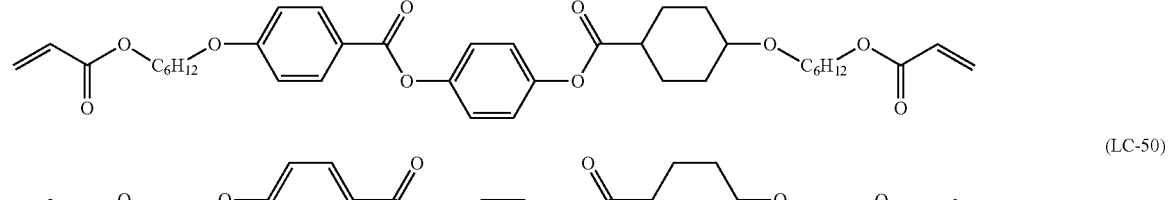

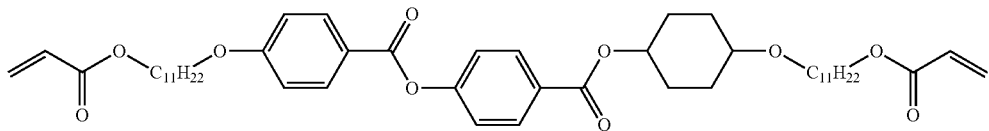
(LC-51)
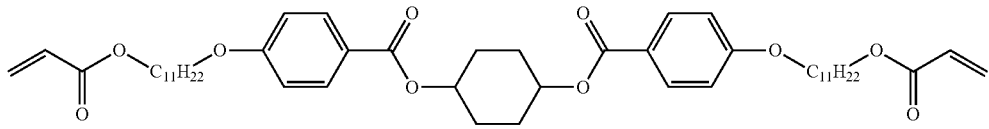
(LC-52)
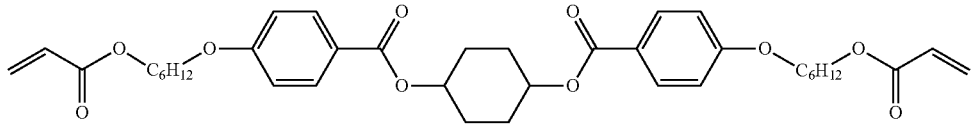
(LC-53)
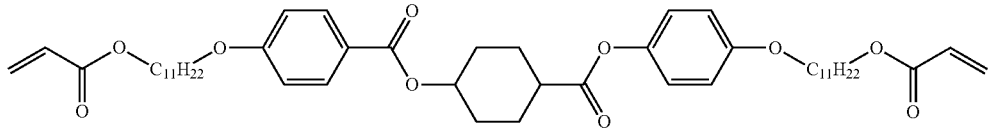
(LC-54)
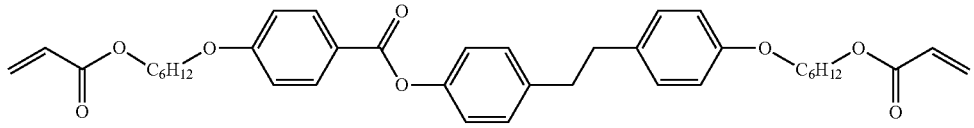
(LC-55)
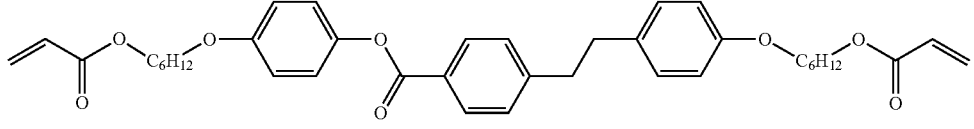
(LC-56)
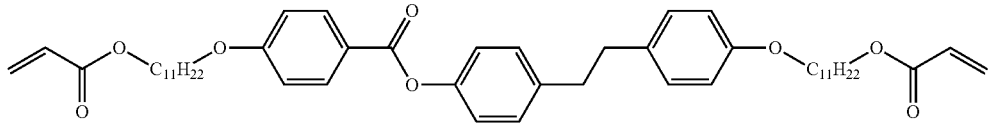
(LC-57)
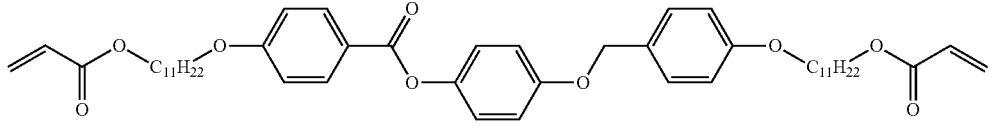
(LC-58)
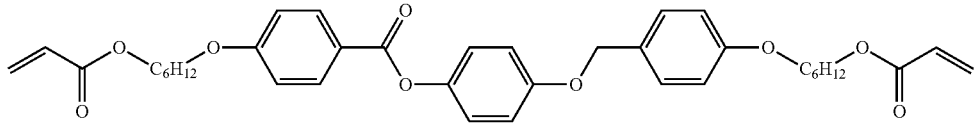
(LC-59)
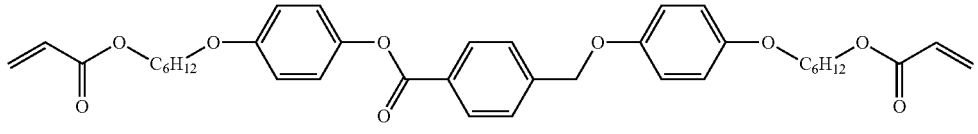
(LC-60)
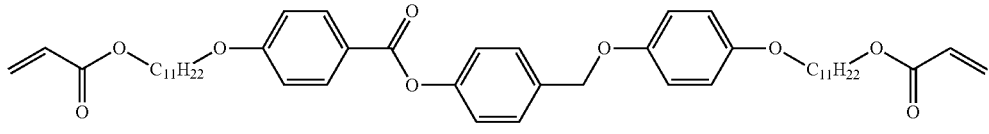
(LC-61)

-continued
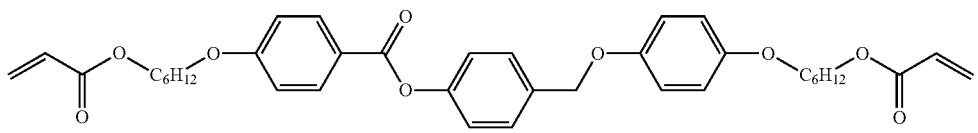
(LC-62)
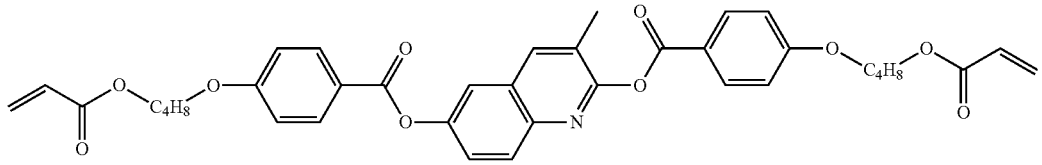
(LC-63)
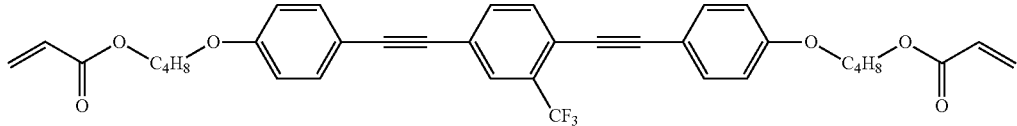
(LC-64)
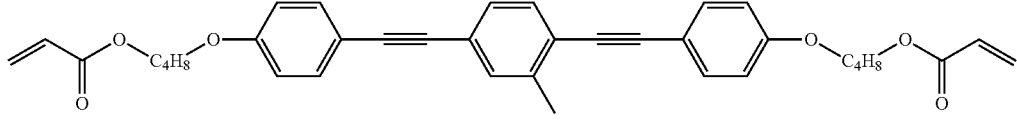
(LC-65)
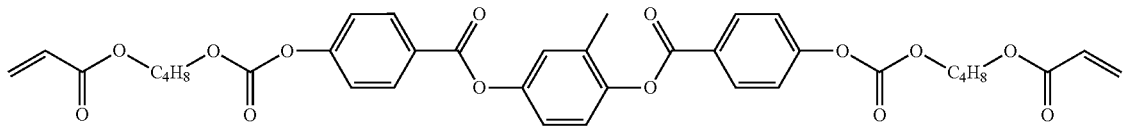
(LC-65)
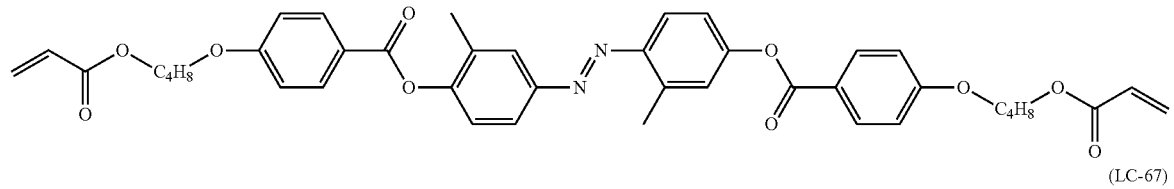
(LC-66)
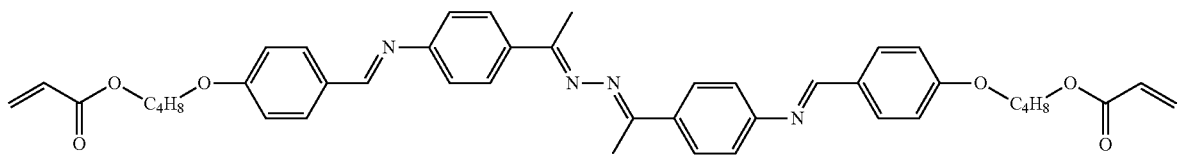
(LC-67)
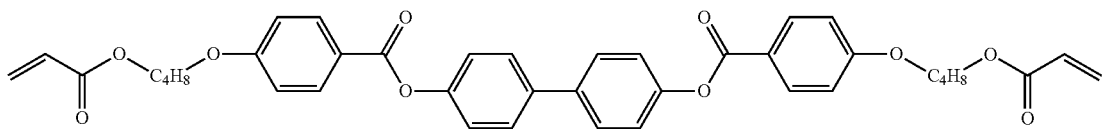
(LC-68)
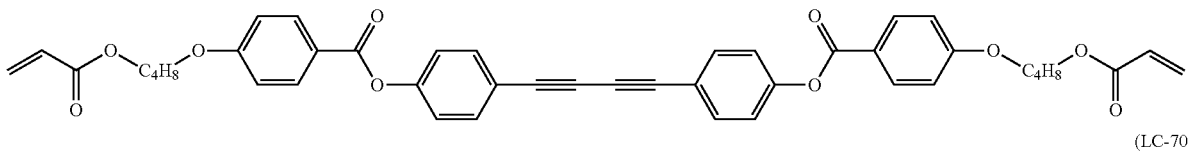
(LC-69)
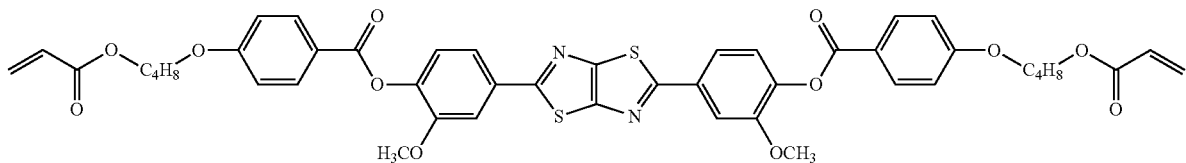
(LC-70)

-continued

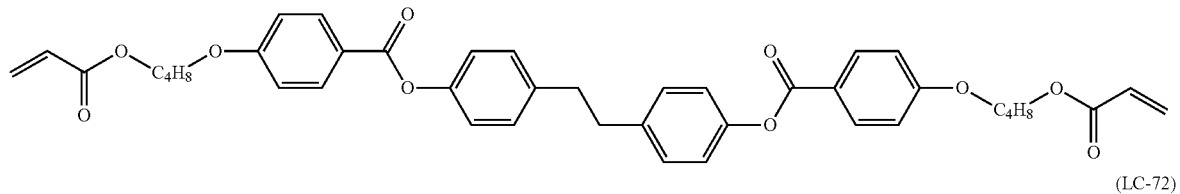
(LC-71)

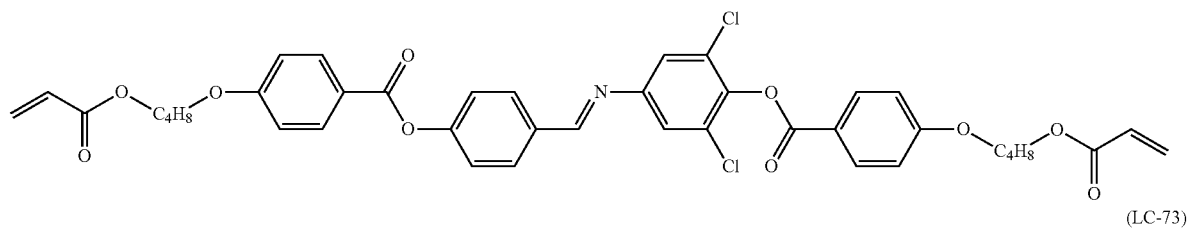
(LC-72)

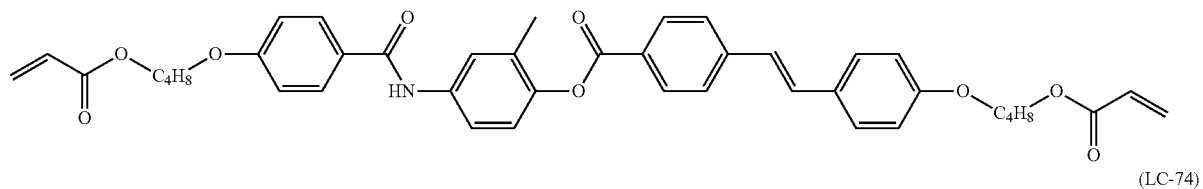
(LC-73)

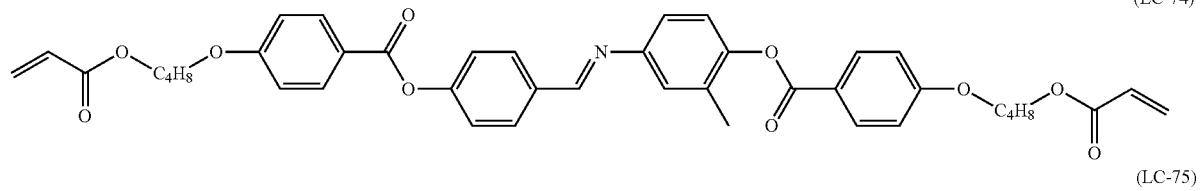
(LC-74)

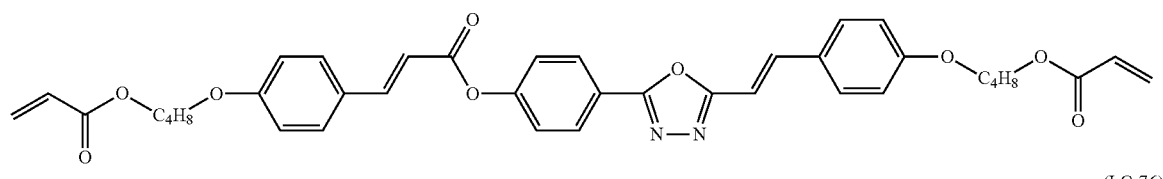
(LC-75)

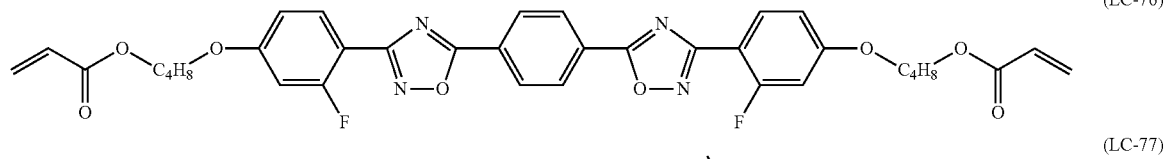
(LC-76)

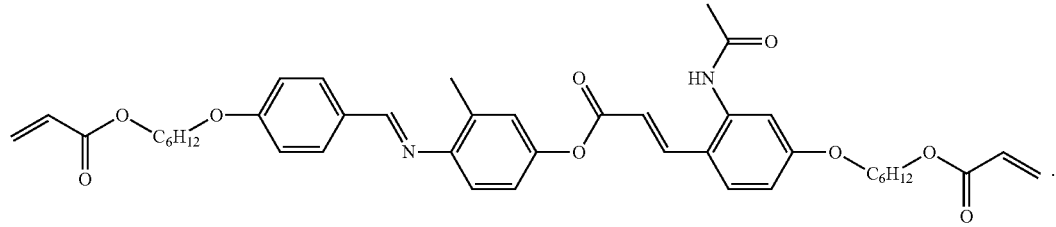
(LC-77)

The polymer liquid crystal compound is preferably a homopolymer or a copolymer having a repeating unit described below, and may be any of a random polymer, a block polymer, a graft polymer, or a star polymer.

(Repeating Unit (1))

It is preferable that the polymer liquid crystal compound has a repeating unit represented by Formula (1) (hereinafter, also referred to as "repeating unit (1)").

$$-(PC1)-\\ |\\ L1-SP1-MG1-T1$$
(1)

In Formula (I), PC1 represents a main chain of the repeating unit, L1 represents a single bond or a divalent linking group, SP1 represents a spacer group, MG1 represents a mesogen group MG in Formula (LC), and T1 represents a terminal group.

Examples of the main chain of the repeating unit represented by PC1 include groups represented by Formulae (P1-A) to (P1-D). Among these, from the viewpoints of diversity and handleability of a monomer serving as a raw material, a group represented by Formula. (P1-A) is preferable.

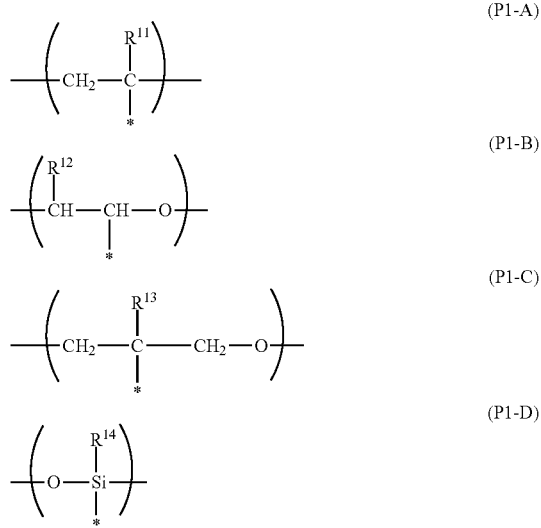

In Formulae (P1-A) to (P1-D), "*" represents a bonding position with respect to L1 in Formula (1). In Formulae (P1-A) to (P1-D), $R^{11}$, $R^{12}$, $R^{13}$, and $R^{14}$ each independently represent a hydrogen atom, a halogen atom, a cyano group, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

The divalent linking group represented by L1 is the same divalent linking group represented by LW in Formula (W1), and examples of preferable aspects thereof include —C(O)O—, —OC(O)—, —O—, —S—, —C(O)NR$^{16}$—, —NR$^{16}$C(O)—, —S(O)$_2$—, and —NR$^{16}$R$^{17}$—. In the formulae, $R^{16}$ and $R^{17}$ each independently represent a hydrogen atom or an alkyl group having 1 to 6 carbon atoms which may have a substituent (for example, the substituent W described above). In the specific examples of the divalent linking group described above, the bonding site on the left side is bonded to PC1 and the bonding site on the right side is bonded to SP1.

In a case where PC1 represents a group represented by Formula (P1-A), it is preferable that L1 represents a group represented by —C(O)O— or —C(O)NR$^{16}$—.

In a case where PC1 represents a group represented by any of Formulae (P1-B) to (P1-D), it is preferable that L1 represents a single bond.

Examples of the spacer group represented by SP1 are the same groups as those for S1 and S2 in Formula (LC), and from the viewpoint of the degree of alignment, a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. However, the alkylene group may contain —O—, —S—, —O—CO—, —CO—O—, —O—CO—O—, —O—CNR— (R represents an alkyl group having 1 to 10 carbon atoms), or —S(O)$_2$—.

From the viewpoints of easily exhibiting liquid crystallinity and the availability of raw materials, it is more preferable that the spacer group represented by SP1 has at least one structure selected from the group consisting of an oxyethylene structure, an oxypropylene structure, a polysiloxane structure, and an alkylene fluoride structure.

Here, as the oxyethylene structure represented by SP1, a group represented by *—(CH$_2$—CH$_2$O)$_{n1}$—* is preferable. In the formula, n1 represents an integer of 1 to 20, and "*" represents a bonding position with respect to L1 or MG1. From the viewpoint that the effects of the present invention are more excellent, n1 represents preferably an integer of 2 to 10, more preferably an integer of 2 to 6, and most preferably an integer of 2 to 4.

Here, a group represented by *—(CH(CH$_3$)—CH$_2$O)$_{n2}$—* is preferable as the oxypropylene structure represented by SP1. In the formula, n2 represents an integer of 1 to 3, and "*" represents a bonding position with respect to L1 or MG1.

Further, a group represented by *—(Si(CH$_3$)$_2$—O)$_{n3}$—* is preferable as the polysiloxane structure represented by SP1. In the formula, n3 represents an integer of 6 to 10, and "*" represents a bonding position with respect to L1 or MG1.

Further, a group represented by *—(CF$_2$—CF$_2$)$_{n4}$—* is preferable as the alkylene fluoride structure represented by SPL In the formula, n4 represents an integer of 6 to 10, and "*" represents a bonding position with respect to L1 or MG1.

Examples of the terminal group represented by T1 include a hydrogen atom, a halogen atom, a cyano group, a nitro group, a hydroxy group, —SH, a carboxy group, a boronic acid group, —SO$_3$H—, —PO$_3$H$_2$—, —NR$^{11}$R$^{12}$ ($R^{11}$ and $R^{12}$ each independently represent a hydrogen atom, a substituted or unsubstituted alkyl group having 1 to 10 carbon atoms, a cycloalkyl group, or an aryl group), an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a crosslinkable group-containing group.

Examples of the crosslinkable group-containing group include -L-CL. L represents a single bond or a divalent linking group. Specific examples of the linking group are the same as those for LW and SPW described above. CL represents a crosslinkable group, and examples thereof include a group represented by Q1 or Q2, and a crosslinkable group represented by Formulae (P-1) to (P-30) is preferable. Further, T1 may represent a group obtained by combining two or more of these groups.

From the viewpoint that the effects of the present invention are more excellent, T1 represents preferably an alkoxy group having 1 to 10 carbon atoms, more preferably an alkoxy group having 1 to 5 carbon atoms, and still more preferably a methoxy group. These terminal groups May be further substituted with these groups or the polymerizable groups described in JP2010-244038A.

From the viewpoint that the effects of the present invention are more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the degree of alignment of the light absorption anisotropic layer is further improved. Here, "main chain" in T1 denotes the longest molecular chain bonded to M1, and the number of hydrogen atoms is not included in the number of atoms in the main chain of T1. For example, the number of atoms in the main chain is 4 in a case where T1 represents an n-butyl group, and the number of atoms in the main chain is 3 in a case where T1 represents a sec-butyl group.

The content of the repeating unit (1) is preferably in a range of 40% to 100% by mass and more preferably in a range of 50% to 95% by mass with respect to all the repeating units (100% by mass) of the polymer liquid crystal compound.

In a case where the content of the repeating unit (1) is 40% by mass or greater, an excellent light absorption anisotropic layer can be obtained due to satisfactory aligning properties. Further, in a case where the content of the repeating unit (1) is 100% by mass or less, an excellent light absorption anisotropic layer can be obtained due to satisfactory aligning properties.

The polymer liquid crystal compound may have only one or two or more kinds of repeating units (1). In a case where the polymer liquid crystal compound has two or more kinds of repeating units (1), the content of the repeating unit (1) denotes the total content of the repeating units (1).

In Formula (1), a difference ($|\log P_1 - \log P_2|$) between the log P value of PC1, L1, and SP1 (hereinafter, also referred to as "$\log P_1$") and the log P value of MG1 (hereinafter, also referred to as "$\log P_2$") is 4 or greater. Further, from the viewpoint of further improving the degree of alignment of the light absorption anisotropic layer, the difference thereof is more preferably 4.25 or greater and still more preferably 4.5 or greater.

Further, from the viewpoints of adjusting the liquid crystal phase transition temperature and the synthetic suitability, the upper limit of the difference is preferably 15 or less, more preferably 12 or less, and still more preferably 10 or less.

Here, the log P value is an index for expressing the properties of the hydrophilicity and hydrophobicity of a chemical structure and is also referred to as a hydrophilic-hydrophobic parameter. The log P value can be calculated using software such as ChemBioDrawUltra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver. 4.1.07) is employed as the log P value unless otherwise specified.

The $\log P_1$ denotes the log P value of PC1, L1, and SP1 as described above. The expression "log P value of PC1, L1, and SP1" denotes the log P value of a structure in which PC1, L1, and SP1 are integrated and is not the sum of the log P values of PC1, L1, and SP1. Specifically; the log P1 is calculated by inputting a series of structural formulae of PC1 to SP1 in Formula (1) into the above-described software.

Here, in the calculation of the $\log P_1$, in regard to the part of the group represented by PC1 in the series of structural formulae of PC1 to SP1, the structure of the group itself represented by PC1 (for example, Formulae (P1-A) (P1-D) described above) may be used or a structure of a group that can be PC1 after polymerization of a monomer used to obtain the repeating unit represented by Formula (1) may be used.

Here, specific examples of the latter (the group that can be PC1) arc as follows. In a ease where PC1 is obtained by polymerization of (meth)acrylic acid ester, PC1 represents a group represented by $CH_2=C(R^1)-$ ($R^1$ represents a hydrogen atom or a methyl group), Further, PC1 represents ethylene glycol in a ease where PC1 is obtained by polymerization of ethylene glycol, and PC1 represents propylene glycol in a case where PC1 is obtained by polymerization of propylene glycol. Further, in a case where PC1 is obtained by polycondensation of silanol, PC1 represents silanol (a compound represented by Formula $Si(R^2)_3(OH)$, and a plurality of $R^2$'s each independently represent a hydrogen atom or an alkyl group, where at least one of the plurality of R2's represents an alkyl group).

The $\log P_1$ may be smaller than the $\log P_2$ or greater than the $\log P_2$ in a case where the difference between $\log P_1$ and $\log P_1$ described above is 4 or greater.

Here, the log P value of a general mesogen group (the $\log P_2$ described above) tends to be in a range of 4 to 6. In a case where the $\log P_1$ is smaller than the $\log P_2$, the value of $\log P_1$ is preferably 1 or less and more preferably 0 or less. Further, in a ease where the $\log P_1$ is greater than the $\log P_2$, the value of $\log P_1$ is preferably 8 or greater and more preferably 9 or greater.

In a case where PC1 in Formula (1) is obtained by polymerization of (meth)acrylic acid ester and the $\log P_1$ is smaller than the $\log P_2$, the log P value of SP1 in Formula (1) is preferably 0.7 or less and more preferably 0.5 or less. Further, in a case where PC1 in Formula (1) is obtained by polymerization of (meth)acrylic acid ester and the $\log P_1$ is greater than the $\log P_2$, the log P value of SN in Formula (1) is preferably 3.7 or greater and more preferably 4.2 or greater.

Further, examples of the structure having a log P value of 1 or less include an oxyethylene structure and an oxypropylene structure. Examples of the structure having a log P value of 6 or greater include a polysiloxane structure and an alkylene fluoride structure.

From the viewpoint of improving the degree of alignment, it is preferable that the polymer liquid crystal compound has a repeating unit having an electron-donating property and/or an electron-withdrawing property at the terminal. More specifically, it is more preferable that the polymer liquid crystal compound has a repeating unit (21) containing a mesogen group and an electron-withdrawing group present at the terminal of the mesogen group and having a σp value of greater than 0 and a repeating unit (22) containing a mesogen group and a group present at the terminal of the mesogen group and having a σp value of 0 or less. As described above, in a case where the polymer liquid crystal compound has the repeating unit (21) and the repeating unit (22), the degree of alignment of the light absorption anisotropic layer to be formed using the polymer liquid crystal compound is improved as compared with a case where the polymer liquid crystal compound has only one of the repeating unit (21) or the repeating unit (22). The details of the reason for this are not clear, but it is assumed as follows.

That is, it is assumed that since the opposite dipole moments generated in the repeating unit (21) and the repeating unit (22) interact between molecules, the interaction between the mesogen groups in the minor axis direction is strengthened, and the orientation in which the liquid crystals are aligned is more uniform, and as a result, the degree of order of the liquid crystals is considered to be high. In this manner, it is assumed that the aligning properties of the dichroic substance are enhanced, and thus the degree of alignment of the light absorption anisotropic layer to be formed increases.

Further, the repeating units (21) and (22) may be the repeating units represented by Formula (1).

The repeating unit (21) contains a mesogen group and an electron-withdrawing group present at the terminal of the mesogen group and having a σp value of greater than 0.

The electron-withdrawing group is a group that is positioned at the terminal of the mesogen group and has a σp value of greater than 0. Examples of the electron-withdrawing group (a group having a σp value of greater than 0) include a group represented by EWG in Formula (LCP-21) described below, and specific examples thereof are also the same as those described below.

The σp value of the electron-withdrawing group described above is greater than 0. From the viewpoint of further increasing the degree of alignment of the light absorption anisotropic layer, the σp value is preferably 0.3 or greater and more preferably 0.4 or greater. From the viewpoint that the uniformity of alignment is excellent, the upper limit of the σp value of the electron-withdrawing group is preferably 1.2 or less and more preferably 1.0 or less.

The σp value is a Hammett's substituent constant σp value (also simply abbreviated as a "σp value") and is a parameter showing the strength of electron-donating property and the electron-withdrawing property of a substituent, which numerically expresses the effect of the substituent on the acid dissociation equilibrium constant of substituted benzoic acid. The Hammett's substituent constant σp value in the present specification denotes the substituent constant σ in a case where the substituent is positioned at the para position of benzoic acid.

As the Hammett's substituent constant σp value of each group in the present specification, the values described in the document "Hansch et al., Chemical Reviews, 1991, Vol. 91, No. 2, pp. 165 to 195" are employed. Further, the Hammett's substituent constant σp values can be calculated for groups whose Hammett's substituent constant σp values are not described in the document described above using software "ACD/ChemSketch (ACD/Labs 8.00 Release Product Version: 8.08)" based on a difference between the pKa of benzoic acid and the pKa of a benzoic acid derivative having a substituent at the para position.

The repeating unit (21) is not particularly limited as long as the repeating unit (21) contains, at a side chain thereof, a mesogen group and an electron-withdrawing group present at the terminal of the mesogen group and having a σp value of greater than 0, and from the viewpoint of further increasing the degree of alignment of the light absorption anisotropic layer, it is preferable that the repeating unit (21) is a repeating unit represented by Formula (LCP-21).

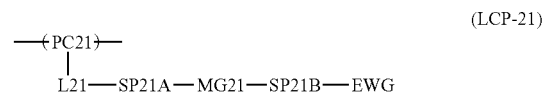

(LCP-21)

In Formula (LCP-21), PC21 represents the main chain of the repeating unit and more specifically the same structure as that for PC1 in Formula (1), L21 represents a single bond or a divalent linking group and more specifically the same structure as that for L1 in Formula (1), SP21A and SP21B each independently represent a single bond or a spacer group and more specifically the same structure as that for SP1 in Formula (1), MG21 represents a mesogen structure and more specifically a mesogen group MG in Formula (LC), and EWG represents an electron-withdrawing group having a σp value of greater than 0.

The spacer group represented by SP21A and SP21B is a group represented by Formulae S1 and S2, and a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. Here, the alkylene group may contain —O—, —O—CO—, —CO—O—, or —O—CO—O—.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

It is preferable that SP21B represents a single bond or a linear or branched alkylene group having 2 to 20 carbon atoms. Here, the alkylene group may contain —O—, —O—CO—, —CO—O—, or —O—CO—O—.

Among these, from the viewpoint of farther increasing the degree of alignment of the light absorption anisotropic layer, a single bond is preferable as the spacer group represented by SP21B. In other words, it is preferable that the repeating unit 21 has a structure in which EWG that represents an electron-withdrawing group in Formula (LCP-21) is directly linked to MG21 that represents a mesogen group in Formula (LCP-21). In this manner, it is assumed that in a case where the electron-withdrawing group is directly linked to the mesogen group, the intermolecular interaction due to an appropriate dipole moment works more effectively in the polymer liquid crystal compound, and the orientation in which the liquid crystals are aligned is more uniform, and as a result, the degree of order of the liquid crystals and the degree of alignment are considered to be high.

EWG represents an electron-withdrawing group having a σp value of greater than 0. Examples of the electron-withdrawing group having a σp value of greater than 0 include an ester group (specifically, a group represented by *—C(O)O—$R^E$), a (meth)acryloyl group, a (meth)acryloyloxy group, a carboxy group, a cyano group, a nitro group, a sulfo group, —S(O)(O)—$OR^E$, —S(O)(O)—$R^E$, —O—S(O)(O)—$R^E$, an acyl group (specifically, a group represented by *—C(O)$R^E$), an acyloxy group (specifically, a group represented by *—OC(O)$R^E$), an isocyanate group (—N=C(O)), *—C(O)N($R^F$)$_2$, a halogen atom, and an alkyl group substituted with any of these groups (preferably having 1 to 20 carbon atoms). In each of the above-described groups, * represents a bonding position with respect to SP21B. $R^E$ represents an alkyl group having 1 to 20 carbon atoms (preferably 1 to 4 carbon atoms and more preferably 1 or 2 carbon atoms). $R^F$'s each independently represent a hydrogen atom or an alkyl group having 1 to 20 carbon atoms (preferably 1 to 4 carbon atoms and more preferably 1 or 2 carbon atoms).

Among the above-described groups, from the viewpoint of further exhibiting the effects of the present invention, it is preferable that EWG represents a group represented by *—C(O)—O—$R^E$, a (meth)acryloyloxy group, a cyano group, or a nitro group.

From the viewpoint that the polymer liquid crystal compound and the dichroic substance can be uniformly aligned while a high degree of alignment of the light absorption anisotropic layer is maintained, the content of the repeating unit (21) is preferably 60% by mass or less, more preferably 50% by mass or less, and particularly preferably 45% by mass or less with respect to all the repeating units (100% by mass) of the polymer liquid crystal compound.

From the viewpoint of further exhibiting the effects of the present invention, the lower limit of the content of the repeating unit (21) is preferably 1% by mass or greater and more preferably 3% by mass or greater with respect to all the repeating units (100% by mass) of the polymer liquid crystal compound.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (21), In a case where the polymer liquid crystal compound has two or more kinds of repeating units (21), there is an advantage in that the solubility of the polymer liquid crystal compound in a solvent is improved and the liquid crystal phase transition temperature is easily adjusted. In a case where the polymer liquid crystal compound has two or more kinds of repeating units (21), it is preferable that the total amount thereof is in the above-described ranges.

In the case where the polymer liquid crystal compound has two or more kinds of repeating units (21), a repeating unit (21) that does not contain a crosslinkable group in EWG and a repeating unit (21) that contains a polymerizable group in EWG may be used in combination.

In this manner, the curing properties of the light absorption anisotropic layer are further improved. Further, preferred examples of the crosslinkable group include a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group.

In this case, from the viewpoint of the balance between the curing properties and the degree of alignment of the light absorption anisotropic layer, the content of the repeating unit (21) containing a polymerizable group in EWG is preferably in a range of 1% to 30% by mass with respect to all the repeating units (100% by mass) of the polymer liquid crystal compound.

Hereinafter, examples of the repeating unit (21) will be described, but the repeating unit (21) is not limited to the following repeating units.

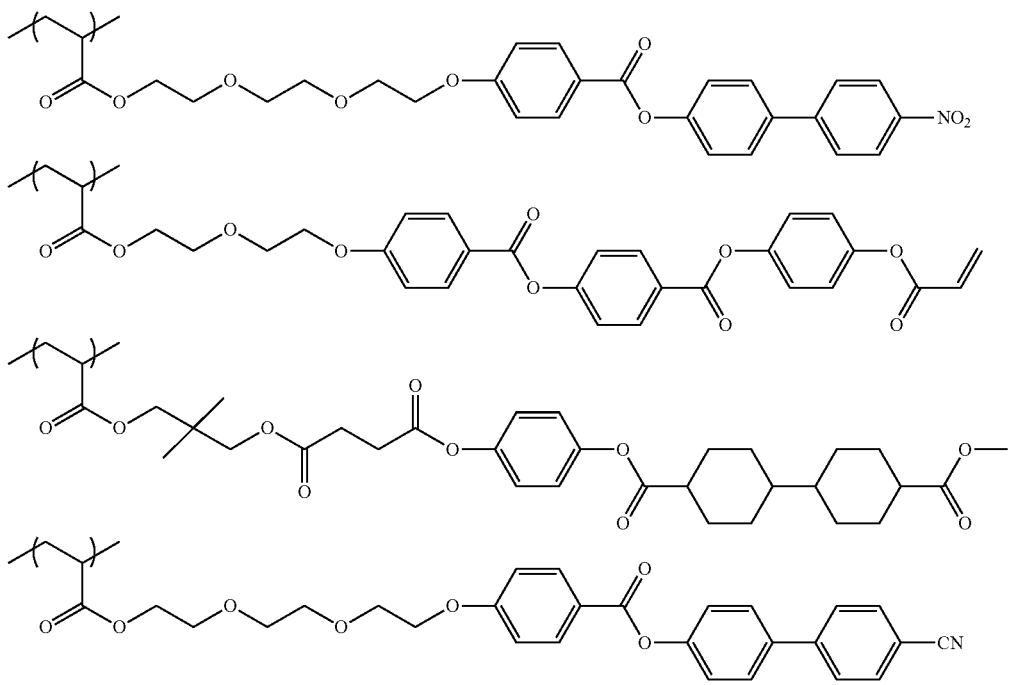

-continued
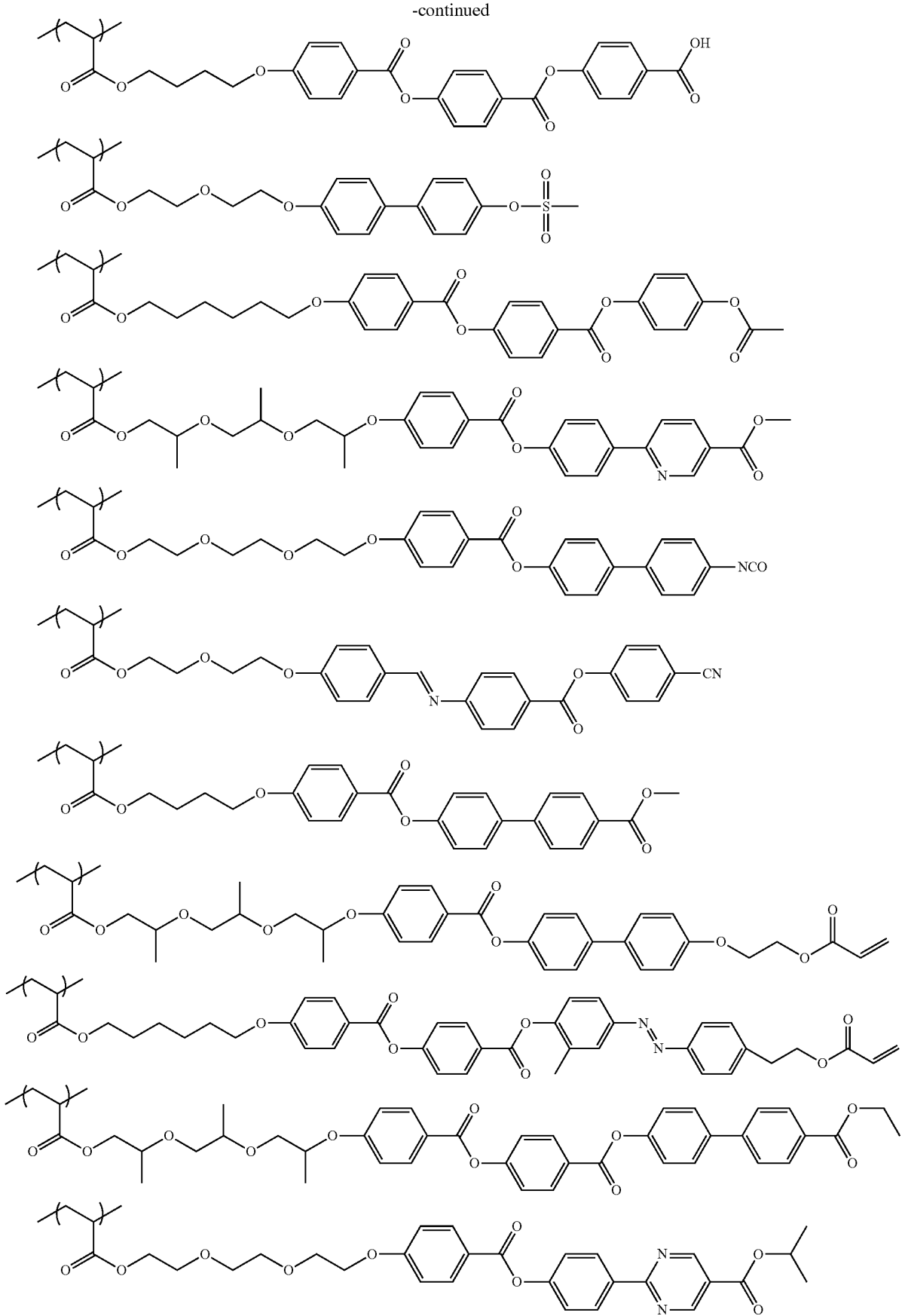

-continued

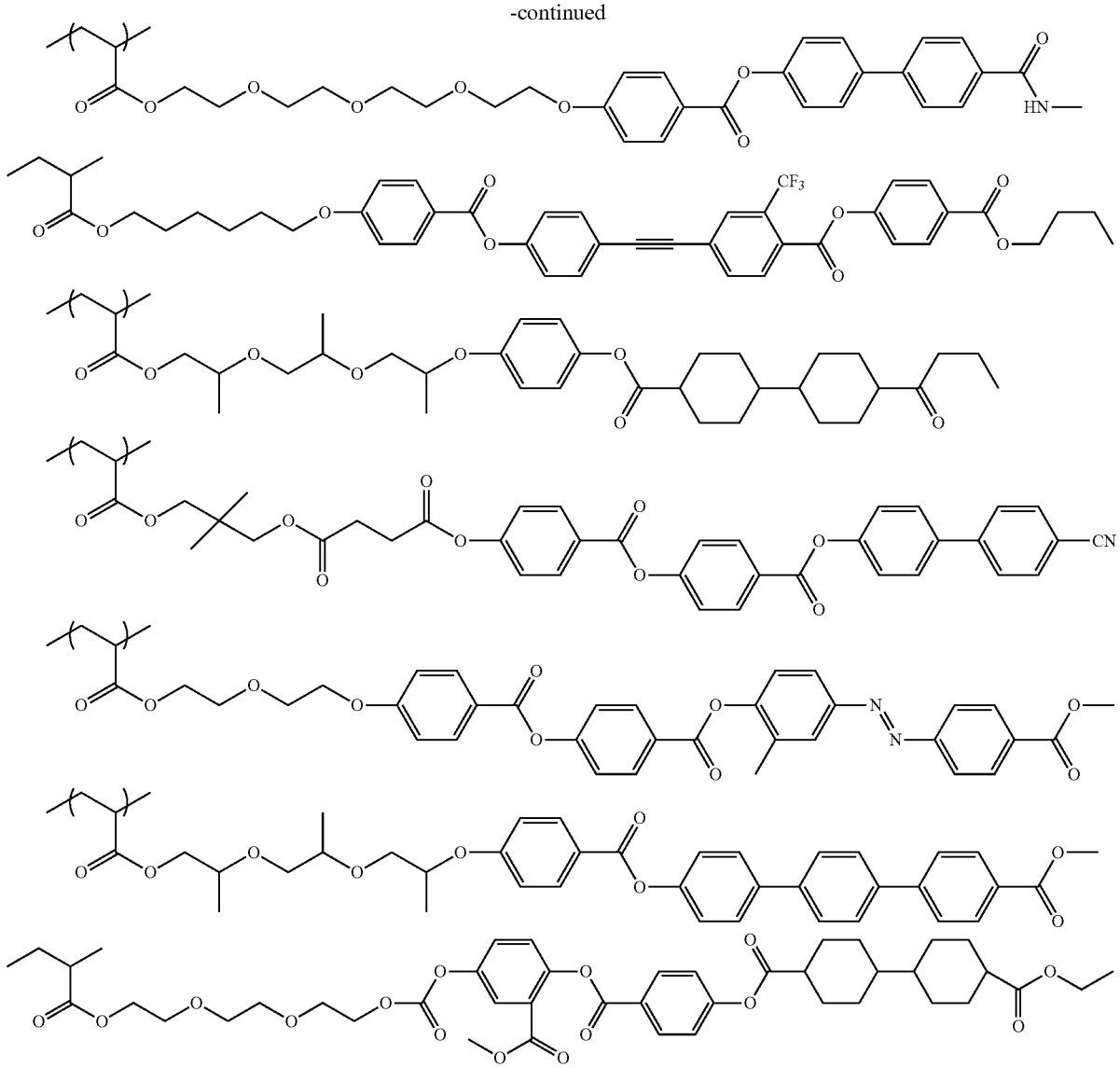

As a result of intensive examination on the composition (content ratio) and the electron-donating property and the electron-withdrawing property of the terminal groups of the repeating unit (21) and the repeating unit (22), the present inventors found that the degree of alignment of the light absorption anisotropic layer is further increased by decreasing the content ratio of the repeating unit (21) in a case where the electron-withdrawing property of the electron-withdrawing group of the repeating unit (21) is high (that is, in a case where the σp value is large), and the degree of alignment of the light absorption anisotropic layer is further increased by increasing the content ratio of the repeating unit (21) in a case where the electron-withdrawing property of the electron-withdrawing group of the repeating unit (21) is low (that is, in a case where the σp value is close to 0).

The details of the reason for this are not clear, but it is assumed as follows. That is, it is assumed that since the intermolecular interaction due to an appropriate dipole moment works in the polymer liquid crystal compound, the orientation in which the liquid crystals are aligned is more uniform, and as a result, the degree of order of the liquid crystals and the degree of alignment of the light absorption anisotropic layer are considered to be high.

Specifically, the product of the σp value of the electron-withdrawing group (EWG in Formula (LCP-21)) in the repeating unit (21) and the content ratio (on a mass basis) of the repeating unit (21) in the polymer liquid crystal compound is preferably in a range of 0.020 to 0.150, more preferably in a range of 0.050 to 0.130, and still more preferably in a range of 0.055 to 0.125. In a case where the product is in the above-described ranges, the degree of alignment of the light absorption anisotropic layer is further increased.

The repeating unit (22) contains a mesogen group and a group present at the terminal of the mesogen group and having a σp value of 0 or less. In a case where the polymer liquid crystal compound has the repeating unit (22), the polymer liquid crystal compound and the dichroic substance can be uniformly aligned.

The mesogen group is a group showing the main skeleton of a liquid crystal molecule that contributes to liquid crystal formation, and the details thereof are as described in the section of MG in Formula (LCR-22) described below, and specific examples thereof are also the same as described below.

The above-described group is positioned at the terminal of the mesogen group and has a σp value of 0 or less. Examples of the above-described group (a group having a σp value of 0 or less) include a hydrogen atom having a σp value of 0 and a group (electron-donating group) having a σp value of less than 0 and represented by T22 in Formula (LCP-22) described below. Among the above-described groups, specific examples of the group having a σp value of less than 0 (electron-donating group) are the same as those for T22 in Formula (LCP-22) described below.

The σp value of the above-described group is 0 or less, and from the viewpoint that the uniformity of alignment is more excellent, the σp value is preferably less than 0, more preferably −0.1 or less, and particularly preferably −0.2 or less. The lower limit of the σp value of the above-described group is preferably −0.9 or greater and more preferably −0.7 or greater.

The repeating unit (22) is not particularly limited as long as the repeating unit (22) contains, at a side chain thereof, a mesogen group and a group present at the terminal of the mesogen group and having a σp value of 0 or less, and from the viewpoint of further increasing the uniformity of alignment of liquid crystals, it is preferable that the repeating unit (22) is a repeating unit represented by Formula (PCP-22) which does not correspond to a repeating unit represented by Formula (LCP-21).

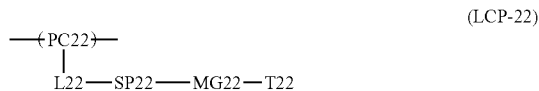

(LCP-22)

In Formula (LCP-22), PC22 represents the main chain of the repeating unit and more specifically the same structure as that for PC1 in Formula (1), L22 represents a single bond or a divalent linking group and more specifically the same structure as that for L1 in Formula (1), SP22 represents a spacer group and more specifically the same structure as that for SP1 in Formula (1), MG22 represents a mesogen structure and more specifically the same structure as the mesogen group MG in Formula (LC), and T22 represents an electron-donating group having a Hammett's substituent constant σp value of less than 0.

T22 represents an electron-donating group having a σp value of less than 0. Examples of the electron-donating group having a σp value of less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T22 is 20 or less, the degree of alignment of the light absorption anisotropic layer is further improved. Here, "main chain" in T22 denotes the longest molecular chain bonded to MG-22, and the number of hydrogen atoms is not included in the number of atoms in the main chain of T22. For example, the number of atoms in the main chain is 4 in a case where T22 represents an n-butyl group, and the number of atoms in the main chain is 3 in a case where T22 represents a sec-butyl group.

Hereinafter, examples of the repeating unit (22) will be described, but the repeating unit (22) is not limited to the following repeating units.

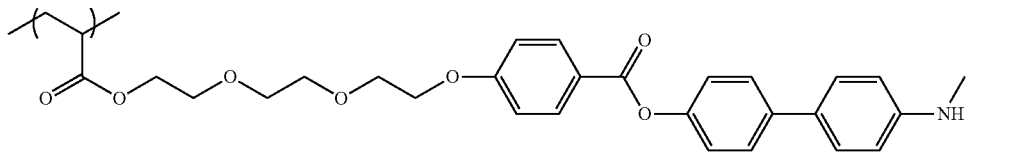

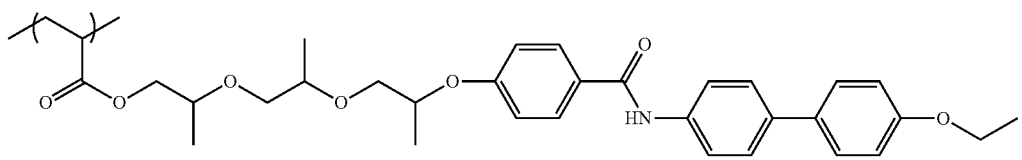

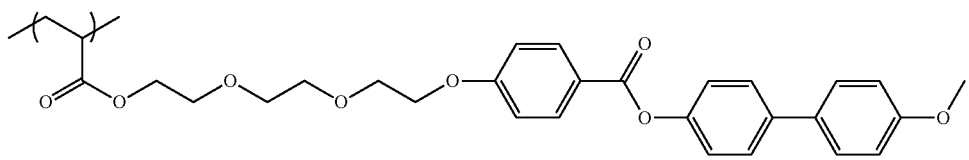

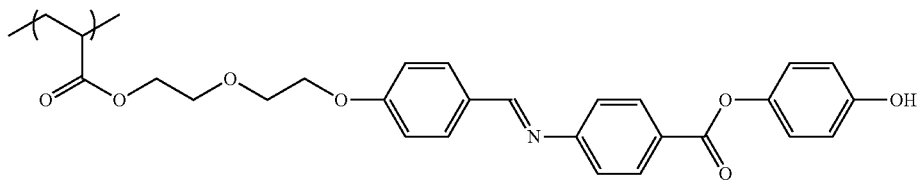

-continued
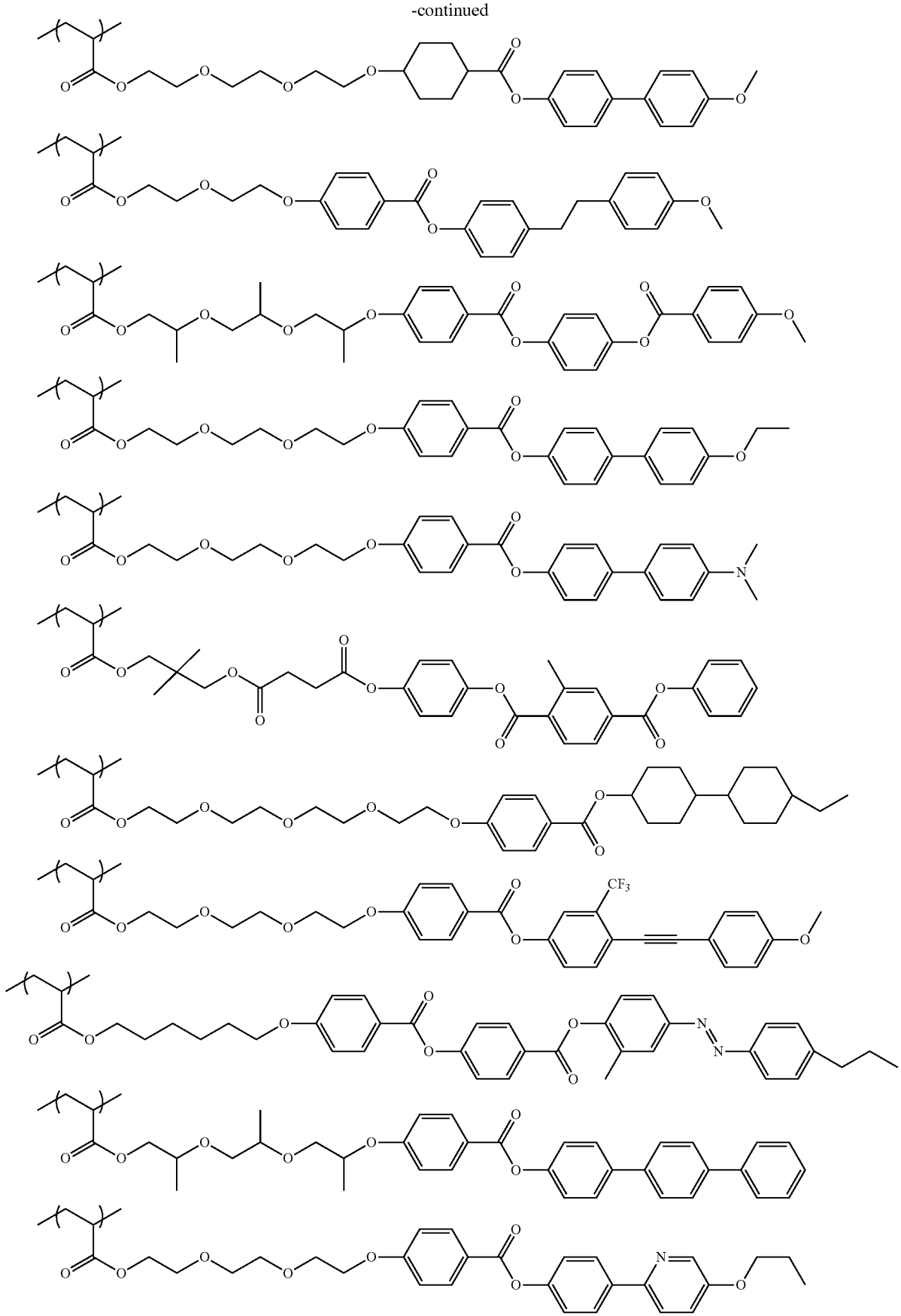

-continued

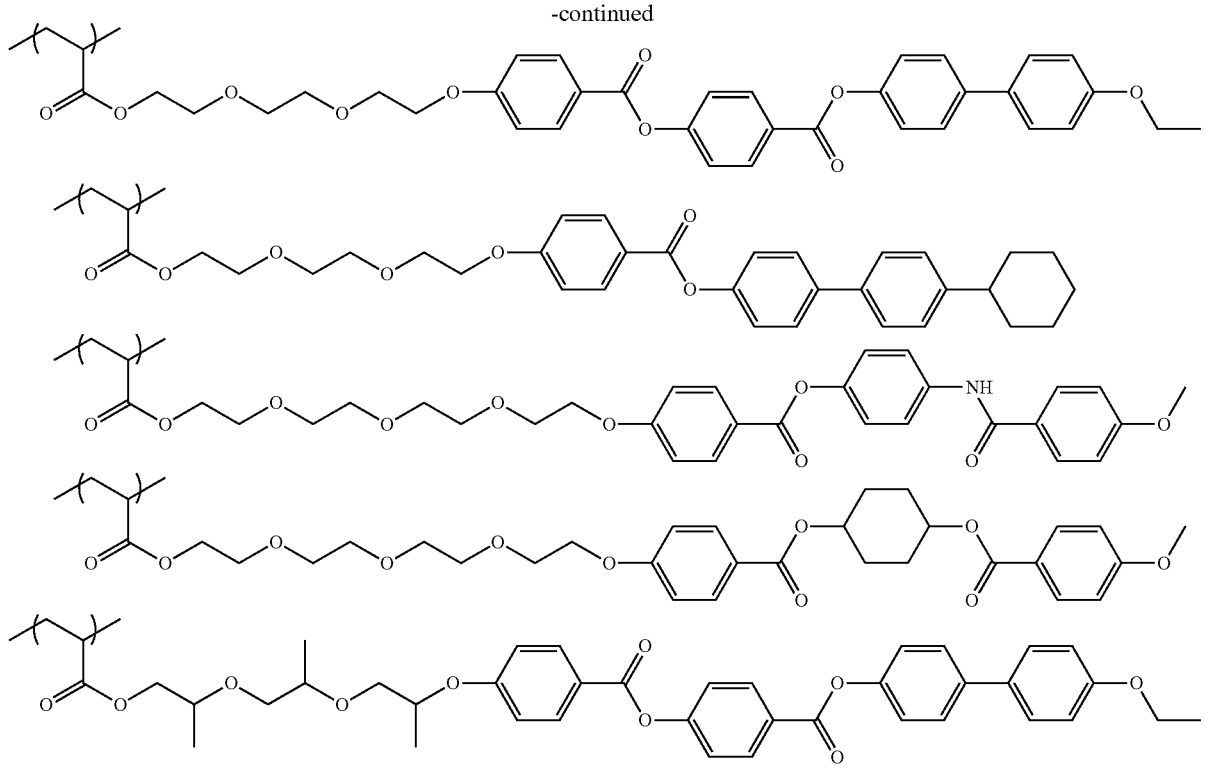

It is preferable that the structures of the repeating unit (21) and the repeating unit (22) have a part in common. It is assumed that the liquid crystals are uniformly aligned as the structures of repeating units are more similar to each other. In this manner, the degree of alignment of the light absorption anisotropic layer is further improved.

Specifically, from the viewpoint of further increasing the degree of alignment of the light absorption anisotropic layer, it is preferable to satisfy at least one of a condition that SP21A of Formula (LCP-21) has the same structure as that for SP22 of Formula (LCP-22), a condition that MG21 of Formula (LCP-21) has the same structure as that for MG22 of Formula. (LCP-22), or a condition that L21 of Formula (LCP-21) has the same structure as that for L22 of Formula (LCP-22), more preferable to satisfy two or more of the conditions, and particularly preferable to satisfy all the conditions.

From the viewpoint that the uniformity of alignment is excellent, the content of the repeating unit (22) is preferably 50% by mass or greater, more preferably 55% by mass or greater, and still more preferably 60% by mass or greater with respect to all the repeating units (100% by mass) of the polymer liquid crystal compound.

From the viewpoint of improving the degree of alignment, the upper limit of the content of the repeating unit (22) is preferably 99% by mass or less and more preferably 97% by mass or less with respect to all the repeating units (100% by mass) of the polymer liquid crystal compound.

The polymer liquid crystal compound may have only one or two or more kinds of repeating units (22). In a case where the polymer liquid crystal compound has two or more kinds of repeating units (22), there is an advantage in that the solubility of the polymer liquid crystal compound in a solvent is improved and the liquid crystal phase transition temperature is easily adjusted. In a case where the polymer liquid crystal compound has two or more kinds of repeating units (22), it is preferable that the total amount thereof is in the above-described ranges.

From the viewpoint of improving the solubility in a general-purpose solvent, the polymer liquid crystal compound may have a repeating unit (3) that does not contain a mesogen. Particularly in order to improve the solubility while suppressing a decrease in the degree of alignment, it is preferable that the polymer liquid crystal compound has a repeating unit having a molecular weight of 280 or less as the repeating unit (3) that does not contain a mesogen. As described above, the reason why the solubility is improved while a decrease in the degree of alignment is suppressed by allowing the polymer liquid crystal compound to have a repeating unit having a molecular weight of 280 or less which does not contain a mesogen is assumed as follows.

That is, it is considered that in a case where the polymer liquid crystal compound has a repeating unit (3) that does not contain a mesogen in a molecular chain thereof; since a solvent is likely to enter the polymer liquid crystal compound, the solubility is improved, but the degree of alignment is decreased in the case of the nonmesogenic repeating unit (3). However, it is assumed that since the molecular weight of the repeating unit is small, the alignment of the repeating unit (1), the repeating unit (21), or the repeating unit (22) containing a mesogen group is unlikely to be disturbed, and thus a decrease in the degree of alignment can be suppressed.

It is preferable that the repeating unit (3) is a repeating unit having a molecular weight of 280 or less.

The molecular weight of the repeating unit (3) does not indicate the molecular weight of the monomer used to obtain the repeating unit (3), but indicates the molecular weight of the repeating unit (3) in a state of being incorporated into the polymer liquid crystal compound by polymerization of the monomer.

The molecular weight of the repeating unit (3) is preferably 280 or less, more preferably 180 or less, and still more preferably 100 or less. The lower limit of the molecular weight of the repeating unit (3) is commonly 40 or greater and more preferably 50 or greater. In a case where the molecular weight of the repeating unit (3) is 280 or less, a light absorption anisotropic layer having excellent solubility of the polymer liquid crystal compound and a high degree of alignment can be obtained.

Specific examples of the repeating unit (3) include a repeating unit (hereinafter, also referred to as a "repeating unit (3-1)") that does not contain a crosslinkable group (for example, an ethylenically unsaturated group) and a repeating unit (hereinafter, also referred to as a "repeating unit (3-2)") that contains a crosslinkable group.

Specific examples of the monomer used for polymerization of the repeating unit (3-1) include acrylic acid [72.1], α-alkylacrylic acids (such as methacrylic acid [86.1] and itaconic acid [130.1]), esters and amides derived therefrom (such as N-i-propylaaylamide [113.2], N-n-butylacrylamide [127.2], N-t-butylacrylamide [127.2], N,N-dimethylacrylamide [99.1], N-methylmethacrylamide [99.1], acrylamide [71.1], methacrylamide [85.1], diacetoneacrylamide [169.2], acryloylmorpholine [141.2], N-methylol acrylamide [101.1], N-methylol methacrylamide [115.1], methyl acrylate [86.0], ethyl acrylate [100.1], hydroxyethyl acrylate [116.1], n-propyl acrylate [114.1], i-propyl acrylate [114.2], 2-hydroxypropyl acrylate [130.1], 2-methyl-2-nitropropyl acrylate [173.2], n-butyl acrylate [128.2], i-butyl acrylate [128.2], t-butyl acrylate [128.2], t-pentyl acrylate [142.2], 2-methoxyethyl acrylate [130.1], 2-ethoxyethyl acrylate [144.2], 2-ethoxyethoxyethyl acrylate [188.2], 2,2,2-trifluoroethyl acrylate [154.1], 2,2-dimethylbutyl acrylate [156.2], 3-methoxybutyl acrylate [158.2], ethyl carbitol acrylate [188.2], phenoxyethyl acrylate [192.2], n-pentyl acrylate [142.2], n-hexyl acrylate [156.2], cyclohexyl acrylate [154.2], cyclopentyl acrylate [140.2], benzyl acrylate [162.2], n-octyl acrylate [184.3], 2-ethylhexyl acrylate [184.3], 4-methyl-2-propylpentyl acrylate [198.3], methyl methacrylate [100.1], 2,2,2-trifluoroethyl methacrylate [168.1], hydroxyethyl methacrylate [130.1.], 2-hydroxypropyl methacrylate [144.2], n-butyl methacrylate [142.2], i-butyl methacrylate [142.2], sec-butyl methacrylate [142,2], n-octyl methacrylate [198.3], 2-ethylhexyl methacrylate [198.3], 2-methoxyethyl methacrylate [144.2], 2-ethoxyethyl methacrylate [158.2], benzyl methacrylate [176.2], 2-norbornyl methyl methacrylate [194.3], 5-norbornen-2-ylmethyl methacrylate [194,3], and dimethylaminoethyl methacrylate [157.2]), vinyl esters (such as vinyl acetate [86.1]), esters derived from maleic acid or fumaric acid (such as dimethyl maleate [144.1] and diethyl fumarate [172.2]), maleimides (such as N-phenylmaleimide [173.21), maleic acid [11.6.1], fumaric acid [116.1], p-styrenesulfonic acid [184.1], acrylonitrile [53.1], methacrylonitrile [67.1], diener (such as butadiene [54.1], cyclopentadiene [66.1], and isoprene [68.1]), aromatic vinyl compounds (such as styrene [104.2], p-chlorostyrene [138.6], t-butylstyrene [160.3], and α-methylstyrene [118.2]), N-vinylpyrrolidone 111.1], N-vinyloxazolidone [113.1], N-vinyl succinimide [125,1], N-vinylformamide [71.1], N-vinyl-N-methylformamide [85.1], N-vinylacetamide [85.1], N-vinyl-N-methytacetamide [99.1], 1-vinylimidazole [94.1], 4-vinylpyridine [105.2], vinylsulfonic acid [108.1], sodium vinyl sulfonate [130.2], sodium allyl sulfonate [144.1], sodium methallyl sulfonate [158.2], vinylidene chloride [96.9], vinyl alkyl ethers (such as methyl vinyl ether [58.1]), ethylene [28.0], propylene [42.1], 1-butene [56.1], and isobutene [56.1].

Further, the numerical values in the parentheses denote the molecular weights of the monomers.

The above-described monomers may be used alone or in combination of two or more kinds thereof.

Among the above-described monomers, acrylic acid, α-alkylacrylic acids, esters and amides derived therefrom, acrylonitrile, methacrylonitrile, and aromatic vinyl compounds are preferable.

As monomers other than the above-described monomers, the compounds described in Research Disclosure No. 1955 (July, 1980) can be used.

Hereinafter, specific examples of the repeating unit (3-1) and the molecular weights thereof will be described, but the present invention is not limited to these specific examples.

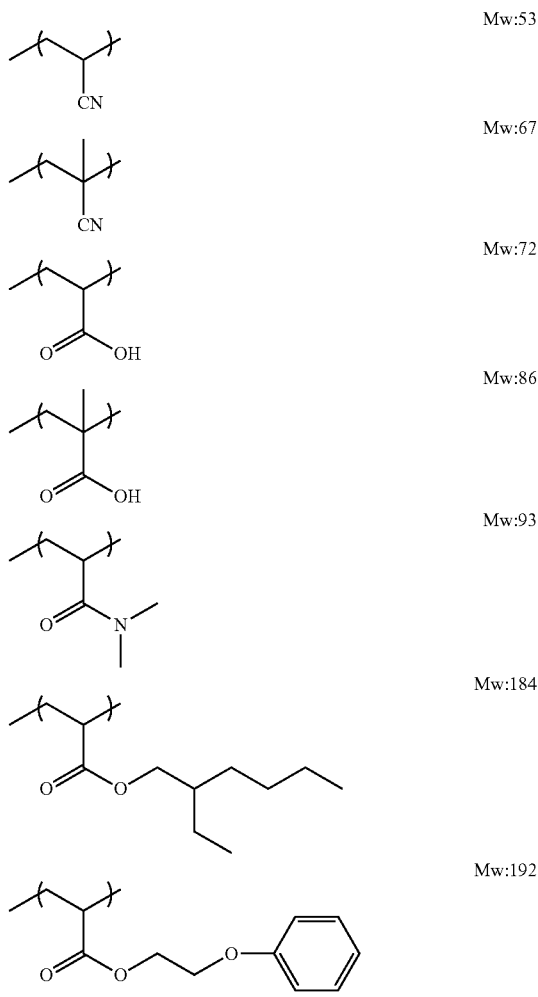

Specific examples of the crosslinkable group in the repeating unit (3-2) include the crosslinkable groups represented by Formulae (P-1) to (P-30). Among these, a vinyl group, a butadiene group, a (meth)acryl group, a (meth) acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group are more preferable.

From the viewpoint of easily performing polymerization, it is preferable that the repeating unit (3-2) is a repeating unit represented by Formula (3).

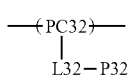
(3)

In Formula (3), PC32 represents the main chain of the repeating unit and more specifically the same structure as that for PC1 in Formula (1), L32 represents a single bond or a divalent linking group and more specifically the same structure as that for L1 in Formula (1), and P32 represents a crosslinkable group represented by any of Formulae (P-1) to (P-30).

Hereinafter, specific examples of the repeating unit (3-2) and the weight-average molecular weights (Mw) thereof will be described, but the present invention is not limited to such specific examples.

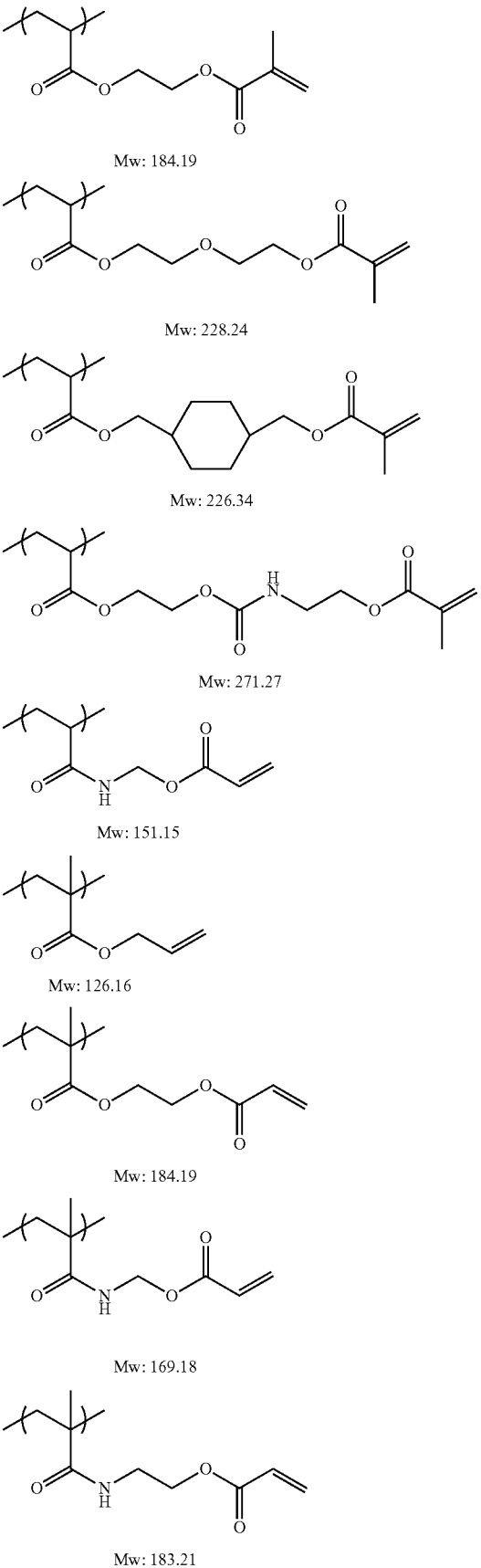

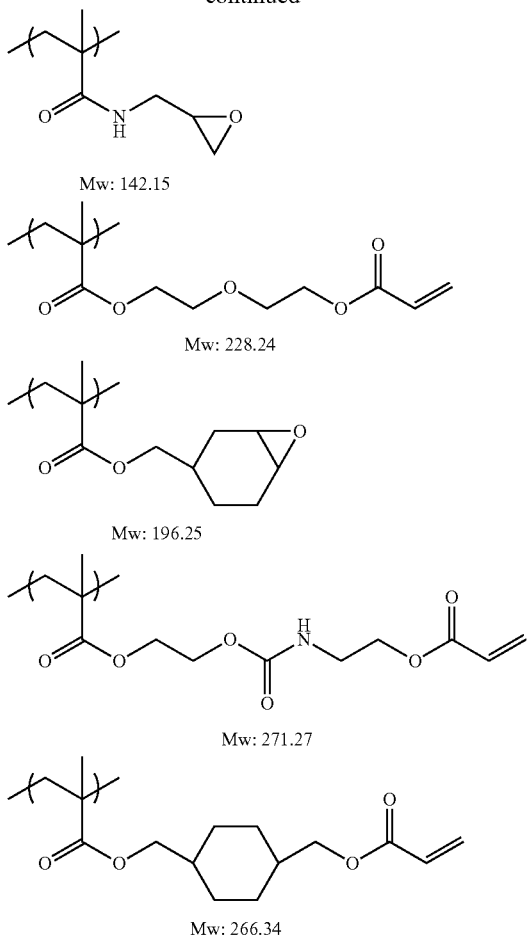

Mw: 142.15

Mw: 228.24

Mw: 196.25

Mw: 271.27

Mw: 266.34

The content of the repeating unit (3) is preferably less than 14% by mass, more preferably 7% by mass or less, and still more preferably 5% by mass or less with respect to 100% by mass of all the repeating units of the polymer liquid crystal compound. The content of the repeating unit (3) is preferably 2% by mass or greater and more preferably 3% by mass or greater with respect to all the repeating units (100% by mass) of the polymer liquid crystal compound. In a case where the content of the repeating unit (3) is less than 14% by mass, the degree of alignment of the light absorption anisotropic layer is further improved. In a case where the content of the repeating unit (3) is 2% by mass or greater, the solubility of the polymer liquid crystal compound is further improved.

The polymer liquid crystal compound may have only one or two or more kinds of repeating units (3). In a case where the polymer liquid crystal compound has two or more kinds of repeating units (3), it is preferable that the total amount thereof is in the above-described ranges.

From the viewpoint of improving the adhesiveness and planar uniformity, the polymer liquid crystal compound may have a repeating unit (4) having a flexible structure with a long molecular chain (SP4 in Formula (4) described below). The reason for this is assumed as follows.

That is, in a case where the polymer liquid crystal compound has such a flexible structure having a long molecular chain, entanglement of the molecular chains constituting the polymer liquid crystal compound is likely to occur, and aggregation destruction of the light absorption anisotropic layer (specifically, destruction of the light absorption anisotropic layer) is suppressed. As a result, the adhesiveness between the light absorption anisotropic layer and the underlayer (for example, the base material or the alignment layer) is assumed to be improved. Further, it is considered that a decrease in planar uniformity occurs due to the low compatibility between the dichroic substance and the polymer liquid crystal compound. That is, it is considered that in a case where the compatibility between the dichroic substance and the polymer liquid crystal compound is not sufficient, a planar defect (alignment defect) having the dichroic substance to be precipitated as a nucleus occurs. Meanwhile, it is assumed that in the case where the polymer liquid crystal compound has such a flexible structure having a long molecular chain, a light absorption anisotropic layer in which precipitation of the dichroic substance is suppressed and the planar uniformity is excellent is obtained. Here, the expression "planar uniformity is excellent" denotes that the alignment defect occurring in a case where the liquid crystal composition containing the polymer liquid crystal compound is repelled on the underlayer (for example, the base material or the alignment layer) is less likely to occur.

The repeating unit (4) is a repeating unit represented by Formula (4).

(4)

In Formula (4), PC4 represents the main chain of the repeating unit and more specifically the same structure as that for PC1 in Formula (1), L4 represents a single bond or a divalent linking group and more specifically the same structure as that for L1 in Formula (1) (preferably a single bond), SP4 represents an alkylene group having 10 or more atoms in the main chain, and T4 represents a terminal group and more specifically the same structure as that for T1 in Formula (1).

Specific examples and suitable aspects of PC4 are the same as those fear PC1 in Formula (1), and thus description thereof will not be repeated.

From the viewpoint of further exhibiting the effects of the present invention, it is preferable that IA represents a single bond.

In Formula (4), SP4 represents an alkylene group having 10 or more atoms in the main chain. Here, one or more —$CH_2$— constituting the alkylene group represented by SP4 may be substituted with "SP-C" described above and particularly preferably at least one group selected from the group consisting of —O—, —S—, —N($R^{21}$)—, —C(=O)—, —C(=S)—, —C($R^{22}$)=C($R^{23}$)—, an alkynylene group —Si($R^{24}$)($R^{25}$)—, —N=N—, —C($R^{26}$)=N—N=C($R^{27}$)—, —C($R^{28}$)=N—, and —S(=O)$_2$—. In addition, $R^{21}$ to $R^{28}$ each independently represent a hydrogen atom, a halogen atom, a cyano group, a nitro group, or a linear or branched alkyl group having 1 to 10 carbon atoms. Further, the hydrogen atoms contained in one or more —$CH_2$—'s constituting the alkylene group represented by SP4 may be substituted with "SP—H" described above.

The number of atoms in the main chain of SP4 is 10 or greater, and from the viewpoint of obtaining a light absorption anisotropic layer in which at least one of the adhesiveness or the planar uniformity is more excellent, the number of atoms thereof is preferably 15 or greater and more preferably 19 or greater. Further, from the viewpoint of obtaining a light absorption anisotropic layer with a more excellent degree of alignment, the upper limit of the number of atoms in the main chain of SP4 is preferably 70 or less, more preferably 60 or less, and still more preferably 50 or less.

Here, "main chain" in SP4 denotes a partial structure required for directly linking L4 and T4 to each other, and "number of atoms in the main chain" denotes the number of atoms constituting the partial structure.

In other words, "main chain" in SP4 denotes a partial structure in which the number of atoms linking L4 and T4 to each other is the smallest. For example, the number of atoms in the main chain in a case where SP4 represents a 3,7-dimethyldecanyl group is 10, and the number of atoms in the main chain in a case where SP4 represents a 4,6-dimethyldodecanyl group is 12. Further, in Formula (4-1), the inside of the frame shown by the dotted quadrangle corresponds to SP4, and the number of atoms in the main chain of SP4 (corresponding to the total number of atoms circled by the dotted line) is 11.

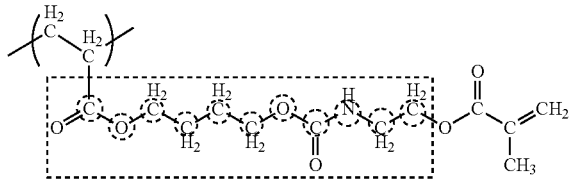

(4-1)

The alkylene group represented by SP4 may be linear or branched.

From the viewpoint of obtaining a light absorption anisotropic layer with a more excellent degree of alignment, the number of carbon atoms of the alkylene group represented by SP4 is preferably in a range of S to 80, more preferably in a range of 15 to 80, still more preferably in a range of 25 to 70, and particularly preferably in a range of 25 to 60.

From the viewpoint of obtaining a light absorption anisotropic layer with more excellent adhesiveness and planar uniformity, it is preferable that one or more —$CH_2$— constituting the alkylene group represented by SP4 are substituted with "SP—C" described above.

Further, in a case where a plurality of —$CH_2$— constituting the alkylene group represented by SP4 are present, it is more preferable that only some of the plurality of —$CH_2$— are substituted with "SP—C" described above from the viewpoint of obtaining a light absorption anisotropic layer with more excellent adhesiveness and planar uniformity.

Among examples of "SP—C", at least one group selected from the group consisting of —O—, —S—, —N($R^{21}$)—, —C(=O)—, —C(=S)—, —C($R^{22}$)=C($R^{23}$)—, ari alkynylene group, —Si($R^{24}$)($R^{25}$)—, —N=N—, —C($R^{26}$)=N—N=C($R^{27}$)—, —C($R^{28}$)=N—, and —S(=O)$_2$— is preferable, and from the viewpoint of obtaining a light absorption anisotropic layer with more excellent adhesiveness and planar uniformity, at least one group selected from the group consisting of —O—, —N($R^{21}$)—, —C(=O)—, and —S(—O)$_2$— is more preferable, and at least one group selected from the group consisting of —O—, —N($R^{21}$)— and —C(=O)— is particularly preferable. $R^{21}$ to $R^{28}$ each independently represent a hydrogen atom, a halogen atom, a cyano group, a nitro group, or a linear or branched alkyl group having 1 to 10 carbon atoms.

Particularly, it is preferable that SP4 represents a group having at least one selected from the group consisting of an oxyalkylene structure in which one or more —$CH_2$— constituting an alkylene group are substituted with —O—, an ester structure in which one or more —$CH_2$—$CH_2$— constituting an alkylene group are substituted with —O— and —C(=O)—, and a urethane bond in which one or more —$CH_2$—$CH_2$—$CH_2$— constituting an alkylene group are substituted with —O—, —C(=O)—, and —NH—.

The hydrogen atoms contained in one or more —$CH_2$—'s constituting the alkylene group represented by SP4 may be substituted with "SP—H" described above in this case, one or more hydrogen atoms contained in —$CH_2$— may be substituted with "SP—H". That is, only one hydrogen atom contained in —$CH_2$— may be substituted with "SP—H" or all (two) hydrogen atoms contained in —$CH_2$— may be substituted with "SP—H".

Among examples of "SP—H", at least one group selected from the group consisting of a halogen atom, a cyano group, a nitro group, a hydroxy group, a linear alkyl group having 1 to 10 carbon atoms, a branched alkyl group having 1 to 10 carbon atoms, and a halogenated alkyl group having 1 to 10 carbon atoms is preferable, and at least one group selected from the group consisting of a hydroxy group, a linear alkyl group having 1 to 10 carbon atoms, and a branched alkyl group having 1 to 10 carbon atoms is more preferable.

As described above, T4 represents the same terminal group as that for T1 and preferably a hydrogen atom, a methyl group, a hydroxy group, a carboxy group, a sulfonic acid group, a phosphoric acid group, a boronic acid group, an amino group, a cyano group, a nitro group, a phenyl group which may have a substituent, or -L-CL (L represents a single bond or a divalent linking group, specific examples of the divalent linking group are the same as those for LW and SPW described above, and CL represents a crosslinkable group, and examples thereof include a group represented by Q1 or Q2, among these, a crosslinkable group represented by any of Formulae (P-1) to (P-30) is preferable), and it is preferable that CL represents a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group.

The epoxy group may be an epoxycycloalkyl group, and the number of carbon atoms of the cycloalkyl group moiety in the epoxycycloalkyl group is preferably in a range of 3 to 15, more preferably in a range of 5 to 12, and still more preferably 6 (that is, in a case where the epoxycycloalkyl group is an epoxycyclohexyl group) from the viewpoint that the effects of the present invention are more excellent.

Examples of the substituent of the oxetanyl group include an alkyl group having 1 to 10 carbon atoms. Among the examples, an alkyl group having 1 to 5 carbon atoms is preferable from the viewpoint that the effects of the present invention are more excellent. The alkyl group as a substituent of the oxetanyl group may be linear or branched, but is preferably linear from the viewpoint that the effects of the present invention are more excellent.

Examples of the substituent of the phenyl group include a boronic acid group, a sulfonic acid group, a vinyl group, and an amino group. Among these, from the viewpoint that the effects of the present invention are more excellent, a boronic acid group is preferable.

Specific examples of the repeating unit (4) include the following strictures, but the present invention is not limited thereto. Further, in the following specific examples, n1 represents an integer of 2 or greater, and n2 represents an integer of 1 or greater.

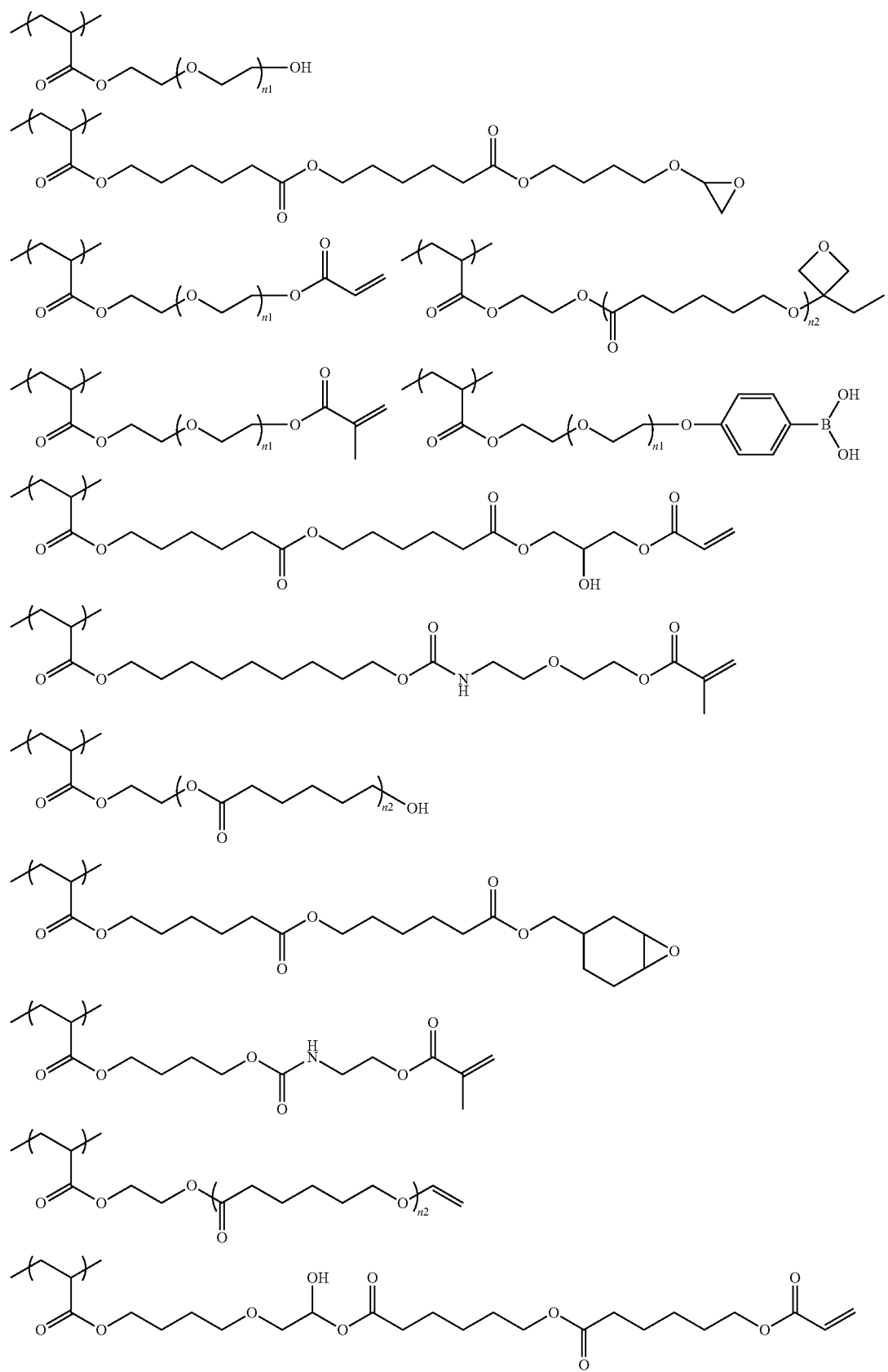

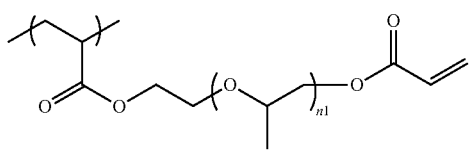

The content of the repeating unit (4) is preferably in a range of 2% to 20% by mass and more preferably in a range of 3% to 18% by mass with respect to all the repeating units (100% by mass) of the polymer liquid crystal compound. In a case where the content of the repeating unit (4) is 2% by mass or greater, a light absorption anisotropic layer having more excellent adhesiveness can be obtained. Further, in a case where the content of the repeating unit (4) is 20% by mass or less, a light absorption anisotropic layer having more excellent planar uniformity can be obtained.

The polymer liquid crystal compound may have only one dr two or more kinds of repeating units (4). In a case where the polymer liquid crystal compound has two or more kinds of repeating units (4), the content of the repeating unit (4) denotes the total content of the repeating units (4).

From the viewpoint of the planar uniformity, the polymer liquid crystal compound may have a repeating unit (5) to be introduced by polymerizing a polyfunctional monomer. Particularly in order to improve the planar uniformity while suppressing a decrease in the degree of alignment, the content of the repeating unit (5) to be introduced by polymerizing a polyfunctional monomer is preferably 10% by mass or less with respect to all the repeating units (100% by mass) of the polymer liquid crystal compound. As described above, the reason why the planar uniformity can be improved while a decrease in the degree of alignment is suppressed by allowing the polymer liquid crystal compound to have 10% by mass or less of the repeating unit (5) is assumed as follows.

The repeating unit (5) is a unit to be introduced to the polymer liquid crystal compound by polymerizing a polyfunctional monomer. Therefore, it is considered that the polymer liquid crystal compound contains a high-molecular-weight body in which a three-dimensional crosslinked structure is formed by the repeating unit (5). Here, since the content of the repeating unit (5) is small, the content of the high-molecular-weight body having the repeating unit (5) is considered to be small.

It is assumed that a light absorption anisotropic layer in which cissing of the composition for forming a light absorption anisotropic layer is suppressed and the planar uniformity is excellent is obtained due to the presence of a small amount of the high-molecular-weight body with the three-dimensional crosslinked structure that has been formed as described above.

Further, it is assumed that the effect of suppressing a decrease in the degree of alignment can be maintained because the content of the high-molecular-weight body is small.

It is preferable that the repeating unit (5) to be introduced by polymerizing a polyfunctional monomer is a repeating unit represented by Formula (5).

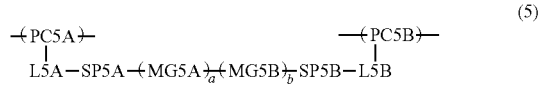 (5)

In Formula (5), PC5A and PC5B represent the main chain of the repeating unit and more specifically the same structure as that for PC1 in Formula (1), L5A and L5B represent a single bond or a divalent linking group and more specifically the same structure as that for L1 in Formula (1), SP5A and SP5B represent a spacer group and more specifically the same structure as that for SP1 in Formula (1), MG5A and MG5B represent a mesogen structure and more specifically the same structure as that for the mesogen group MG in Formula (LC), and a and b represent an integer of 0 or 1.

PC5A and PC5B may represent the same group or different groups, but it is preferable that PC5A and PC5B represent the same group from the viewpoint of further improving the degree of alignment of the light absorption anisotropic layer.

L5A and L5B may represent a single bond, the same group, or different groups, but L5A and L5B represent preferably a single bond or the same group and more preferably the same group from the viewpoint of further improving the degree of alignment of the light absorption anisotropic layer.

SP5A and SP5B may represent a single bond, the same group, or different groups, but SP5A and SP5B represent preferably a single bond or the same group and more preferably the same group from the viewpoint of further improving the degree of alignment of the light absorption anisotropic, layer.

Here, the same group in Formula (5) indicates that the chemical structures are the same as each other regardless of the orientation in which each group is bonded. For example, even in a case where SP5A represents *—$CH_2$—$CH_2$—O—** (* represents a bonding position with respect to L5A, and ** represents a bonding position with respect to MG5A) and SP5B represents *—O—$CH_2$—$CH_2$** (* represents a bonding position with respect to MG5B, and ** represents a bonding position with respect to L5B), SP5A and SP5B represent the same group.

From the viewpoint of further improving the degree of alignment of the light absorption anisotropic layer, a and b each independently represent an integer of 0 or 1 and preferably 1.

a and b may be the same as or different from each other, but from the viewpoint of further improving the degree of alignment of the light absorption anisotropic layer, it is preferable that both a and b represent 1.

From the viewpoint of further improving the degree of alignment of the light absorption anisotropic layer, the sum of a and b is preferably 1 or 2 (that is, the repeating unit represented by Formula (5) contains a mesogen group) and more preferably 2.

From the viewpoint of further improving the degree of alignment of the light absorption anisotropic layer, it is preferable that the partial structure represented by -(MG5A)$_a$-(MG5B)$_b$- has a cyclic structure. In this case, from the viewpoint of further improving the degree of alignment of the light absorption anisotropic layer, the number of cyclic structures in the partial structure represented by -(MG5A2)$_a$-(MG5B)$_b$- is preferably 2 or greater, more preferably in a range of 2 to 8, still more preferably in a range of 2 to 6, and particularly preferably in a range of 2 to 4.

From the viewpoint of further improving the degree of alignment of the light absorption anisotropic layer, the mesogen groups represented by MG5A and MG5B each independently have preferably one or more cyclic structures, more preferably 2 to 4 cyclic structures, still more preferably 2 or 3 cyclic structures, and particularly preferably 2 cyclic structures.

Specific examples of the cyclic structure include an aromatic hydrocarbon group, a heterocyclic group, and an alicyclic group. Among these, an aromatic hydrocarbon group or an alicyclic group is preferable.

MG5A and MG5B may represent the same group or different groups, but from the viewpoint of further improving the degree of alignment of the light absorption anisotropic layer, it is preferable that MG5A and MG5B represent the same group.

From the viewpoints of exhibiting the liquid crystallinity adjusting the liquid crystal phase transition temperature, and the availability of raw materials and synthetic suitability and from the viewpoint that the effects of the present invention are more excellent, it is preferable that the mesogen group represented by MG5A and MG5B is the mesogen group MG in Formula (LC).

Particularly in the repeating unit (5), it is preferable that PC5A and PC5B represent the same group, L5A and L5B represent a single bond or the same group, SP5A and SP5B represent a single bond or the same group, and MG5A and MG5B represent the same group. In this manner, the degree of alignment of the light absorption anisotropic layer is further improved.

The content of the repeating unit (5) is preferably 10% by mass or less, more preferably in a range of 0.001% to 5% by mass, and still more preferably in a range of 0.05% to 3% by mass with respect to the content (100% by mass) of all the repeating units of the polymer liquid crystal compound.

The polymer liquid crystal compound may have only one or two or more kinds of repeating units (5). In a case where the polymer liquid crystal compound has two or more kinds of repeating units (5), it is preferable that the total amount thereof is in the above-described ranges.

The polymer liquid crystal compound may be a star-shaped polymer. The star-shaped polymer in the present invention denotes a polymer having three or more polymer chains extending from the nucleus as a starting point and is specifically represented by Formula (6).

The star-shaped polymer represented by Formula (6) as the polymer liquid crystal compound can form a light absorption anisotropic layer having a high degree of alignment while having high solubility (excellent solubility in a solvent).

(6)

In Formula (6), $n_A$ represents an integer of 3 or greater and preferably an integer of 4 or greater. The upper limit of $n_A$ is not limited thereto, but is commonly 12 or less and preferably 6 or less.

A plurality of P1's each independently represent a polymer chain having any of repeating units represented by Formulae (1), (21), (22), (3), (4), and (5). Here, at least one of the plurality of P1's represents a polymer chain having a repeating unit represented by Formula (1).

A represents an atomic group that is the nucleus of the star-shaped polymer. Specific examples of A include structures obtained by removing hydrogen atoms from thiol groups of the polyfunctional thiol compound, described in paragraphs [0052] to [0058] of JP2011-074280A, paragraphs [0017] to [0021] of JP2012-189847A, paragraphs [0012] to [0024] of JP2013-031986A, and paragraphs [0118] to [0142] of JP2014-104631A. In this case, A and PI are bonded to each other through a sulfide bond.

The number of thiol groups of the polyfunctional thiol compound from which A is derived is preferably 3 or greater and more preferably 4 or greater. The upper limit of the number of thiol groups of the polyfunctional thiol compound is commonly 12 or less and preferably 6 or less.

Specific examples of the polyfunctional thiol compound are shown below.

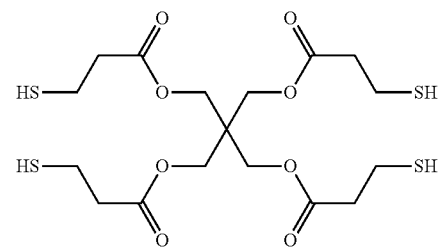

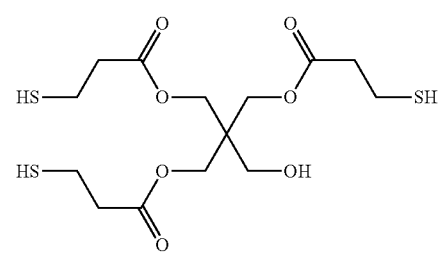

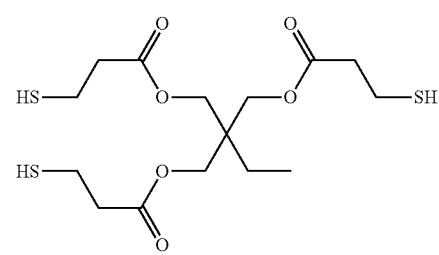

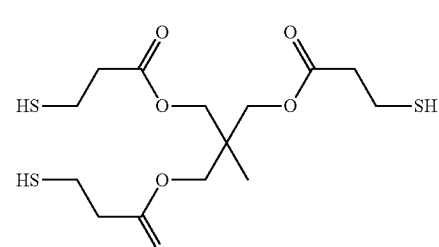

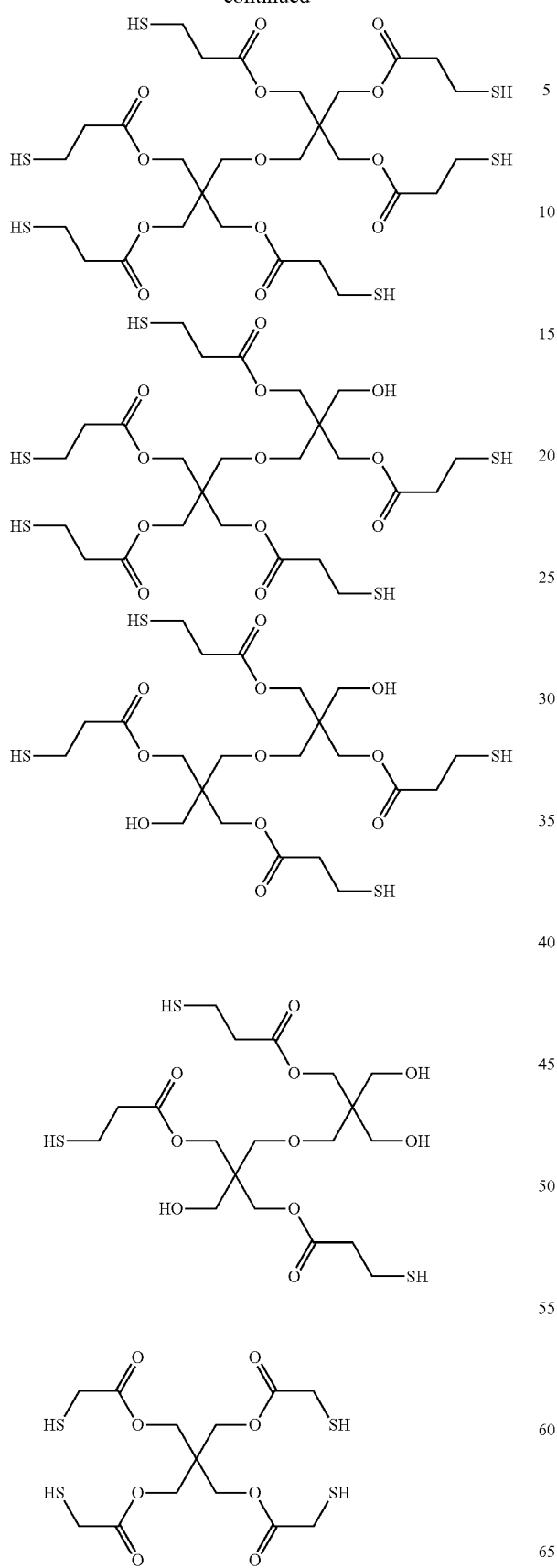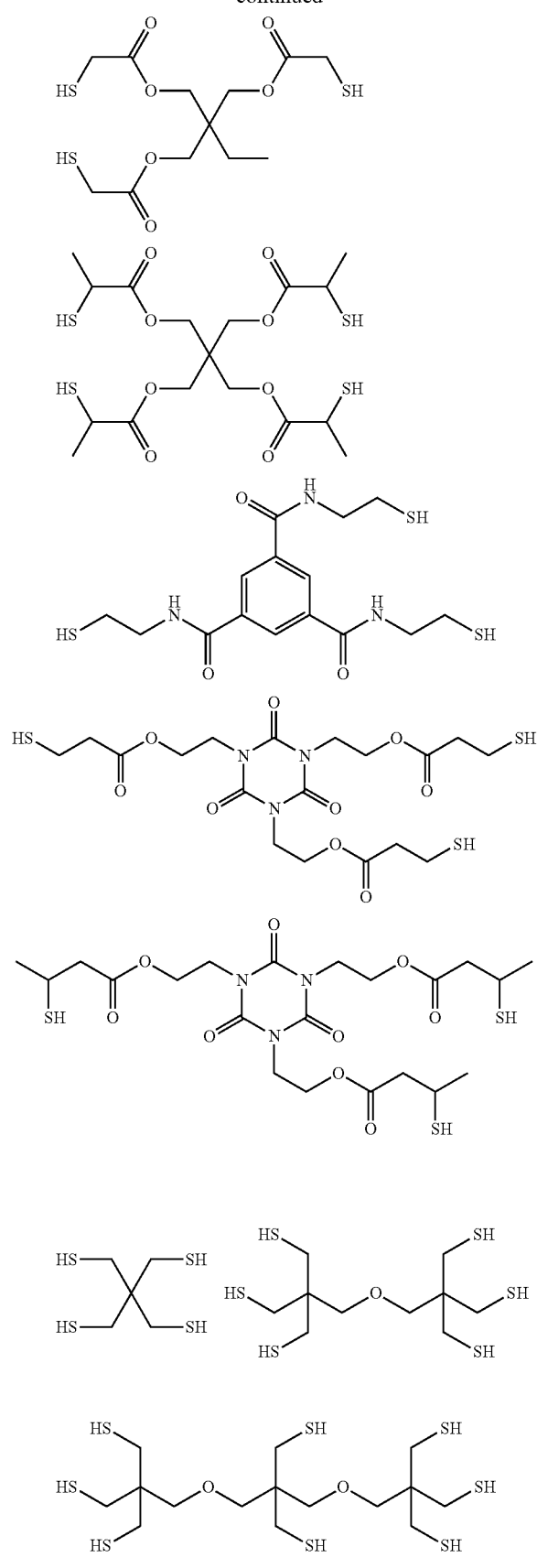

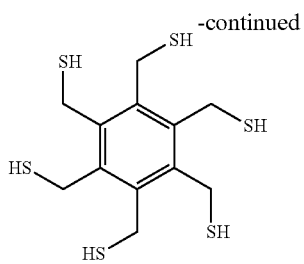

From the viewpoint of further improving the degree of alignment, the polymer liquid crystal compound may be a thermotropic liquid crystal and a crystalline polymer.

A thermotropic liquid crystal is a liquid crystal that shows transition to a liquid crystal phase due to a change in temperature.

The thermotropic liquid crystal may exhibit any of a nematic phase or a smectic phase, but it is preferable that the thermotropic liquid crystal exhibits at least the nematic phase from the viewpoint that the degree of alignment of the light absorption anisotropic layer is further increased, and haze is unlikely to be observed (haze is further enhanced).

The temperature range in which the nematic phase is exhibited is preferably in a range of room temperature (23° C.) to 450° C. from the viewpoint that the degree of alignment of the light absorption anisotropic layer is farther increased and haze is unlikely to be observed and more preferably in a range of 40° C. to 400° C. from the viewpoints of the handleability and the manufacturing suitability.

A crystalline polymer is a polymer showing a transition to a crystal layer due to a change in temperature. The crystalline polymer may show a glass transition other than the transition to the crystal layer.

It is preferable that the crystalline polymer is a polymer liquid crystal compound that has a transition from a crystal phase to a liquid crystal phase in a case of being heated (glass transition may be present in the middle of the transition) from the viewpoint that the degree of alignment of the light absorption anisotropic layer is further increased and haze is unlikely to be observed or a polymer liquid crystal compound that has a transition to a crystal phase in a case where the temperature is lowered after entering a liquid crystal state by being heated (glass transition may be present in the middle of the transition).

The presence or absence of crystallinity of the polymer liquid crystal compound is evaluated as follows, Two light absorption anisotropic layers of an optical microscope (ECLIPSE E600 PUL, manufactured by Nikon Corporation) are disposed so as to be orthogonal to each other, and a sample table is set between the two light absorption anisotropic layers. Further, a small amount of the polymer liquid crystal compound is placed on slide glass, and the slide glass is set on a hot stage placed on the sample table. While the state of the sample is observed, the temperature of the hot stage is increased to a temperature at which the polymer liquid crystal compound exhibits liquid crystallinity, and the polymer liquid crystal compound is allowed to enter a liquid crystal state. After the polymer liquid crystal compound enters the liquid crystal state, the behavior of the liquid crystal phase transition is observed while the temperature of the hot stage is gradually lowered, and the temperature of the liquid crystal phase transition is recorded. In a case where the polymer liquid crystal compound exhibits a plurality of liquid crystal phases (for example, a nematic phase and a smectic phase), all the transition temperatures are also recorded.

Next, approximately 5 mg of a sample of the polymer liquid crystal compound is put into an aluminum pan, and the pan is covered and set on a differential scanning calorimeter (DSC) (an empty aluminum pan is used as a reference). The polymer liquid crystal compound measured in the above-described manner is heated to a temperature at which the compound exhibits a liquid crystal phase, and the temperature is maintained for 1 minute. Thereafter, the calorific value is measured while the temperature is lowered at a rate of 10° C./min. An exothermic peak is confirmed from the obtained calorific value spectrum.

As a result, in a case where an exothermic peak is observed at a temperature other than the liquid crystal phase transition temperature, it can be said that the exothermic peak is a peak due to crystallization and the polymer liquid crystal compound has crystallinity.

Meanwhile, in a case where an exothermic peak is not observed at a temperature other than the liquid crystal phase transition temperature, it can be said that the polymer liquid crystal compound does not have crystallinity.

The method of obtaining a crystalline polymer is not particularly limited, but as a specific example, a method of using a polymer liquid crystal compound having the repeating unit (1) described above is preferable, and a method of using a suitable aspect among polymer liquid crystal compounds having the repeating unit (1) described above is more preferable.

From the viewpoint that the degree of alignment of the light absorption anisotropic layer is further increased and haze is unlikely to be observed, the crystallization temperature of the polymer liquid crystal compound is preferably −50° C. or higher and lower than 150° C., more preferably 120° C. or lower, still more preferably −20° C. or higher and lower than 120° C., and particularly preferably 95° C. or lower. The crystallization temperature of the polymer liquid crystal compound is preferably lower than 150° C. from the viewpoint of reducing haze.

Further, the crystallization temperature is a temperature of an exothermic peak due to crystallization in the above-described DSC.

From the viewpoint that the effects of the present invention are more excellent, the weight-average molecular weight (Mw) of the polymer liquid crystal compound is preferably in a range of 1000 to 500000 and more preferably in a range of 2000 to 300000. In a case where the Mw of the polymer liquid crystal compound is in the above-described ranges, the polymer liquid crystal compound is easily handled.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the degree of alignment, the weight-average molecular weight (Mw) of the polymer liquid crystal compound is preferably less than 10000 and preferably 2000 or greater and less than 10000.

Here, the weight-average molecular weight and the number average molecular weight in the present invention are values measured according to gel permeation chromatography (GPC).

Solvent (eluent): N-methylpyrrolidone
Equipment name: TOSOH HLC-8220GPC

Column: Connect and use three of TOSOH TSKgel Super AWM-H (6 mm×15 cm)

Column temperature: 25° C.

Sample concentration: 0.1% by mass

Flow rate: 0.35 ml/min

Calibration curve: TSK standard polystyrene (manufactured by TOSOH Corporation), calibration curves of 7 samples with Mw of 2800000 to 1050 (Mw/Mn=1.03 to 1.06) are used.

The polymer liquid crystal compound may exhibit nematic or smectic liquid crystallinity, but it is preferable that the polymer liquid crystal compound exhibits at least the nematic liquid crystallinity.

The temperature at which the nematic phase is exhibited is preferably in a range of 0° C. to 450° C. and from the viewpoints of the handleability and the manufacturing suitability, more preferably in a range of 30° C. to 400° C.

From the viewpoint that the effects of the present invention are more excellent, the content of the rod-like liquid crystal compound is preferably in a range of 10% to 97% by mass, more preferably in a range of 40% to 95% by mass, and still more preferably in a range of 60% to 95% by mass with respect to the total mass of the light absorption anisotropic layer.

In a case where the rod-like liquid crystal compound contains a polymer liquid crystal compound, the content of the polymer liquid crystal compound is preferably in a range of 10% to 99% by mass, more preferably in a range of 30% to 95% by mass, and still more preferably in a range of 40% to 90% by mass with respect to the total mass (100 parts by mass) of the rod-like liquid crystal compound.

In a case where the rod-like liquid crystal compound contains a low-molecular-weight liquid crystal compound, the content of the low-molecular-weight liquid crystal compound is preferably in a range of 1% to 90% by mass, more preferably in a range of 5% to 70% by mass, and still more preferably in a range of 10% to 60% by mass with respect to the total mass (100 parts by mass) of the rod-like liquid crystal compound.

In a case where the rod-like liquid crystal compound contains both a polymer liquid crystal compound and a low-molecular-weight liquid crystal compound, from the viewpoint that the effects of the present invention are more excellent, the mass ratio (low-molecular-weight liquid crystal compound/polymer liquid crystal compound) of the content of the low-molecular-weight liquid crystal compound to the content of the polymer liquid crystal compound is preferably in a range of 5/95 to 70/30 and more preferably in a range of 10/90 to 50/50.

The content of the liquid crystal compound is preferably in a range of 25 to 2000 parts by mass, more preferably in a range of 100 to 1300 parts by mass, and still more preferably in a range of 200 to 900 parts by mass with respect to 100 parts by mass of the content of the dichroic substances in the total mass of the light absorption anisotropic layer. In a case where the content of the liquid crystal compound is in the above-described ranges, the degree of alignment of the light absorption anisotropic layer is further improved.

The liquid crystal composition may contain only one or two or more kinds of liquid crystal compounds. In a case where the liquid crystal composition contains two or more kinds of liquid crystal compounds, the content of the liquid crystal compounds denotes the total content of the liquid crystal compounds.

(Dichroic Substance)

It is preferable that the light absorption anisotropic layer used in the present invention contains a dichroic substance. The dichroic substance is not particularly limited, and examples thereof include a visible light absorbing material (a dichroic coloring agent or a dichroic azo coloring agent compound), a light emitting material (such as a fluorescent material or a phosphorescent material), an ultraviolet absorbing material, an infrared absorbing material, a non-linear optical material, a carbon nanotube, and an inorganic material (for example, a quantum rod). Further, known dichroic substances of the related art can be used.

As the dichroic substance, an organic dichroic coloring agent is preferable, and a dichroic azo coloring agent compound is more preferable.

The dichroic azo coloring agent compound is not particularly limited, and known dichroic azo coloring agents of the related art can be used, but the compounds described below are preferably used.

In the present invention, the dichroic azo coloring agent compound denotes a coloring agent having different absorbances depending on the direction.

The dichroic azo coloring agent compound may or may not exhibit liquid crystallinity.

In a case where the dichroic azo coloring agent compound exhibits liquid crystallinity, the dichroic azo coloring agent compound may exhibit any of nematic liquid crystallinity or smectic liquid crystallinity. The temperature at which the liquid crystal phase is exhibited is preferably in a range of room temperature (approximately 20° C. to 28° C.) to 300° C. and from the viewpoints of handleability and manufacturing suitability, more preferably in a range of 50° C. to 200° C.

In the present invention, from the viewpoint of adjusting the tint, the light absorption anisotropic layer contains preferably at least one coloring agent compound having a maximum absorption wavelength in a wavelength range of 560 to 700 nm (hereinafter, also referred to as "first dichroic azo coloring agent compound") and at least one coloring agent compound having a maximum absorption wavelength in a wavelength range of 455 nm or greater and less than 560 nm (hereinafter, also referred to as "second dichroic azo coloring agent compound") and specifically more preferably at least a dichroic azo coloring agent compound represented by Formula (1) and a dichroic azo coloring agent compound represented by Formula (2).

In the present invention, three or more kinds of dichroic azo coloring agent compounds may be used in combination. For example, from the viewpoint of making the color of the light absorption anisotropic layer close to black, it is preferable to use a first dichroic azo coloring agent compound, a second dichroic azo coloring agent compound, and at least one coloring agent compound having a maximum absorption wavelength in a wavelength range of 380 nm or greater and less than 455 nm (hereinafter, also referred to as "third dichroic azo coloring agent compound") in combination.

In the present invention, from the viewpoint of further enhancing pressing resistance, it is preferable that the dichroic azo coloring agent compound contains a crosslinkable group.

Specific examples of the crosslinkable group include a (meth)acryloyl group, an epoxy group, an oxetanyl group, and a styryl group. Among these, a (meth)acryloyl group is preferable.

[First Dichroic Azo Coloring Agent Compound]

It is preferable that the first dichroic azo coloring agent compound is a compound having a chromophore which is a nucleus and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic ring group and an azo group is preferable, and a bisazo structure containing an aromatic heterocyclic group (preferably a thienothiazole group) and two azo groups is more preferable.

The side chain is not particularly limited, and examples thereof include a group represented by L3, R2, or 1_4 in Formula (1).

The first dichroic azo coloring agent compound is a dichroic azo coloring agent compound having a maximum absorption wavelength in a wavelength range of 560 to 700 nm, and from the viewpoint of adjusting the tint of the light absorption anisotropic layer, preferably a dichroic azo coloring agent compound having a maximum absorption wavelength in a wavelength range of 560 to 650 nm and more preferably a dichroic azo coloring agent compound having a maximum absorption wavelength in a wavelength range of 560 to 640 nm.

The maximum absorption wavelength (nm) of the dichroic azo coloring agent compound in the present specification is acquired from an ultraviolet visible spectrum in a wavelength range of 380 to 800 nm measured by a spectrophotometer using a solution prepared by dissolving the dichroic azo coloring agent compound in a good solvent.

In the present invention, from the viewpoint of further improving the degree of alignment of the light absorption anisotropic layer to be formed, it is preferable that the first dichroic azo coloring agent compound is a compound represented by Formula (1).

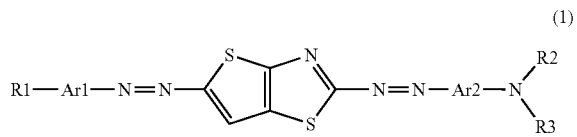

(1)

In Formula (1), Ar1 and Ar2 each independently represent a phenylene group which may have a substituent or a naphthylene group which may have a substituent. Among these, a phenylene group is preferable.

In Formula (1), R1 represents a hydrogen atom, a linear or branched alkyl group having 1 to 20 carbon atoms which may have a substituent, an alkoxy group, an alkylthio group, an alkylfonyl group, an alkylcarbonyl group, an alkyloxycarbonyl group, an acyloxy group, an alkylcarbonate group, an alkylamino group, an acylamino group, an alkylcarbonylamino group, an alkoxycarbonylamino group, an alkylsulfonylamino group, an alkylsulfamoyl group, an alkylcarbamoyl group, an alkylsulfinyl group, an alkylureido group, an alkylphosphoric acid amide group, an alkylimino group, or an alkylsilyl group.

Further, —CH$_2$— constituting the alkyl group may be substituted with —O—, —CO—, —C(O)—O—, —O—C(O)—, —Si(CH$_3$)$_2$—O—Si(CH$_3$)$_2$—, —N(R1')—, —CO—N(R1')—, —N(R1')—C(O)—O—, —O—C(O)—N(R1')—, —N(R1')—C(O)—N(R1')—, —CH═CH—, —C≡C—, —N═N—, —C(R1')═CH—C(O)—, or —O—C(O)—O—.

In a case where R1 represents a group other than a hydrogen atom, the hydrogen atom in each group may be substituted with a halogen atom, a nitro group, a cyano group, —N(R1')$_2$, an amino group, —C(R1')═C(R1')—NO$_2$, —C(R1')═C(R1')—CN, or —C(R1')═C(CN)$_2$.

R1' represents a hydrogen atom or a linear or branched alkyl group having 1 to 6 carbon atoms. In a case where a plurality of (R1)'s are present in each group, these may be the same as or different from one another.

In Formula (1), R2 and R3 each independently represent a hydrogen atom, a linear or branched alkyl group having 1 to 20 carbon atoms which may have a substituent, an alkoxy group, an acyl group, an alkyloxycarbonyl group, an alkylamide group, an alkylsulfonyl group, an aryl group, an arylcarbonyl group, an arylsulfonyl group, an aryloxycarbonyl group, or an arylamide group.

Further, constituting the alkyl group may be substituted with —O—, —S—, —C(O)—, —C(O)—O—, —O—C(O)—, —C(O)—S—, —S—C(O)—, —Si(CH$_3$)$_2$—O—Si(CH$_3$)$_2$—, —NR2'—, —NR2'-CO—, —CO—NR2'-, —NR2'-C(O)—O—, —O—C(O)—NR2'-, —NR2'-C(O)—NR2'-, —CH═CH—, —C≡C—, —N═N—, —C(R2')═CH—C(O)—, or —O—C(O)—O—.

In a case where R2 and R3 represent a group other than a hydrogen atom, the hydrogen atom of each group may be substituted with a halogen atom, a nitro group, a cyano group, a —OH group, —N(R2')$_2$, an amino group, —C(R2')═C(R2')-NO$_2$, —C(R2')═C(R2')-CN, or —C(R2')═C(CN)$_2$.

R2' represents a hydrogen atom or a linear or branched alkyl group having 1 to 6 carbon atoms. In a case where a plurality of (R2')'s are present in each group, these may be the same as or different from one another.

R2 and R3 may be bonded to each other to form a ring, or R2 or R3 may be bonded to Ar2 to form a ring.

From the viewpoint of the light resistance, it is preferable that R1 represents an electron-withdrawing group and R2 and R3 represent a group having a low electron-donating property.

Specific examples of such groups as R1 include an alkylsulfonyl group, an alkylcarbonyl group, an alkyloxycarbonyl group, an acyloxy group, an alkylsulfonylamino group, an alkylsulfamoyl group, an alkylsulfinyl group, and an alkylureido group, and examples of such a group as R2 and R3 include groups having the following structures. In addition, the groups having the following structures are shown in the form having a nitrogen atom to which R2 and R3 are bonded in Formula (1).

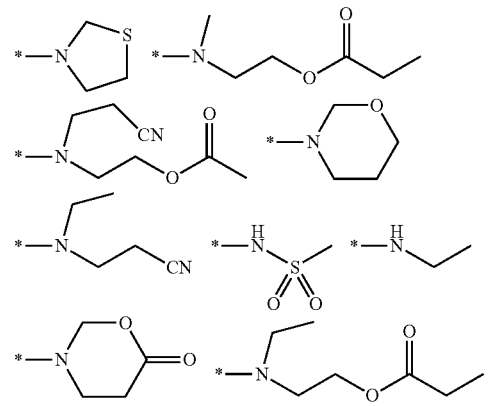

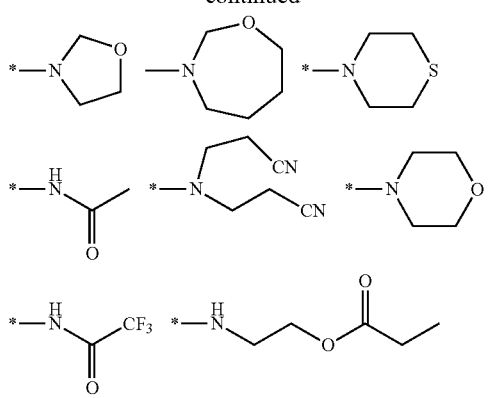
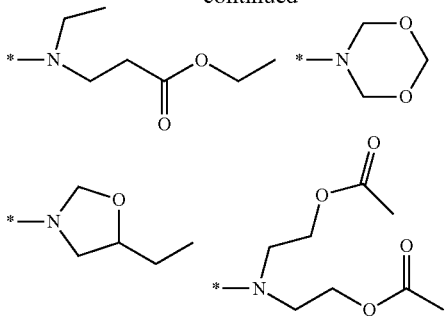
Specific examples of the first dichroic azo coloring agent compound are shown below, but the present invention is not limited thereto.
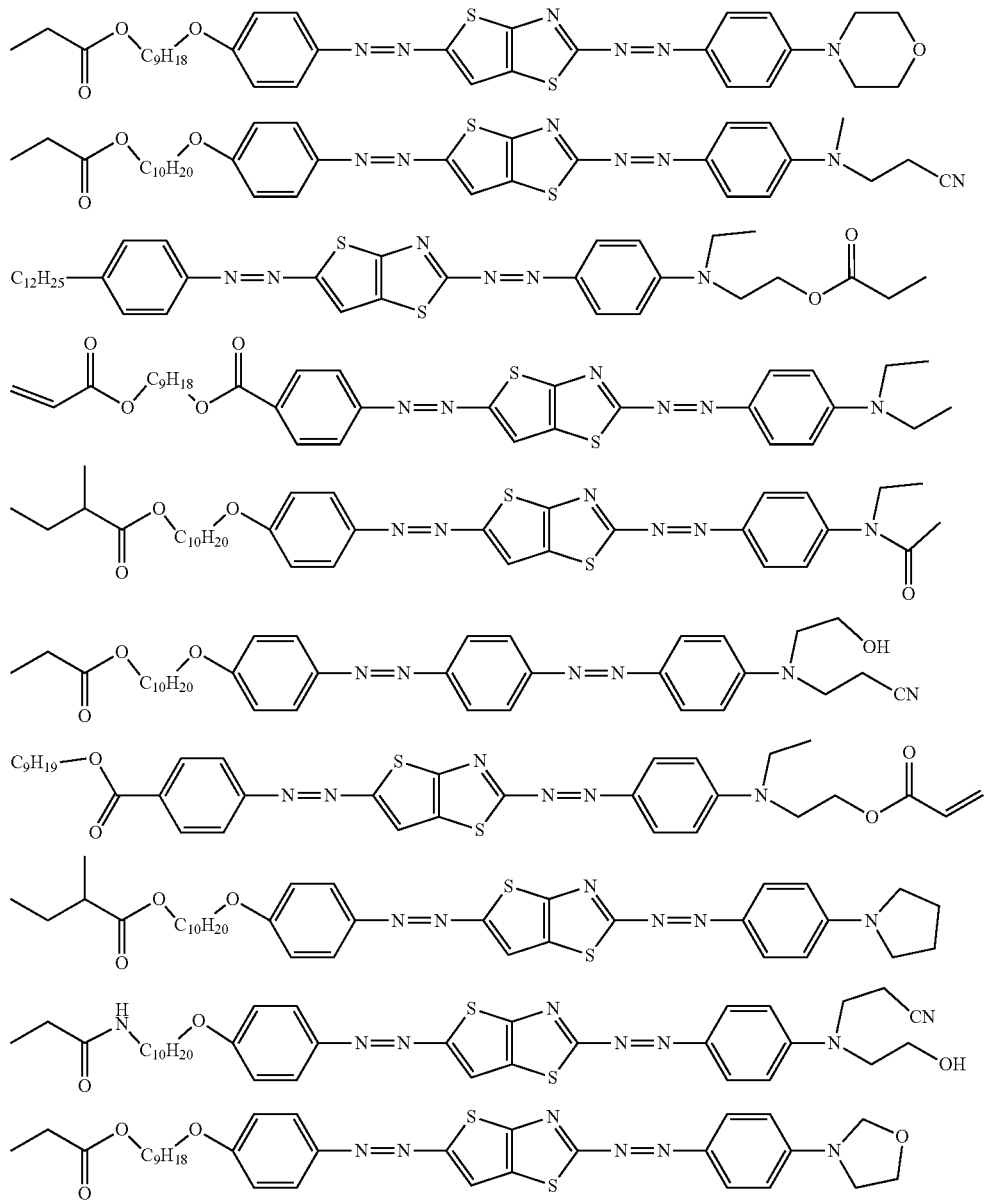

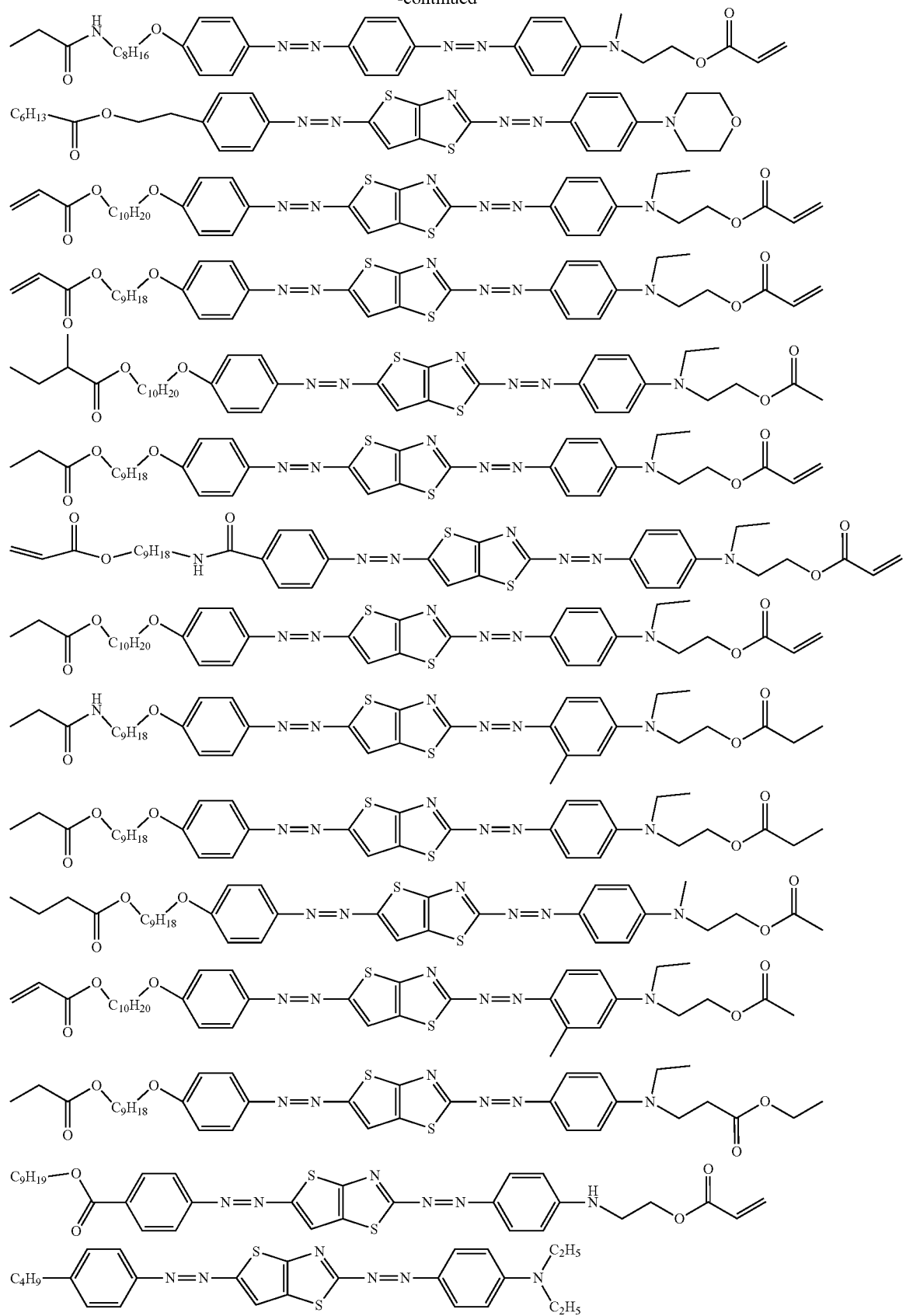

[Second Dichroic Azo Coloring Agent Compound]

The second dichroic azo coloring agent compound is a compound different from the first dichroic azo coloring agent compound, and specifically, the chemical structure thereof is different from that of the first dichroic azo coloring agent compound.

It is preferable that the second dichroic azo coloring agent compound is a compound having a chromophore which is a nucleus of a dichroic azo coloring agent compound and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic hydrocarbon group and an azo group is preferable, and a bisazo car trisazo structure containing an aromatic hydrocarbon group and two or three azo groups is more preferable.

The side chain is not particularly limited, and examples thereof include a group represented by R4, R5, or R6 in Formula (2).

The second dichroic azo coloring agent compound is a dichroic azo coloring agent compound having a maximum absorption wavelength in a wavelength range of 455 nm or greater and less than 560 nm, and from the viewpoint of adjusting the tint of the light absorption anisotropic layer, preferably a dichroic azo coloring agent compound having a maximum absorption wavelength in a wavelength range of 455 to 555 nm and more preferably a dichroic azo coloring agent compound having a maximum absorption wavelength in a wavelength range of 455 to 550 nm.

Particularly in a case where a first dichroic azo coloring agent compound having a maximum absorption wavelength in a range of 560 to 700 nm and a second dichroic azo coloring agent compound having a maximum absorption wavelength in a range of 455 nm or greater and less than 560 nm are used, the tint of the light absorption anisotropic layer is more easily adjusted.

From the viewpoint of further improving the degree of alignment of the light absorption anisotropic layer, it is preferable that the second dichroic azo coloring agent compound is a compound represented by Formula (2).

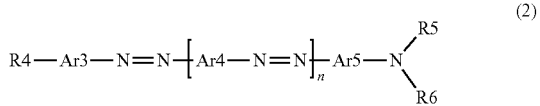

In Formula (2), n represents 1 or 2.

In Formula (2), Ar3, Ar4, and Ar5 each independently represent a phenylene group which may have a substituent, a naphthylene group which may have a substituent, or a heterocyclic group which may have a substituent.

The heterocyclic group may be aromatic or non-aromatic.

The atoms other than carbon constituting the aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

In Formula (2), R4 has the same definition as that for R1 in Formula (1).

In Formula (2), R5 and R6 each have the same definition as that for R2 and R3 in Formula (1).

From the viewpoint of the light resistance, it is preferable that R4 represents an electron-withdrawing group and R5 and R6 represent a group having a low electron-donating property.

Among such groups, specific examples of the electron-withdrawing group as R4 are the same as the specific examples of the electron-withdrawing group as R1, and specific examples of the group having a low electron-donating property as R5 and R6 are the same as the specific examples of the group having a low electron-donating property as R2 and R3.

Specific examples of the second dichroic azo coloring agent compound are shown below, but the present invention is not limited thereto.

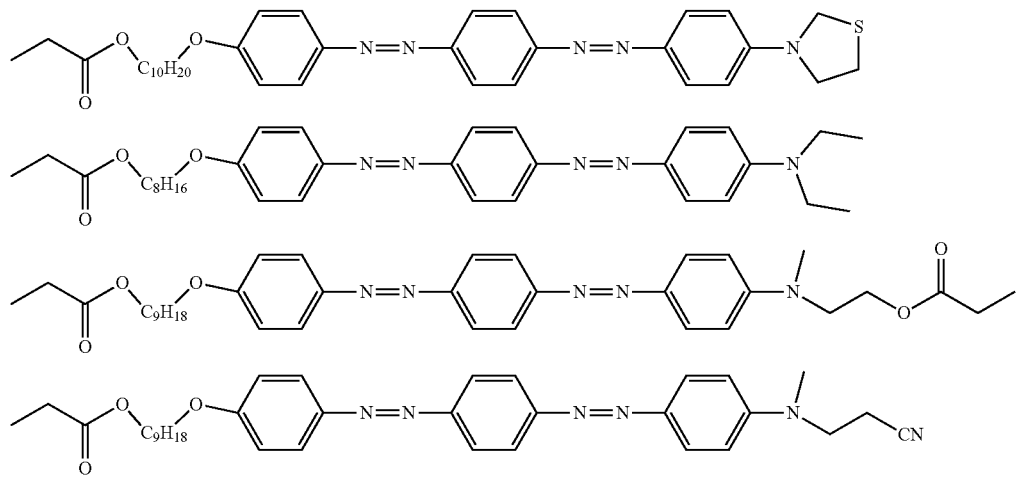

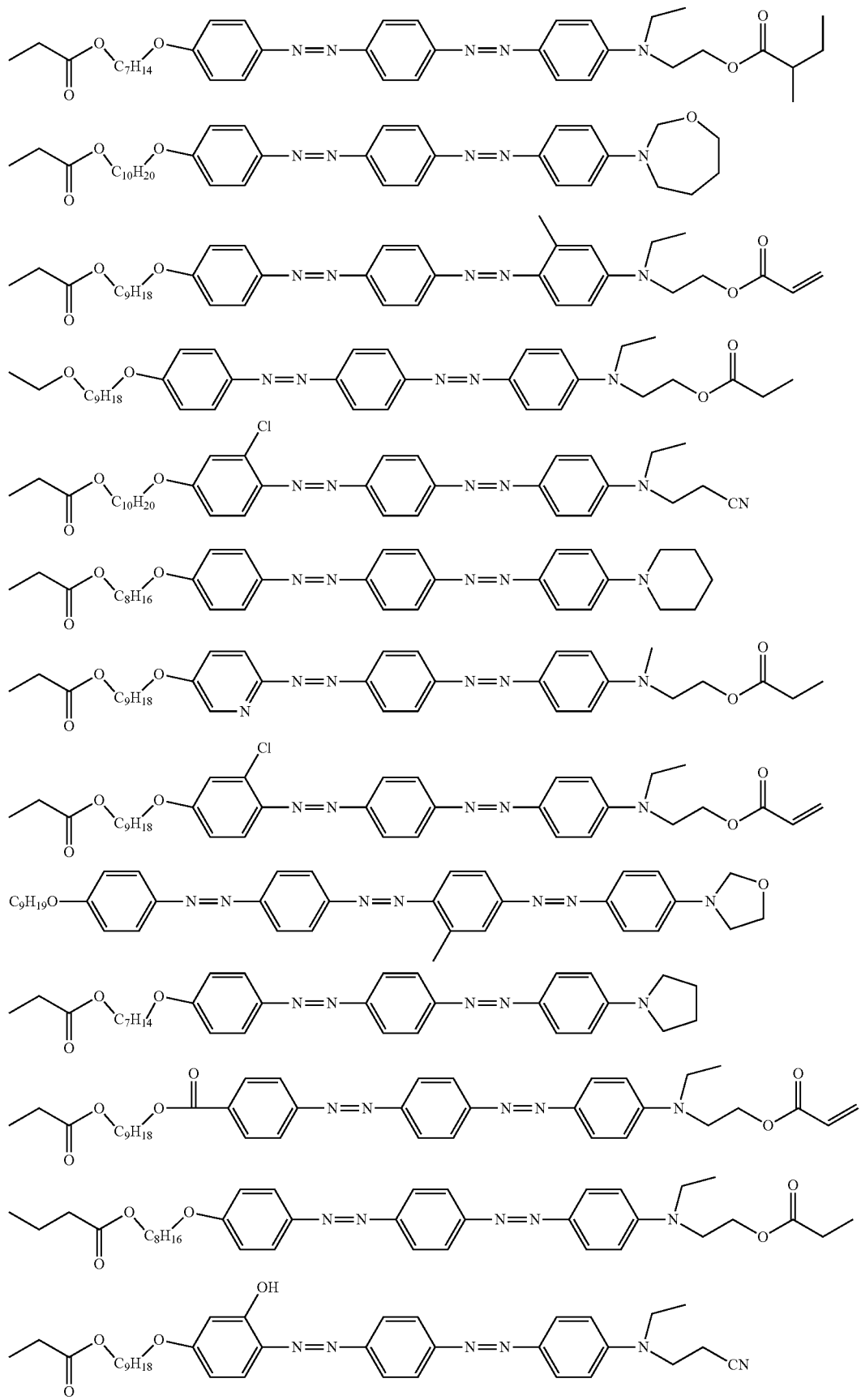

-continued
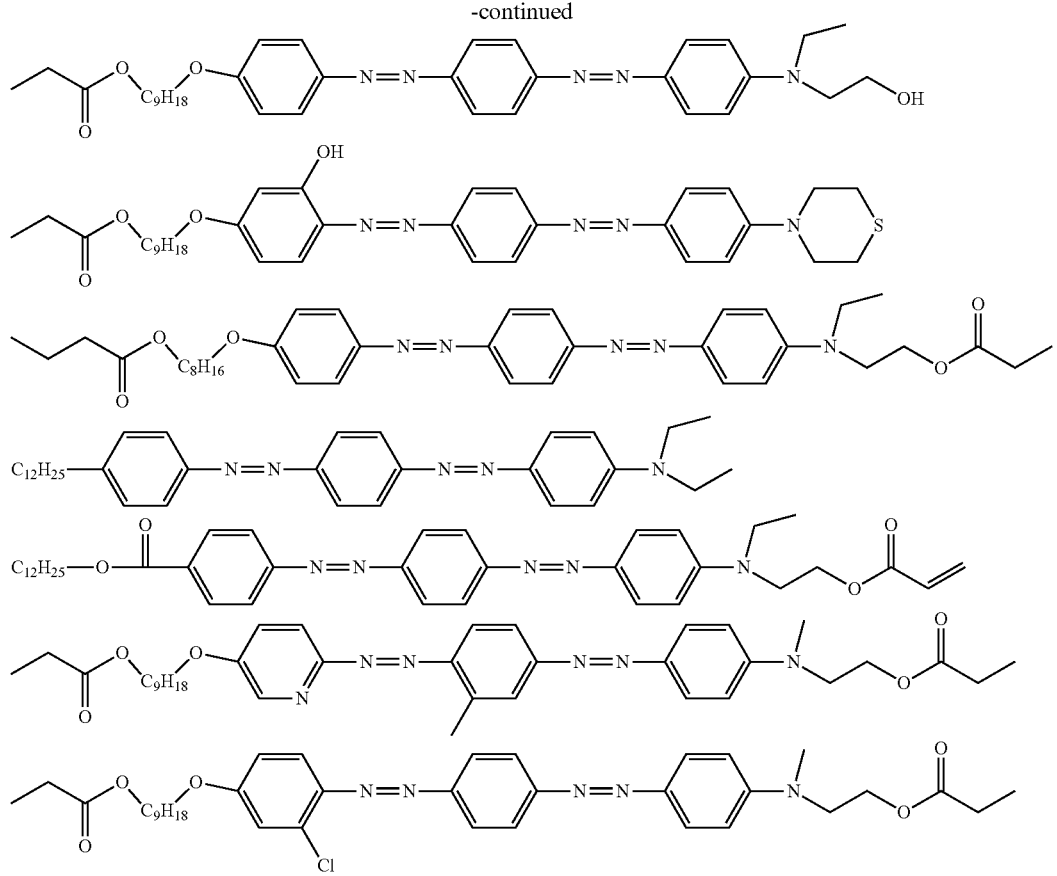
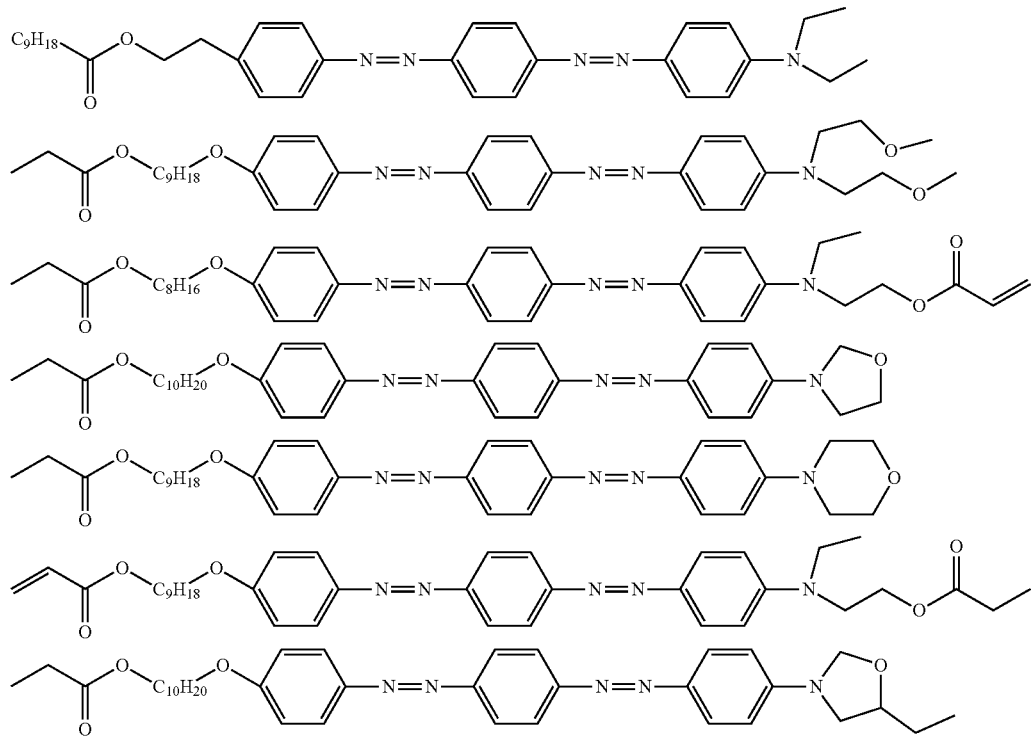

-continued
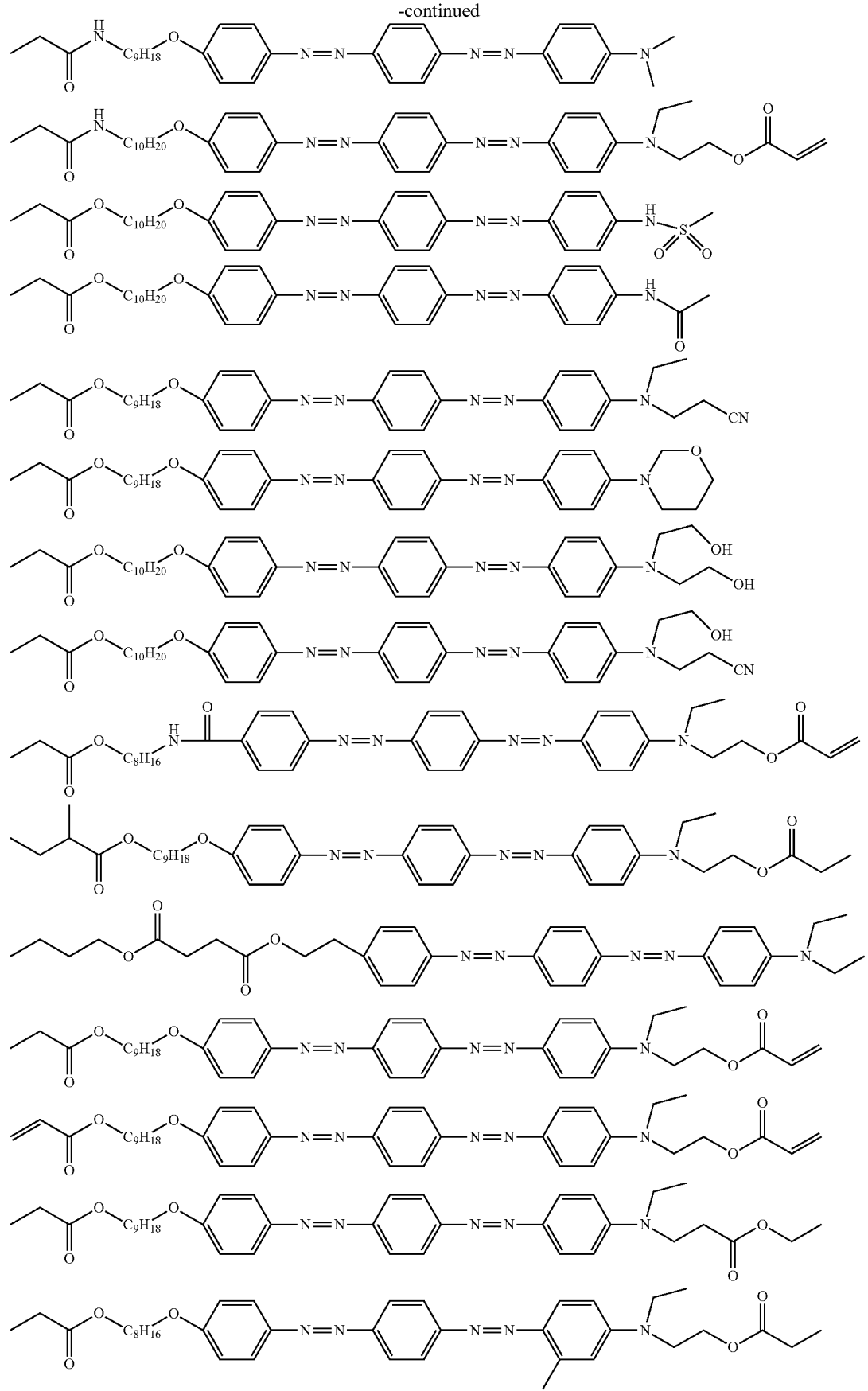

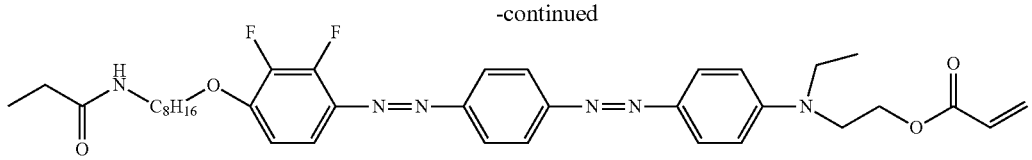

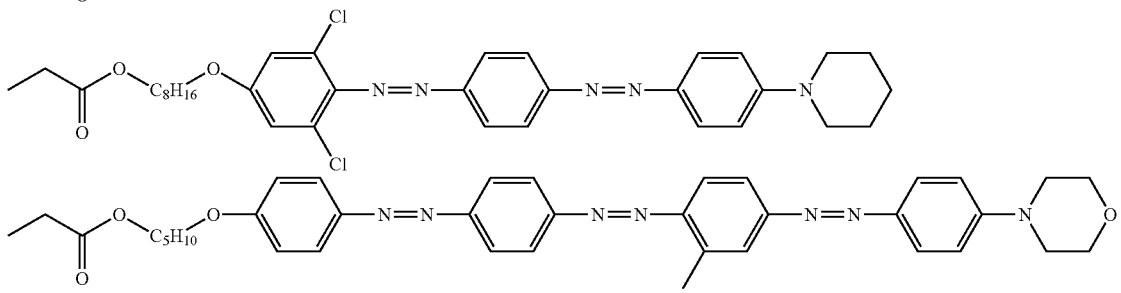

The log P value is an index expressing the hydrophilicity and the hydrophobicity of a chemical structure. An absolute value of a difference (hereinafter, also referred to as "difference in log P value") between the log P value of a side chain of the first dichroic azo coloring agent compound and the log P value of a side chain of the second dichroic azo coloring agent compound is preferably 2.30 or less, more preferably 2.0 or less, still more preferably 1.5 or less, and particularly preferably 1.0 or less. In a case where the difference in log P value is 2.30 or less, since the affinity between the first dichroic azo coloring agent compound and the second dichroic azo coloring agent compound is enhanced and an aligned structure is more easily formed, the degree of alignment of the light absorption anisotropic layer is further improved.

Further, in a case where the first dichroic azo coloring agent compound or the second dichroic azo coloring agent compound has a plurality of side chains, it is preferable that at least one difference in log P value is in the above-described ranges.

Here, the side chain of the first dichroic azo coloring agent compound and the side chain of the second dichroic azo coloring agent compound denote a group bonded to the terminal of the above-described chromophore. For example, R1, R2, and R3 in Formula (1) represent a side chain in a case where the first dichroic azo coloring agent compound is a compound represented by Formula (1), and R4, R5, and R6 in Formula (2) represent a side chain in a case where the second dichroic azo coloring agent compound is a compound represented by Formula (2). Particularly in a case where the first dichroic azo coloring agent compound is a compound represented by Formula (1) and the second diehroic azo coloring agent compound is a compound represented by Formula (2), it is preferable that at least one difference in log P value among the difference in log P value between R1 and R4, the difference in log P value between R1 and R5, the difference in log P value between R2 and R4, and the difference in log P value between R2 and R5 is in the above-described ranges.

Here, the log P value is an index for expressing the properties of the hydrophilicity and hydrophobicity of a chemical structure and is also referred to as a hydrophilic-hydrophobic parameter. The log P value can be calculated using software such as ChemBioDrawUltra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver, 4.1.07) is employed as the log P value unless otherwise specified.

[Third Dichroic Azo Coloring Agent Compound]

The third dichroic azo coloring agent compound is a dichroic azo coloring agent compound other than the first dichroic azo coloring agent compound and the second dichroic azo coloring agent compound, and specifically, the chemical structure thereof is different from those of the first dichroic azo coloring agent compound and the second dichroic azo coloring agent compound. In a case where the light absorption anisotropic layer contains the third dichroic azo coloring agent compound, there is an advantage that the tint of the light absorption anisotropic layer is easily adjusted.

The maximum absorption wavelength of the third dichroic azo coloring agent compound is 380 nm or greater and less than 455 nm and preferably in a range of 385 to 454 nm.

As the third dichroic azo coloring agent compound, a dichroic azo coloring agent represented by Formula (6) is preferable.

(6)

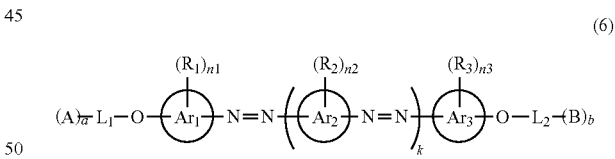

In Formula (6), A and B each independently represent a crosslinkable group.

In Formula (6), a and b each independently represent 0 or 1. From the viewpoint that the degree of alignment at a wavelength of 420 nm is excellent, it is preferable that both a and b represent 0.

In Formula (6), $L_1$ represents a monovalent substituent in a case where a represents 0, and $L_1$ represents a single bond or a divalent linking group in a case where a represents 1. Further, $L_2$ represents a monovalent substituent in a case where b represents 0, and $L_2$ represents a single bond or a divalent linking group in a case where b represents 1.

In Formula (6), $Ar_1$ represents a (n1+2)-valent aromatic hydrocarbon group or a heterocyclic group, $Ar_2$ represents a (n2+2)-valent aromatic hydrocarbon group or a heterocyclic group, and $Ar_3$ represents a (n3+2)-valent aromatic hydrocarbon group or a heterocyclic group.

In Formula (6), $R_1$, $R_2$, and $R_3$ each independently represent a monovalent substituent. A plurality of $R_1$'s may be the same as or different from each other in a case of "n1≥2", a plurality of R2's may be the same as or different from each other in a case of "n2≥2", and a plurality of $R_3$'s may be the same as or different from each other in a case of "n3≥2".

In Formula (6), k represents an integer of 1 to 4. In a case of "k=2", a plurality of $Ar_2$'s may be the same as or different from each other and a plurality of $R_2$'s may be the same as or different from each other.

In Formula (6), n1, n2, and n3 each independently represent an integer of 0 to 4. Here, an expression of "n1+n2+n3≥0" is satisfied in a case of "k=1", and an expression of "n1+n2+n3≥1" is satisfied in a case of "k=2".

In Formula (6), examples of the crosslinkable group represented by A and B include the polymerizable groups described in paragraphs [0040] to [0050] of JP2010-244038A. Among these, an actyloyl group, a methacryloyl group, an epoxy group, an oxetanyl group, and a styryl group are preferable from the viewpoint of improving the reactivity and the synthetic suitability, and an acryloyl group and a methacryloyl group are more preferable from the viewpoint of further improving the solubility.

In Formula (6), $L_1$ represents a monovalent substituent in a case where a represents 0, and $L_1$ represents a single bond or a divalent linking group in a case where a represents 1. Further, $L_2$ represents a monovalent substituent in a case where b represents 0, and $L_2$ represents a single bond or a divalent linking group in a case where b represents 1.

As the monovalent substituent represented by $L_1$ and $L_2$, a group to be introduced to increase the solubility of the dichroic substance or a group having an electron-donating property or an electron-withdrawing property which is to be introduced to adjust the color tone of the coloring agent is preferable.

Examples of the substituent include an alkyl group (preferably an alkyl group having 1 to 20 carbon atoms, more preferably an alkyl group having 1 to 12 carbon atoms, and still more preferably an alkyl group having 1 to 8 carbon atoms, and examples thereof a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably an alkenyl group having 2 to 20 carbon atoms, more preferably an alkenyl group having 2 to 12 carbon atoms, and still more preferably an alkenyl group having 2 to 8 carbon atoms, and examples thereof include a vinyl group, an allyl group, a 2-butenyl group, and a 3-pentenyl group), an alkynyl group (preferably an alkynyl group having 2 to 20 carbon atoms, more preferably an alkynyl group 2 to 12 carbon atoms, and still more preferably an alkynyl group having 2 to 8 carbon atoms, and examples thereof include a propargyl group and a 3-pentynyl group), an aryl group (preferably an aryl group having 6 to 30 carbon atoms, more preferably an aryl group having 6 to 20 carbon atoms, and still more preferably an aryl group having 6 to 12 carbon atoms, and examples thereof include a phenyl group, a 2,6-diethylphenyl group, a 3,5-ditrifluoromethylphenyl group, a naphthyl group, and a biphenyl group), a substituted or unsubstituted amino group (preferably an amino group having 0 to 20 carbon atoms, more preferably an amino group having 0 to 10 carbon atoms, and still more preferably an amino group having 0 to 6 carbon atoms, and examples thereof include an unsubstituted amino group, a methylamino group, a dimethylamino group, a diethylamino group, and an anilino group), an alkoxy group (preferably an alkoxy group having 1 to 20 carbon atoms and more preferably an alkoxy group having 1 to 15 carbon atoms, and examples thereof include a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and still more preferably an oxycarbonyl group having 2 to 10 carbon atoms, and examples thereof include a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and still more preferably an acyloxy group having 2 to 6 carbon atoms, and examples thereof include an acetoxy group and a benzoyloxy group), an arylamino group (preferably an acylamino group having 2 to 20 carbon atoms, more preferably an acylamino group having 2 to 10 carbon atoms, and still more preferably an acylamino group having 2 to 6 carbon atoms, and examples thereof include an acetylamino group and a benzoylamino group), an alkoxycarbonylamino group (preferably an alkoxycarbonylamino group having 2 to 20 carbon atoms, more preferably an alkoxycarbonylamino group having 2 to 10 carbon atoms, and still more preferably an alkoxycarbonylamino group having 2 to 6 carbon atoms, and examples thereof include a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and still more preferably an aryloxycarbonylamino group having 7 to 12 carbon atoms, and examples thereof include a phenyloxycarbonylamino group), a sulfonylamino group (preferably a sulfonylamino group having 1 to 20 carbon atoms, more preferably a sulfonylamino group having 1 to 10 carbon atoms, and still more preferably a sulfonylamino group having 1 to 6 carbon atoms, and examples thereof include a methanesulfonylamino group and a benzenesulfonylamino group), a sulfamoyl group (preferably a sulfamoyl group having 0 to 20 carbon atoms, more preferably a sulfamoyl group having 0 to 10 carbon atoms, and still more preferably a sulfamoyl group having to 6 carbon atoms, and examples thereof include a sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and still more preferably a carbamoyl group having 1 to 6 carbon atoms, and examples thereof include an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and still more preferably an alkylthio group having 1 to 6 carbon atoms, and examples thereof include a methylthio group and an ethylthio group), an arylthio group (preferably an arylthio group having 6 to 20 carbon atoms, more preferably an arylthio group having 6 to 16 carbon atoms, and still more preferably an arylthio group having 6 to 12 carbon atoms, and examples thereof include a phenylthio group), a sulfonyl group (preferably a sulfonyl group having 1 to 20 carbon atoms, more preferably a sulfonyl group having 1 to 10 carbon atoms, and still more preferably a sulfonyl group having 1 to 6 carbon atoms, and examples thereof include a mesyl group and a tosyl group), a sulfinyl group (preferably a sulfinyl group having 1 to 20 carbon atoms, more preferably a sulfinyl group having 1 to 10 carbon atoms, and still more preferably a sulfinyl group having 1 to 6 carbon atoms, and examples thereof include a methanesulfinyl group and a benzenesulfinyl group), a ureido group (preferably a ureido group having 1 to 20 carbon atoms, more preferably a ureido group having 1 to 10 carbon atoms, and still more preferably a ureido group having 1 to 6 carbon atoms, and examples thereof include an unsubstituted ureido group, a methylureido group, and a phenylureido group), a phosphoric acid amide group (preferably a phosphoric acid amide group having 1 to 20 carbon atoms, more preferably a phosphoric acid amide group having 1 to 10 carbon atoms, and still more preferably a phosphoric acid amide group having 1 to 6 carbon atoms, and examples thereof include a diethylphosphoric acid amide group and a phenylphosphoric acid amide group), a heterocyclic group (preferably a heterocyclic group having 1 to 30 carbon atoms and more preferably a heterocyclic group having 1 to 12 carbon atoms, and examples thereof include a heterocyclic group having a heteroatom such as a nitrogen atom, an oxygen atom, or a sulfur atom, and examples of the heterocyclic group having a heteroatom include an imidazolyl group, a pyridyl group, a quinolyl group, a furyl group, a piperidyl group, a morpholine group, a benzoxazolyl group, a benzimidazolyl group, and a benzothiazolyl group), a silyl group (preferably a silyl group having 3 to 40 carbon atoms, more preferably a silyl group having 3 to 30 carbon atoms, and still more preferably a silyl group having 3 to 24 carbon atoms, and examples thereof include a trimethylsilyl group and a triphenylsilyl group), a halogen atom (examples thereof include a fluorine atom, a chlorine atom, a bromine atom, and an iodine atom), a hydroxy group, a mercapto group, a cyano group, a nitro group, a hydroxamic acid group, a sulfino group, a hydrazino group, an imino group, and an azo group.

These substituents may be further substituted with these substituents. Further, in a case where two or more substituents are present, these may be the same as or different from each other. Further, these may be bonded to each other to form a ring where possible.

As the group in which the above-described substituent is further substituted with the above-described substituent, an $R_B$—$(O$—$R_A)_{na}$— group which is a group in which an alkoxy group is substituted with an alkyl group is exemplified. Here, in the formula, $R_A$ represents an alkylene, group having 1 to 5 carbon atoms, $R_B$ represents an alkyl group having 1 to 5 carbon atoms, and na represents an integer of 1 to 10 (preferably an integer of 1 to 5 and more preferably an integer of 1 to 3).

Among these, as the monovalent substituent represented by $L_1$ and $L_2$, an alkyl group, an alkenyl group, an alkoxy group, and groups in which these groups are further substituted with these groups (for example, $R_B$—$(O$—$R_A)_{na}$— group) are preferable, an alkyl group, an alkoxy group, and groups in which these groups are further substituted with these groups (for example, an $R_B$—$(O$—$R_A)_{na}$— group) are more preferable.

Examples of the divalent linking group represented by $L_1$ and $L_2$ include —O—, —S—, —CO—, —COO—, —OCO—, —O—CO—O—, —CO—$NR_N$—, —O—CO—$NR_N$—, —$NR_N$—CO—$NR_N$—, —$SO_2$—, —SO—, an alkylene group, a cycloalkylene group, an alkenylene group, and a group obtained by combining two or more of these groups.

Among these, a group obtained by combining an alkylene group with one or more groups selected from the group consisting of —O—, —COO—, —OCO— and —O—CO—O— is preferable.

Here, $R_N$ represents a hydrogen atom or an alkyl group. In a case where a plurality of $R_N$'S are present, the plurality of $R_N$'s may be the same as or different from each other.

From the viewpoint of further improving the solubility of the dichroic substance, the number of atoms in the main chain of at least one of $L_1$ or $L_2$ is preferably 3 or greater, more preferably 5 or greater, still more preferably 7 or greater, and particularly preferably 10 or greater. Further, the upper limit of the number of atoms in the main chain is preferably 20 or less and more preferably 12 or less.

In addition, from the viewpoint of further improving the degree of alignment of the light absorption anisotropic layer, the number of atoms of the main chain of at least one of $L_1$ or $L_2$ is preferably in a range of 1 to 5.

Here, in a case where A is present in Formula (6), "main chain" of $L_1$ denotes a portion required for directly linking "A" with the "O" atom linked to $L_1$, and "number of atoms in the main chain" denotes the number of atoms constituting the above-described portion. Similarly, in a case where B is present in Formula (6), "main chain" of $L_2$ denotes a portion required for directly linking "B" with the "O" atom linked to $L_2$, and "number of atoms in the main chain" denotes the number of atoms constituting the above-described portion. Further, "number of atoms in the main chain" does not include the number of atoms in a branched chain described below.

Further, in a case where A is not present, "number of the main chain of atoms" in $L_1$ denotes the number of atoms in $L_1$ that does not have a branched chain. In a case where B is not present, "number of the main chain of atoms" in denotes the number of atoms in $L_2$ that does not have a branched chain.

Specifically, in Formula (D1), the number of atoms in the main chain of $L_1$ is 5 (the number of atoms in the dotted frame on the left side of Formula (D1)), and the number of atoms in the main chain of $L_2$ is 5 (the number of atoms in the dotted frame on the right side of Formula ($D_1$)). Further, in Formula (D10), the number of atoms in the main chain of $L_1$ is 7 (the number of atoms in the dotted frame on the left side of Formula (D10)), and the number of atoms in the main chain of $L_2$ is 5 (the number of atoms in the dotted frame on the right side of Formula (D10)).

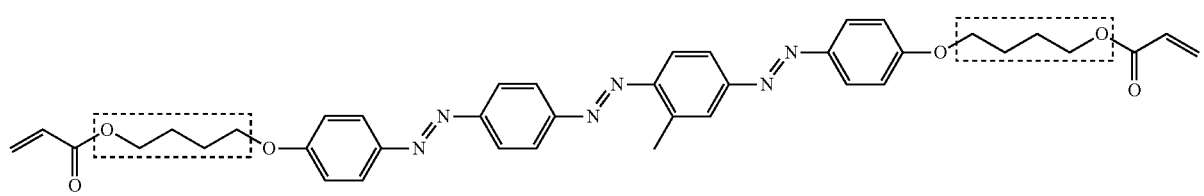

D1

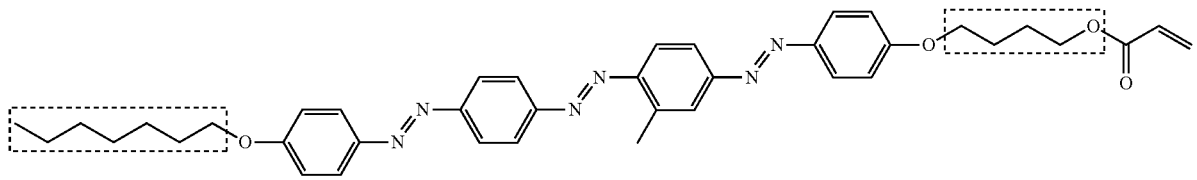

D10

$L_1$ and $L_2$ may have a branched chain.

Here, in a case where A is present in Formula (6), "branched chain" of $L_1$ denotes a portion other than a portion required for directly linking "A" with the "O" atom linked to $L_1$ in Formula (6). Similarly, in a case where B is present in Formula (6), "branched chain" of $L_2$ denotes a portion other than a portion required for directly linking "B" with the "O" atom linked to $L_2$ in Formula (6).

Further, in a case where A is not present in Formula (6), "branched chain" of $L_1$ denotes a portion other than the longest atomic chain (that is, the main chain) extending from the "O" atom linked to $L_1$ in Formula (6) which is the starting point. Similarly, in a case where B is not present in Formula (6), "branched chain" of $L_2$ denotes a portion other than the longest atomic chain (that is, the main chain) extending from the "O" atom linked to $L_2$ in Formula (6) which is a starting point.

The number of atoms in the branched chain is preferably 3 or less. In a case where the number of atoms in the branched chain is set to 3 or less, there is an advantage that the degree of alignment of the light absorption anisotropic layer is further improved. Further, the number of atoms in the branched chain does not include the number of hydrogen atoms.

In Formula (6), $Ar_1$ represents an (n1+2)-valent (for example, trivalent in a case where n1 represents 1) aromatic hydrocarbon group or heterocyclic group, $Ar_2$ represents an (n2+2)-valent (for example, trivalent in a case where n2 represents 1) aromatic hydrocarbon group or heterocyclic group, and $Ar_3$ represents an (n3+2)-valent (for example, trivalent in a case where n3 represents 1) aromatic hydrocarbon group or heterocyclic group, Here, $Ar_1$ to $Ar_3$ can be respectively rephrased as a divalent aromatic hydrocarbon group or a divalent heterocyclic group substituted with n1 to n3 substituents ($R_1$ to $R_3$ described below).

The divalent aromatic hydrocarbon group represented by $Ar_1$ to $Ar_3$ may be monocyclic or may have a bicyclic or higher cyclic fused ring structure. From the viewpoint of further improving the solubility, the number of rings of the divalent aromatic hydrocarbon group is preferably 1 to 4, more preferably 1 or 2, and still more preferably 1 (that is, a phenylene group).

Specific examples of the divalent aromatic hydrocarbon group include a phenylene group, an azulene-diyl group, a naphthylene group, a fluorene-diyl group, an anthracene-diyl group, and a tetracene-diyl group. From the viewpoints of further improving the solubility, a phenylene group or a naphthylene group is preferable, and a phenylene group is more preferable.

Specific examples of the third dichroic azo coloring agent compound are shown below, but the present invention is not limited thereto, in the following specific examples, n represents an integer of 1 to 10.

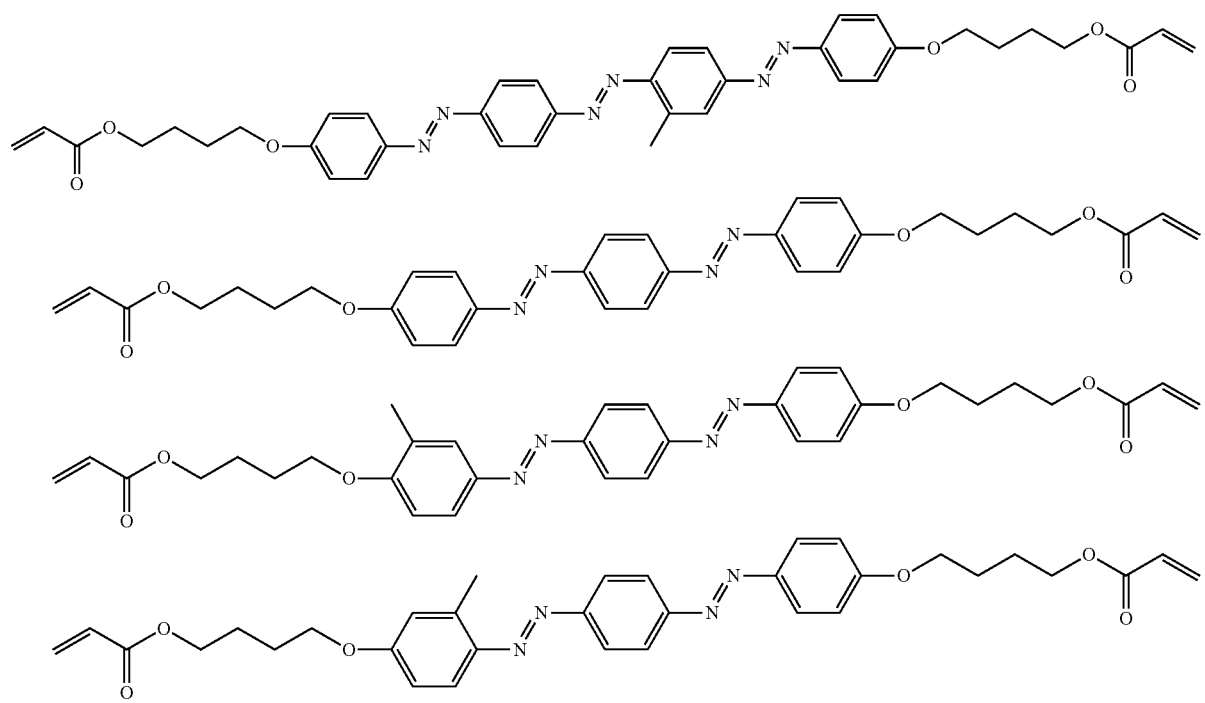

-continued
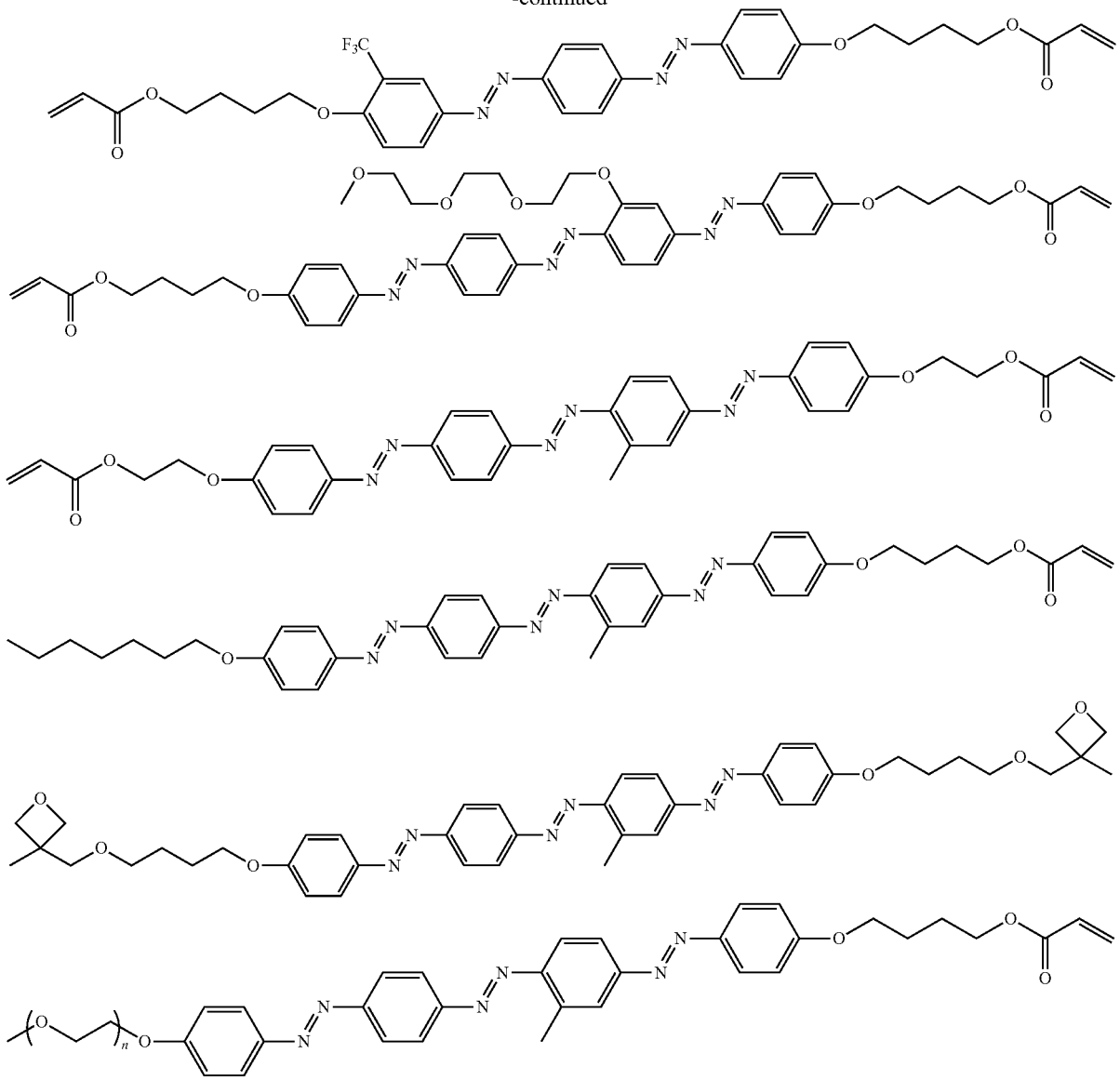
From the viewpoint that the degree of alignment of the light absorption anisotropic layer at a wavelength of 420 nm is excellent, it is preferable that the third dichroic azo coloring agent compound does not contain a radically polymerizable group. Examples thereof include the following structures.
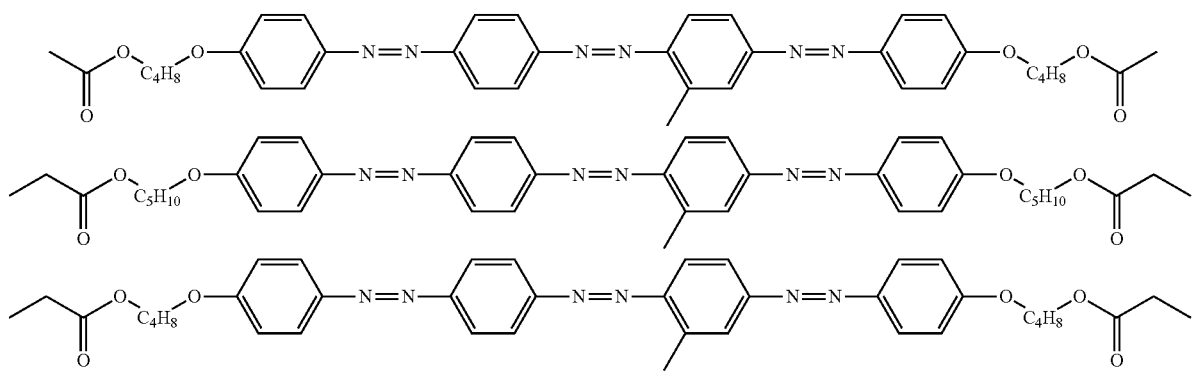

From the viewpoint that the degree of alignment at a wavelength of 420 nm is particularly excellent, it is more preferable that the third dichroic azo coloring agent compound is a dichroic substance having a structure represented by Formula (1-1).

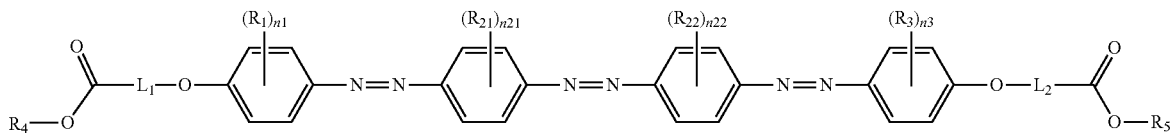

(1-1)

In Formula (14), $R_1$, $R_3$, $R_4$, $R_5$, n1, n3, $L_1$, and $L_2$ each have the same definition as that for $R_1$, $R_3$, $R_4$, $R_5$, n1, n3, $L_1$, and $L_2$ of Formula (1).

In Formula (1-1), $R_{21}$ and $R_{22}$ each have the same definition as that for $R_2$ in Formula (1).

In Formula (1-1), n21 and n22 each have the same definition as that for n2 in Formula (1).

An expression of "n1+n21+n22+n3≥1" is satisfied, and "n1+n21+n22+n3" is preferably in a range of 1 to 9 and more preferably in a range of 1 to 5.

Specific examples of the dichroic substance will be described below, but the present invention is not limited thereto.

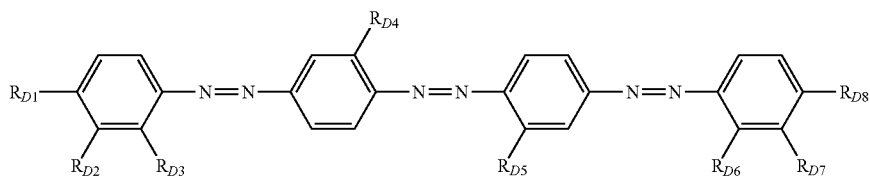

| No | $R_{D1}$ | $R_{D2}$ | $R_{D3}$ | $R_{D4}$ | $R_{D5}$ | $R_{D6}$ | $R_{D7}$ | $R_{D8}$ |
|---|---|---|---|---|---|---|---|---|
| D1 | $OC_4H_8C(O)OCH_2CH_3$ | H | H | H | $CH_3$ | H | H | $OC_4H_8C(O)OCH_2CH_3$ |
| D2 | $OC_4H_8C(O)OCH_3$ | H | H | H | $CH_3$ | H | H | $OC_4H_8C(O)OCH_3$ |
| D3 | $OC_4H_8C(O)OCH_2CH_3$ | H | H | H | $CH_3$ | H | H | $OC_{11}H_{23}$ |
| D4 | $OC_4H_8C(O)OCH_2CH_3$ | H | H | H | $CH_3$ | H | H | $OC_5H_{11}$ |
| D5 | $OC_4H_8C(O)OCH_2CH_3$ | H | H | H | $CH_3$ | H | H | $OCH_2CH_3$ |
| D6 | $OC_4H_8C(O)OCH_2CH_3$ | H | H | H | $CH_3$ | H | Cl | $OC_4H_8C(O)OCH_2CH_3$ |
| D7 | $OC_3H_6C(O)OCH_2CH_3$ | H | H | H | $CH_3$ | H | H | $OC_3H_6C(O)OCH_2CH_3$ |
| D8 | $OC_3H_8C(O)OCH_2CH_3$ | H | H | Cl | H | Cl | H | $OC_3H_8C(O)OCH_2CH_3$ |
| D9 | $OC_9H_{18}C(O)OCH_2CH_3$ | H | H | H | $CH_3$ | H | H | $OC_9H_{18}C(O)OCH_2CH_3$ |
| D10 | $OC_4H_8C(O)OCH_2CH=CH_2$ | H | H | H | $CH_3$ | H | H | $OC_4H_8C(O)OCH_2CH=CH_2$ |
| D11 | $OC_4H_8C(O)OCH_2CH_3$ | H | H | H | Cl | H | H | $OC_4H_8C(O)OCH_2CH_3$ |
| D12 | $OC_6H_4C(O)OCH_2CH_3$ | H | H | H | $CH_3$ | H | H | $OC_6H_4C(O)OCH_2CH_3$ |

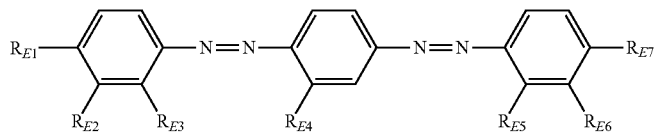

| No | $R_{E1}$ | $R_{E2}$ | $R_{E3}$ | $R_{E4}$ | $R_{E5}$ | $R_{E6}$ | $R_{E7}$ |
|---|---|---|---|---|---|---|---|
| E1 | $OC_4H_8C(O)OCH_2CH_3$ | H | H | H | H | H | $OC_4H_8C(O)OCH_2CH_3$ |
| E2 | $OC_4H_8C(O)OCH_3$ | H | H | H | H | H | $OC_4H_8C(O)OCH_3$ |
| E3 | $OC_4H_8C(O)OCH_2CH_3$ | Cl | H | H | H | Cl | $OC_4H_8C(O)OCH_2CH_3$ |
| E4 | $OC_4H_8C(O)OCH_2CH_3$ | H | H | H | H | Cl | $OC_5H_{11}$ |
| E5 | $OC_4H_8C(O)OCH_2CH_3$ | H | H | $CH_3$ | H | H | $OCH_2CH_3$ |
| E6 | $OC_3H_6C(O)OCH_2CH_3$ | H | H | H | H | H | $OC_3H_6C(O)OCH_2CH_3$ |
| E7 | $OC_9H_{18}C(O)OCH_2CH_3$ | H | H | H | H | H | $OC_9H_{18}C(O)OCH_2CH_3$ |
| E8 | $OC_4H_8C(O)OCH_2CH=CH_2$ | H | H | H | H | H | $OC_4H_8C(O)OCH_2CH=CH_2$ |

-continued

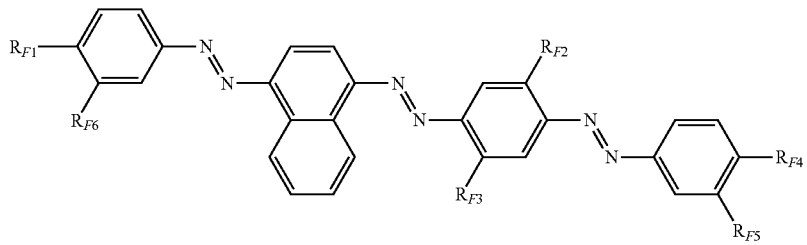

| No | $R_{F1}$ | $R_{F2}$ | $R_{F3}$ | $R_{F4}$ | $R_{F5}$ | $R_{F6}$ |
|---|---|---|---|---|---|---|
| F1 | $OC_4H_8C(O)OCH_2CH_3$ | H | H | $OC_4H_8C(O)OCH_2CH_3$ | H | H |
| F2 | $OC_4H_8C(O)OCH_3$ | H | $CH_3$ | $OC_4H_8C(O)OCH_3$ | H | H |
| F3 | $OC_3H_6C(O)OCH_2CH_3$ | H | H | $OC_3H_6C(O)OCH_2CH_3$ | H | Cl |

The content of the dichroic substance is preferably in a range of 5% to 30% by mass, more preferably in a range of 10% to 28% by mass, and still more preferably in a range of 20% to 26% by mass with respect to the total mass of the light absorption anisotropic layer. In a case where the content of the dichroic substance is in the above-described ranges, a light absorption anisotropic layer having a high degree of alignment can be obtained even in a ease where the light absorption anisotropic layer is formed into a thin film. Therefore, a light absorption anisotropic layer having excellent flexibility is likely to be obtained.

From the viewpoint of increasing the contrast between the illuminance at the center of the viewing angle and the illuminance in a direction deviated from the center of the viewing angle, the content of the dichroic substance in the light absorption anisotropic layer per unit area is preferably 0.20 $g/m^2$ or greater, more preferably 0.30 $g/m^2$ or greater, still more preferably 0.40 $g/m^2$ or greater, and particularly preferably 0.50 $g/m^2$ or greater. The upper limit thereof is not particularly limited, but is 1.00 $g/m^2$ or less in many cases.

The content of the first dichroic azo coloring agent compound is preferably in a range of 40 to 90 parts by mass and more preferably in a range of 45 to 75 parts by mass with respect to 100 parts by mass of the total content of the dichroic substance in the light absorption anisotropic layer.

The content of the second dichroic azo coloring agent compound is preferably in a range of 6 to 50 parts by mass and more preferably in a range of 8 to 35 parts by mass with respect to 100 parts by mass of the total content of the dichroic substance in the light absorption anisotropic layer.

The content of the third dichroic azo coloring agent compound is preferably in a range of 3 to 35 parts by mass and more preferably in a range of 5 to 35 parts by mass with respect to 100 parts by mass of the content of the dichroic azo coloring agent compound in the light absorption anisotropic layer.

The content ratio between the first dichroic azo coloring agent compound, the second diehroic azo coloring agent compound, and the third dichroic azo coloring agent compound used as necessary can be optionally set in order to adjust the tint of the light absorption anisotropic layer. However, the content ratio of the second dichroic azo coloring agent compound to the first dichroic azo coloring agent compound (second dichroic azo coloring agent compound/first dichroic azo coloring agent compound) is preferably in a range of 0.1 to 10, more preferably in a range of 0.2 to 5, and particularly preferably in a range of 0.3 to 0.8 in terms of moles. In a case where the content ratio of the second dichroic azo coloring agent compound to the first dichroic azo coloring agent compound is in the above-described ranges, the degree of alignment is increased.

The light absorption anisotropic layer in the present invention can be prepared, for example, by using a composition for forming a light absorption anisotropic layer which contains the liquid crystal compound and the dichroic substance described above.

The composition for forming a light absorption anisotropic layer may contain components other than the liquid crystal compound and the dichroic substance, and examples thereof include a solvent, a vertical alignment agent, a interface improver, a polymerizable component, and a polymerization initiator (such as a radical polymerization initiator). In this case, the light absorption anisotropic layer in the present invention contains a solid component other than a liquid component such as a solvent).

(Interface Improver)

As the interface improver, the interface improver described in the columns of the examples described below can be used.

In a case where the composition for forming a light absorption anisotropic layer contains an interface improver, the content of the interface improver is preferably in a range of 0.001 to 5 parts by mass with respect to 100 parts by mass of the total amount of the diehroic substance and the liquid crystal compound in the composition for forming a light absorption anisotropic layer.

(Polymerizable Component)

Examples of the polymerizable component include a compound containing an acrylate (such as an acrylate monomer). In this case, the light absorption anisotropic layer in the present invention contains a polyacrylate obtained by polymerizing the compound containing an acrylate.

Examples of the polymerizable component include the compounds described in paragraph [0058] of JP2017-122776A.

In a case where the composition for forming a light absorption anisotropic layer contains a polymerizable component, the content of the polymerizable component is preferably in a range of 3 to 20 parts by mass with respect to 100 parts by mass of the total content of the dichroic substance and the liquid crystal compound in the composition for forming a light absorption anisotropic layer.

(Vertical Alignment Agent)

Examples of the vertical alignment agent include a boronic acid compound and an onium salt.

As the boronic acid compound, a compound represented by Formula (30) is preferable.

Formula (30)

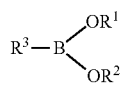

In Formula (30), R¹ and R² each independently represent a hydrogen atom, a substituted or unsubstituted aliphatic hydrocarbon group, a substituted or unsubstituted aryl group, or a substituted or unsubstituted heterocyclic group.

R³ represents a substituent containing a (meth)acryl group.

Specific examples of the boronic acid compound include a boronic acid compound represented by General Formula (I) described in paragraphs [0023] to [0032] of JP2008-225281A.

As the horonic acid compound, compounds shown below are also preferable.

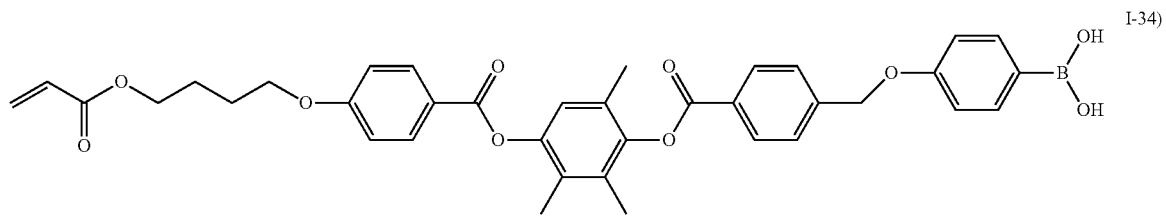

I-34)

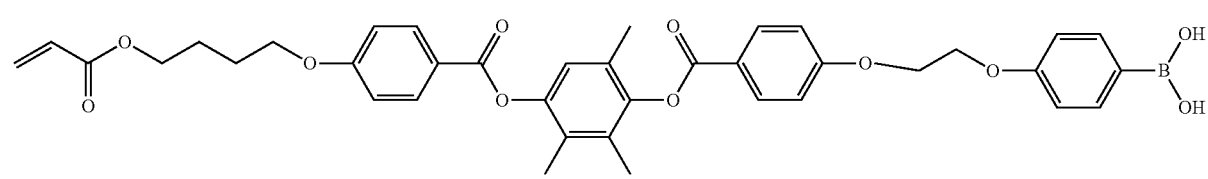

I-35)

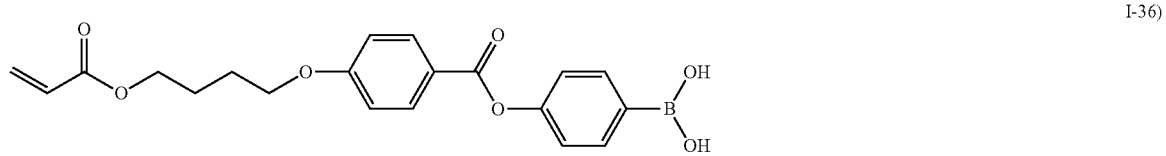

I-36)

As the onium salt, a compound represented by Formula (31) is preferable.

Formula (31)

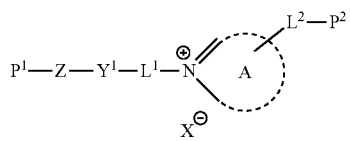

In Formula (31), the ring A represents a quaternary ammonium ion consisting of a nitrogen-containing heterocyclic ring, X⁻ represents an anion. L¹ represents a divalent linking group. L² represents a single bond or a divalent linking group. Y¹ represents a divalent linking group having a 5- or 6-membered ring as a partial structure. Further, Z represents a divalent linking group containing an alkylene group having 2 to 20 carbon atoms as a partial structure.

Further, P¹ and P² each independently represent a monovalent substituent having a polymerizable ethylenically unsaturated bond.

Specific examples of the onium salt include the onium salts described in paragraphs [0052] to [0058] of JP2012-208397A, the onium salts described in paragraphs [0024] to [0055] of JP2008-026730A, and the onium salts described in JP2002-037777A.

The content of the vertical alignment agent in the composition for forming a light absorption anisotropic layer (light absorption anisotropic layer) is preferably in a range of 0.1% to 40% by mass and more preferably in a range of 0.5% to 35% by mass with respect to the total mass of the liquid crystal compound.

The vertical alignment agent may be used alone or in combination of two or more kinds thereof. In a case where two or more kinds of vertical alignment agents are used, the total amount thereof is preferably in the above-described ranges.

(Leveling Agent Suitable for Vertical Alignment)

It is preferable that the composition for forming a light absorption anisotropic layer (light absorption anisotropic layer) contains the following leveling agents. In a case where the composition for forming a light absorption anisotropic layer (light absorption anisotropic layer) contains a leveling agent, the surface roughness due to dry air applied to the surface of the light absorption anisotropic layer is suppressed, and the dichroic substance is more uniformly aligned.

The leveling agent is not particularly limited, and a leveling agent having a fluorine atom (fluorine-based leveling agent) or a leveling agent having a silicon atom (silicon-based leveling agent) is preferable, and a fluorine-based leveling agent is more preferable.

Examples of the fluorine-based leveling agent include fatty acid esters of polyvalent carboxylic acids in which a part of a fatty acid is substituted with a fluoroalkyl group and polyacrylates having a fluoro substituent. Particularly in a case where a rod-like compound is used as the dichroic substance and the liquid crystal compound, a leveling agent having a repeating unit derived from a compound represented by Formula (40) is preferable from the viewpoint of promoting the vertical alignment of the dichroic substance and the liquid crystal compound.

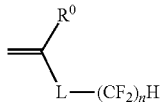

Formula (40)

R⁰ represents a hydrogen atom, a halogen atom, or a methyl group.

L represents a divalent linking group. It is preferable that L represents an alkylene group having 2 to 16 carbon atoms, and optional —CH₂— that is not adjacent to the alkylene group may be substituted with —O—, —COO—, —CO—, or —CONH—.

n represents an integer of 1 to 18.

The leveling agent having a repeating unit derived from a compound represented by Formula (40) may further have other repeating units.

Examples of the other repeating units include a repeating unit derived from a compound represented by Formula (41).

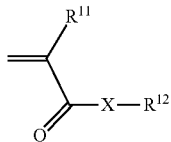

Formula (41)

$R^{11}$ represents a hydrogen atom, a halogen atom, or a methyl group.

X represents an oxygen atom, a sulfur atom, or —N($R^{13}$)—. $R^{13}$ represents a hydrogen atom or an alkyl group having 1 to 8 carbon atoms.

$R^{12}$ represents a hydrogen atom, an alkyl group which may have a substituent, or an aromatic group which may have a substituent. Further, the number of carbon atoms of the alkyl group is preferably in a range of 1 to 20. The alkyl group may be linear, branched, or cyclic.

Further, examples of the substituent that the alkyl group may have include a poly(alkyleneoxy) group and a polymerizable group. The definition of the polymerizable group is as described above.

In a case where the leveling agent has a repeating unit derived from a compound represented by Formula (40) and a repeating unit derived from a compound represented by Formula (41), the content of the repeating unit derived from the compound represented by Formula (40) is preferably in a range of 10% to 90% by mole and more preferably in a range of 15% to 95% by mole with respect to all the repeating units of the leveling agent.

In the case where the leveling agent has a repeating unit derived from a compound represented by Formula (40) and a repeating unit derived from a compound represented by Formula (41), the content of the repeating unit derived from the compound represented by Formula (41) is preferably in a range of 10% to 90% by mole and more preferably in a range of 5% to 85% by mole with respect to all the repeating units of the leveling agent.

Further, examples of the leveling agent include a leveling agent having a repeating unit derived from a compound represented by Formula (42) in place of the repeating unit derived from a compound represented by Formula (40).

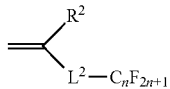

Formula (42)

$R^2$ represents a hydrogen atom, a halogen atom, or a methyl group.

$L^2$ represents a divalent linking group.

n represents an integer of 1 to 18.

Specific examples of the leveling agent include the compounds described in paragraphs [0046] to [0052] of JP2004-331812A and the compounds described in paragraphs [0038] to [0052] of JP2008-257205A.

The content of the leveling agent in the composition for forming a light absorption anisotropic layer (light absorption anisotropic layer) is preferably in a range of 0.001% to 10% by mass and more preferably in a range of 0.01% to 5% by mass with respect to the total mass of the liquid crystal compound.

The leveling agent may be used alone or in combination of two or more kinds thereof. In a case where two or more leveling agents are used, it is preferable that the total amount thereof is in the above-described ranges.

(Polymerization Initiator)

It is preferable that the composition for forming a light absorption anisotropic layer contains a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxiine compounds (paragraph [0065] of JP2016-027384A), and acylphosphine oxide compounds (JP1988-040799B (JP-S63-040799B), JP1993-029234B (JP-H05-029234B), JP1998-095788A (JP-H10-095788A), and JP1998-029997A (JP-H10-029997A)).

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

In a case where the composition for forming a light absorption anisotropic layer contains a polymerization initiator, the content of the polymerization initiator is preferably in a range of 0.01 to 30 parts by mass and more preferably in a range of 0.1 to 15 parts by mass with respect to 100 parts by mass of the total amount of the dichroic substance and the liquid crystal compound in the composition for forming a light absorption anisotropic layer. The durability of the light absorption anisotropic layer is enhanced in a case where the content of the polymerization initiator is 0.01 parts by mass or greater, and the degree of alignment of the light absorption anisotropic layer is further enhanced in a case where the content thereof is 30 parts by mass or less.

The polymerization initiator may be used alone or in combination of two or more kinds thereof. In a case where the composition contains two or more kinds of polymerization initiators, it is preferable that the total amount of the polymerization initiators is in the above-described ranges.
(Solvent)

From the viewpoints of the workability and the like, it is preferable that the composition for forming a light absorption anisotropic layer contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, 2-methyltetrahydrofuran, cyclopentyl methyl ether, tertrahydropyran, and dioxolanes), aliphatic hydrocarbons (such as hexane), alicyclic hydrocarbons (such as cyclohexane), aromatic hydrocarbons (such as benzene, toluene, xylene, and tritnethylbenzene), carbon halides (such as dichloromethane, trichloromethane, dichloroethane, dichlorobenzene, and chlorotoluene), esters (such as methyl acetate, ethyl acetate, butyl acetate, and ethyl lactate), alcohols (such as ethanol, isopropanol, butanol, cyclohexanol, isopentyl alcohol, neopentyl alcohol, diacetone alcohol, and benzyl alcohol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, and N-ethylpyrrolidone), and heterocyclic compounds (such as pyridine), and water. These solvents may be used alone or in combination of two or more kinds thereof.

Among these solvents, from the viewpoint of exhibiting the effect of the excellent solubility; ketones (particularly cyclopentanone and cyclohexanone), ethers (particularly tetrahydrofuran, cyclopentyl methyl ether, tetrahydropyran, and dioxolan), and amides (particularly dimethylformamide, dimethylacetamide, N-methylpyrrolidone, and N-ethylpyrrolidone) are preferable.

In a case where the composition tier forming a light absorption anisotropic layer contains a solvent, the content of the solvent is preferably in a range of 80% to 99% by mass, preferably in a range of 83% to 97% by mass, and still more preferably in a range of 83% to 95% by mass with respect to the total mass of the composition for forming a light absorption anisotropic layer.

These solvents may be used alone or in combination of two or more kinds thereof. In a case where the composition contains two or more kinds of solvents, it is preferable that the total amount of the solvents is in the above-described range <Method of Forming Light Absorption Anisotropic Layer>

A method of forming the light absorption anisotropic layer is not particularly limited, and examples thereof include a method of sequentially performing a step of applying a composition for forming a light absorption anisotropic layer to form a coating film (hereinafter, also referred to as "coating film forming step") and a step of aligning liquid crystal components contained in the coating film (hereinafter, also referred to as "aligning step").

Further, the liquid crystal component is a component that also includes a dichroic substance having liquid crystallinity in a case where the above-described dichroic substance has liquid crystallinity, in addition to the above-described liquid crystal compound.

The light absorption anisotropic layer is preferably a layer formed of the composition for forming a light absorption anisotropic layer and more preferably a layer (cured layer) obtained by performing a curing treatment on the coating film formed of the composition for forming a light absorption anisotropic layer.
(Coating Film Forming Step)

The coating film forming step is a step of applying a composition for forming a light absorption anisotropic layer to form a coating film.

The composition for forming a light absorption anisotropic layer can be easily applied by using the composition for forming a light absorption anisotropic layer which contains the above-described solvent or using a liquid such as a melt obtained by heating the composition for forming a light absorption anisotropic layer.

Further, it is preferable that the content of various components contained in the composition for forming the light absorption anisotropic layer is adjusted to the content of each component in the above-described light absorption anisotropic layer.

Examples of the method of applying the composition for forming a light absorption anisotropic layer include known methods such as a roll coating method, a gravure printing method, a spin coating method, a wire bar coating method, an extruasion coating method, a direct gravure coating method, a reverse gravure coating method, a die coating method, a spraying method, and an ink jet method.
(Aligning Step)

The aligning step is a step of aligning the liquid crystal component contained in the coating film in this manner, a light absorption anisotropic layer is obtained.

The aligning step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the liquid crystal component contained in the composition for forming a light absorption anisotropic layer may be aligned by the coating film forming step or the drying treatment described above. For example, in an embodiment in which the composition for forming a light absorption anisotropic layer is prepared as a coating solution containing a solvent, a coating film having light absorption anisotropy (that is, a light absorption anisotropic layer) is obtained by drying the coating film and removing the solvent from the coating film.

In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability. It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the light absorption anisotropic layer.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal component contained in the coating film can be fixed. The cooling means is not particularly limited and can be performed according to a known method.

The light absorption anisotropic layer can be obtained by performing the above-described steps.

In the present aspect, examples of the method of aligning the liquid crystal component contained in the coating film include a drying treatment and a heat treatment, but the method is not limited thereto, and the liquid crystal component can be aligned by a known alignment treatment.

(Other Steps)

The method of forming the light absorption anisotropic layer may include a step of curing the light absorption anisotropic layer after the aligning step (hereinafter, also referred to as a "curing step").

The curing step is performed by heating the light absorption anisotropic layer and/or irradiating the layer with light (exposing the layer to light), for example, in a case where the light absorption anisotropic layer contains a crosslinkable group (polymerizable group). Between these, it is preferable that the curing step is performed by irradiating the film with light.

Various light sources such as infrared rays, visible light, and ultraviolet light (ultraviolet rays) can be used as the light source for curing, but ultraviolet rays are preferable. In addition, ultraviolet rays may be applied while the layer is heated during curing, or ultraviolet rays may be applied through a filter that transmits only a specific wavelength.

In a case where the exposure is performed while the layer is heated, the heating temperature during the exposure depends on the transition temperature of the liquid crystal components contained in the liquid crystal film to a liquid crystal phase, but is preferably in a range of 25° to 140° C.

Further, the exposure may be performed under a nitrogen atmosphere. In a case where the curing of the liquid crystal film proceeds by radical polymerization, from the viewpoint of reducing inhibition of polymerization by oxygen, it is preferable that exposure is performed in a nitrogen atmosphere.

The thickness of the light absorption anisotropic layer is not particularly limited, but is preferably in a range of 100 to 8000 nm and more preferably in a range of 300 to 5000 nm from the viewpoint of reducing the size and the weight.

<Patterning of Light Absorption Anisotropic Layer>

The light absorption anisotropic layers (the first light absorption anisotropic layer and the second light absorption anisotropic layer) may be light absorption anisotropic layers having a region A and a region B with different transmittance central axes. It is preferable that the region A and the region B are respectively positioned in the in-plane direction. In a case where light emitting pixels are controlled by patterning each pixel of the liquid crystal, the center of the visual field in a narrow visual field can be switched.

Further, the light absorption anisotropic layer used in the present invention has a region C and a region D, and the transmittance at a wavelength of 550 nm in a direction inclined by 30° on a side of the film surface from the transmittance central axis of the region C in the plane including the transmittance central axis of the region C and the normal line of the film surface is different from the transmittance at a wavelength of 550 nm in a direction inclined by 30° on the side of the film surface from the transmittance central axis of the region D in the plane including the transmittance central axis of the region D and the normal line of the film surface. It is preferable that the region C and the region D are respectively positioned in the in-plane direction.

In this case, the transmittance of P polarized light in a direction inclined by 30° on the side of the film surface from the transmittance central axis of the region C is preferably 30% or less, and the transmittance of P polarized light in a direction inclined by 30° on the side of the film surface from the transmittance central axis of the region D is preferably 80% or greater.

The viewing angle dependence in some regions can be strengthened or weakened by performing the patterning. In this manner, highly confidential information can also be displayed only in the region where the viewing angle dependence is strengthened. Further, design with excellent designability can be carried out by controlling the viewing angle dependence as a display device for each display position. Further, in a case where the light emitting pixels are controlled by performing patterning fix each pixel of the liquid crystal, it is possible to switch between a narrow viewing angle and a wide viewing angle.

As described above, the method of forming the patterned light absorption anisotropic layer having two or more regions different in the plane is not limited, and various known methods as described in, for example, WO2019/176918A can be used. Examples thereof include a method of forming a pattern by changing the irradiation angle of ultraviolet light to be applied to a photoalignment layer, a method of controlling the thickness of a patterned light absorption anisotropic layer in the plane, a method of unevenly distributing a dichroic substance in a patterned light absorption anisotropic layer, and a method of post-processing an optically uniform patterned light absorption anisotropic layer.

Examples of the method of controlling the thickness of a patterned light absorption anisotropic layer (hereinafter, also referred to as a patterned light absorption anisotropic layer) in the plane as described above include a method of using lithography, a method of using imprint, and a method of forming a patterned light absorption anisotropic layer on a base material having an uneven structure. Examples of the method of unevenly distributing a dichroic substance in a patterned light absorption anisotropic layer include a method of extracting a dichroic substance by solvent immersion (bleaching). Further, examples of the method of post-processing an optically uniform patterned light absorption anisotropic layer include a method of cutting a part of a flat light absorption anisotropic layer by laser processing.

In a case where the transmittance central axis of the first light absorption anisotropic layer or the transmittance central axis of the second light absorption anisotropic layer is inclined with respect to the normal line of the film surface in the liquid crystal display device according to the embodiment of the present invention, an angle φ1 between the plane including the transmittance central axis of the first light absorption anisotropic layer and the normal line of the film surface and the absorption axis of the first polarizer and the angle φ2 between the plane including the transmittance central axis of the second light absorption anisotropic layer and the normal line of the film surface and the absorption axis of the second polarizer are each independently preferably in a range of 45° to 90°, more preferably in a range of 80° to 90°, and still more preferably in a range of 88° to 90°. As the angle is closer to 90°, the illuminance contrast between a direction in which the liquid crystal display device is easily seen and a direction in which the liquid crystal display device is not easily seen can be provided.

In other words, the angle (corresponding to the angle φ1) between the projection line in which the transmittance central axis of the first light absorption anisotropic layer is projected on the surface of the first light absorption anisotropic layer and the absorption axis of the first polarizer and the angle (corresponding to the angle φ2) between the projection line in which the transmittance central axis of the second light absorption anisotropic layer is projected on the surface of the second light absorption anisotropic layer and the absorption axis of the second polarizer are each independently preferably in a range of 45" to 90°, more preferably in a range of 80° to 90°, and still more preferably in a range of 88° to 90°.

The angle φ1 will be described in more detail with reference to the accompanying drawing.

Figure 2:
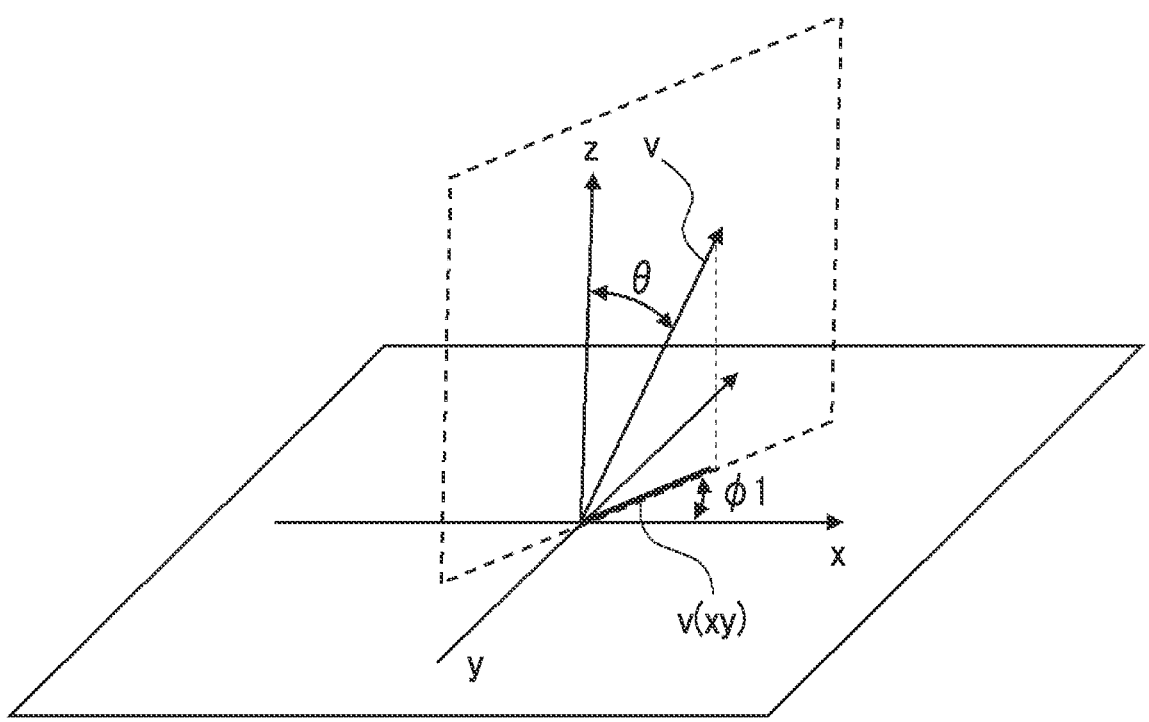
FIG. 2 is a schematic view for describing a direction in which a transmittance central axis of a light absorption anisotropic layer is orthographically projected onto a film surface.

FIG. 2 illustrates a schematic view for describing a direction in which the transmittance central axis of the light absorption anisotropic layer is orthographically projected onto the film surface. As illustrated in FIG. 2, the direction in which a transmittance central axis v of the light absorption anisotropic layer is orthographically projected onto the film surface (the surface of the optically anisotropic layer) is defined as v (xy). In a case where the absorption axis of the polarizer is in the y-axis direction, the angle between the projection line v (xy) in which the transmittance central axis of the light absorption anisotropic layer is projected on the surface of the light absorption anisotropic layer and the absorption axis (y-axis) of the first polarizer corresponds to the angle φ1 (or the angle φ$_2$) described above.

Further, the plane including the transmittance central axis of the light absorption anisotropic layer and the normal line of the film surface denotes the surface (surface through which the z-axis and the transmittance central axis v pass) having the z-axis and the transmittance central axis v and indicated by the broken line in FIG. 2.

In the present invention, in a case where the relationship of the angle between the transmittance central axis of the first light absorption anisotropic layer and the absorption axis of the first polarizer is equivalent to the relationship of the angle between the transmittance central axis of the second light absorption anisotropic layer and the absorption axis of the second polarizer, a laminate of the light absorption anisotropic layer and the polarizer can be efficiently produced because the laminate is prepared by bonding the light absorption anisotropic layer and the polarizer with a pressure sensitive adhesive or an adhesive or coating a polarizer with the light absorption anisotropic layer so as to be laminated and the identical laminate can be used only by changing the orientation of the polarizer by 90° on the front side and the rear side of the liquid crystal cell.

<Polarizer>

The polarizers (the first polarizer and the second polarizer) used in the present invention are not particularly limited as long as the polarizers are members having a function of converting light into specific linearly polarized light, and known polarizers of the related art can be used.

Examples of the polarizer (the first polarizer and the second polarizer) include an iodine-based polarizer, a dye-based polarizer formed of a dichroic dye, and a polyene-based polarizer. Examples of the iodine-based polarizer and the dye-based polarizer include a coating type polarizer and a stretching type polarizer, and both polarizers can be applied. A polarizer in which a dichroic organic coloring agent is aligned by using alignment of the liquid crystal compound is preferable as the coating type polarizer, and a polarizer prepared by adsorbing iodine or a dichroic dye on polyvinyl alcohol and stretching the polyvinyl alcohol is preferable as the stretching type polarizer.

Further, examples of the method of obtaining a polarizer by stretching and dyeing a laminated film in which a polyvinyl alcohol layer is formed on a base material include methods described in JP5048120B, JP5143918B, JP5048120B, JP4691205B, JP4751481B, and JP4751486B, and known techniques related to these polarizers can also be preferably used.

Among these, from the viewpoints of the availability and the excellent degree of polarization, a polarizer containing a polyvinyl alcohol-based resin (a polymer having —CH$_2$—CHOH— as a repeating unit, particularly at least one selected from the group consisting of polyvinyl alcohol and an ethylene-vinyl alcohol copolymer) is preferable.

The thickness of the polarizers (the first polarizer and the second polarizer) is not particularly limited, but is preferably in a range of 1 to 60 μm, more preferably in a range of 1 to 20 μm, and still more preferably in a range of 1 to 10 μm.

<Liquid Crystal Cell>

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal molecules are substantially horizontally aligned at the time of no voltage application and further twistedly aligned at 60° to 120°. The liquid crystal cell in a TN mode is most likely used as a color thin film transistor (TFT) liquid crystal display device and is described in multiple documents.

In the liquid crystal cell in a VA mode, rod-like liquid crystal molecules are substantially vertically aligned at the time of no voltage application. The concept of the liquid crystal cell in a VA mode includes (1) a liquid crystal cell in a VA mode in a narrow sense where rod-like liquid crystal molecules are aligned substantially vertically at the time of no voltage application and substantially horizontally at the time of voltage application (described in JP1990-176625A (JP-H2-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application. (described in proceedings of Japanese Liquid Crystal Conference, p. 58 to 59 (1998)), and (4) a liquid crystal cell in a SURVIVAL mode (presented at LCD International 98). Further, the liquid crystal cell may be of any of a patterned vertical alignment (PVA) type, a photoaligninent (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizer are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (IP-H10-307291A).

The liquid crystal display device according to the embodiment of the present invention includes the light absorption anisotropic layers (the first light absorption anisotropic layer and the second light absorption anisotropic layer), the polarizers (the first polarizer and the second polarizer), and the liquid crystal cell described above.

A method of producing the liquid crystal display device is not particularly limited, and known methods can be used, Examples of known methods include a method of laminating each layer using a pressure sensitive adhesive layer or an adhesive layer described below.

Further, the light absorption anisotropic layer and the polarizer may be laminated via a pressure sensitive adhesive or an adhesive or may be laminated by directly coating the polarizer with an alignment layer described below and the light absorption anisotropic layer.

The liquid crystal display device according to the embodiment of the present invention may include other members in addition to the above-described members (the light absorption anisotropic layers, the polarizers, and the liquid crystal cell).

Hereinafter, other members will be described in detail.
<Transparent Base Material Film>
The liquid crystal display device according to the embodiment of the present invention may include a transparent base material film.

It is preferable that the transparent base material film is disposed on a surface of the light absorption anisotropic layer opposite to the surface on which the protective layer is provided.

As the transparent base material film, known transparent resin films, transparent resin plates, transparent resin sheets, and the like can be used without particular limitation.

Examples of the transparent resin film include a cellulose acylate film (such as a cellulose triacetate film (refractive index of 1.48), a cellulose diacetate film, a cellulose acetate butyrate film, or a cellulose acetate propionate film), a polyethylene terephthalate film, a polyether sulfone film, a polyacrylic resin film, a polyurethane-based resin film, a polyester film, a polycarbonate film, a polysulthne film, a polyether film, a polymethylpentene film, a polyether ketone film, and a (meth)acrylonitrile Among these, a cellulose acylate film which is highly transparent, has a small optical birefringence, is easily produced, and is typically used as a protective film of a polarizer is preferable, and a cellulose triacetate film is more preferable.

The thickness of the transparent base material film is preferably in a range of 20 to 100 μm.

In the present invention, it is more preferable that the transparent base material film is a cellulose ester-based film having a film thickness of 20 to 70 μm.
<Alignment Layer>
The liquid crystal display device according to the embodiment of the present invention may include an alignment layer between the transparent base material film and the light absorption anisotropic layer.

The alignment layer may be any layer as long as the dichroic substance can be made to be in a desired alignment state on the alignment layer.

Examples of the alignment layer include a film formed of a polyfunctional acrylate compound and a film containing polyvinyl alcohol. Among these, the film containing polyvinyl alcohol is preferable.

In a case of inclining an alignment axis, for example, the alignment axis can be inclined by irradiating the photoalignment layer containing a photoalignment compound such as an azo compound or a chmamoyl compound with UV light in an oblique direction, and as a result, the transmittance central axis can be inclined with respect to the normal direction of the film (the normal direction with respect to the surface of the light absorption anisotropic layer).
<Barrier Layer>
It is also preferable that the liquid crystal display device according to the embodiment of the present invention has a barrier layer together with the light absorption anisotropic layer.

Here, the barrier layer is also referred to as a gas blocking layer (oxygen blocking layer) and has a function of protecting the light absorption anisotropic layer of the present invention from gas such as oxygen in the atmosphere, the moisture, or the compound contained in an adjacent layer.

As the barrier layer, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A can be referred to.
<Refractive Index Adjusting Layer>
In the liquid crystal display device according to the embodiment of the present invention, the above-described light absorption anisotropic layer contains a dichroic substance, and internal reflection due to the high refractive index of the light absorption anisotropic layer may be a problem. In that case, it is preferable that the refractive index adjusting layer is present. The refractive index adjusting layer is a layer disposed to come into contact with the light absorption anisotropic layer and has an in-plane average refractive index of 1.55 to 1.70 at a wavelength of 550 nm. It is preferable that the refractive index adjusting layer is a refractive index adjusting layer for performing so-called index matching.
<Pressure Sensitive Adhesive Layer>
The liquid crystal display device according to the embodiment of the present invention may include a pressure sensitive adhesive layer.

The pressure sensitive adhesive layer in the present invention is preferably a transparent and optically isotropic adhesive similar to that used in a typical liquid crystal display device and more preferably a pressure sensitive type adhesive.

The pressure sensitive adhesive layer may contain appropriate additives such as a crosslinking agent (such as an isocyanate-based crosslinking agent or an epoxy-based crosslinking agent), a viscosity imparting agent (such as a rosin derivative resin, a polyterpene resin, a petroleum resin, or an oil-soluble phenol resin), a plasticizer, a filler, an antiaging agent, a surfactant, an ultraviolet absorbing agent, a light stabilizer, and an antioxidant in addition to a parent material (pressure sensitive adhesive)), conductive particles, and thermally expandable particles used as necessary.

The thickness of the pressure sensitive adhesive layer is preferably in a range of 5 to 500 μm and more preferably in a range of 5 to 250 μm. The required adhesive strength and rework suitability can be easily obtained in a case where the thickness thereof is 5 μm or greater, and protruding of the pressure sensitive adhesive from a peripheral end portion of the liquid crystal display device and bleeding are suppressed in a case where the thickness thereof is 500 μm or less.

Examples of a method of forming the pressure sensitive adhesive layer include a method of applying a coating solution containing a parent material, conductive particles, and, as necessary, thermally expandable particles, an additive, a solvent, and the like and performing pressure bonding via a release liner and a method of coating an appropriate release liner (release paper or the like) with a coating solution to form a pressure sensitive adhesive layer and pressure-bonding and transferring (transporting) the pressure sensitive adhesive layer.

In addition, for example, a configuration in which conductive particles are added to a configuration of a thermally-releasable pressure sensitive adhesive sheet described in JP2003-292916A can be employed as the pressure sensitive adhesive layer.

Further, a layer in which conductive particles are sprayed on the surface of a pressure sensitive adhesive layer in commercially available products such as "REVALPHA" (manufactured by Nitto Denko Corporation) may be used as the pressure sensitive adhesive layer.

<Adhesive Layer>

The liquid crystal display device according to the embodiment of the present invention may include an adhesive layer.

The adhesive contained in the adhesive layer exhibits adhesiveness due to drying or reaction after attachment.

For example, a polyvinyl alcohol-based adhesive (PVA-based adhesive) exhibits adhesiveness due to drying and is capable of bonding materials to each other.

Specific examples of the curable adhesive that exhibits adhesiveness due to reaction include an active energy ray-curable adhesive such as a (meth) acrylate-based adhesive and a cationic polymerization curable adhesive. Further, the (meth)acrylate denotes acrylate and/or methacrylate. Examples of the curable component in the (meth)acrylate-based adhesive include a compound containing a (meth) acryloyl group and a compound containing a vinyl group. Further, as the cationic polymerization curable adhesive, a compound containing an epoxy group or an oxetanyl group can also be used. The compound containing an epoxy group is not particularly limited as long as the compound contains at least two epoxy groups in a molecule, and various generally known curable epoxy compounds can be used. Preferred examples of the epoxy compound include a compound (aromatic epoxy compound) containing at least two epoxy groups and at least one aromatic ring in a molecule and a compound (alicyclic epoxy compound) containing at least two epoxy groups in a molecule, in which at least one of the epoxy groups is formed between two adjacent carbon atoms constituting an acyclic ring.

Among these, an ultraviolet curable adhesive that is cured by irradiation with ultraviolet rays is preferably used from the viewpoint of heat deformation resistance.

An ultraviolet absorbing agent such as a salicylic acid ester-based compound, a benzophenol-based compound, a benzotriazole-based compound, a cyanoacrylate-based compound, or a nickel complex salt-based compound may be added to each of the adhesive layer and the pressure sensitive adhesive layer so that these layers have an ultraviolet absorbing ability.

A method of attaching the pressure sensitive adhesive layer and the adhesive layer is not particularly limited. Examples of the method include a method of dissolving or dispersing a base polymer or a composition thereof in a solvent such as toluene or ethyl acetate to prepare a pressure sensitive adhesive solution having a concentration of approximately 10% to 40% by mass and directly attaching the pressure sensitive adhesive solution onto a material to be coated using a method such as a casting method or a coating method. Further, other examples thereof include a method of forming a pressure sensitive adhesive layer or an adhesive layer on a separator and transferring the layer.

The pressure sensitive adhesive layer and the adhesive layer can also be provided on one or both surfaces of a film as superposed layers with different compositions or different types. In a case where the pressure sensitive adhesive layer and the adhesive layer are provided on both surfaces, the pressure sensitive adhesive layer and the adhesive layer with different compositions, types, or thicknesses may be used on the front and rear surfaces of the film.

<Other Layers>

In order to control the angle dependence of the viewing angle, the liquid crystal display device according to the embodiment of the present invention may further include an optically anisotropic film or an azimuth rotator.

For example, it is also preferable to use a resin film having optical anisotropy which consists of a polymer having repeating units derived from carbonate, cycloolefin, cellulose acylate, methyl methacrylate, styrene, a maleic acid anhydride, and the like.

Further, the liquid crystal display device according to the embodiment of the present invention may include a retardation layer, and examples of the retardation layer include a positive A-plate, a negative A-plate, a positive C-plate, a negative C-plate, a B-plate, and an O-plate. From the viewpoint of reducing the thickness, the thickness of the retardation layer is preferably in a range of 1 to 150 μm, more preferably in a range of 1 to 70 μm, and still more preferably in a range of 1 to 30 μm.

Here, the B-plate denotes a biaxial optical member in which the refractive indices nx, ny, and nz are values different from each other. Refractive indices nx and ny are refractive indices in the in-plane direction of an optical member, and typically, nx represents a refractive index of a slow axis azimuth and ny represents a refractive index of a fast axis azimuth (that is, the azimuth perpendicular to the slow axis).

<Liquid Crystal Display Device>

Some liquid crystal display devices according to the embodiment of the present invention are thin and can be molded into a curved surface. Since the light absorption anisotropic layer used in the present invention is thin and easily bent, the light absorption anisotropic layer can be suitably applied to a liquid crystal display device having a curved display surface.

Further, some liquid crystal display devices have a pixel density of greater than 250 ppi and are capable of high-definition display. The light absorption anisotropic layer used in the present invention can be suitably applied to such a high-definition liquid crystal display device without causing moire.

EXAMPLES

Hereinafter, the present invention will be described in more detail based on the following examples. The materials, the reagents, the amounts of materials and the proportions of the materials, the operations, and the like shown in the following examples can be appropriately changed within a range not departing from the scope of the present invention. Therefore, the scope of the present invention is not limited to the following specific examples.

Example 1

A light absorption anisotropic layer in which a coloring agent (dichroic substance) was aligned in the vertical direction was prepared in the following manner.

(Preparation of Transparent Support 1)

The surface of a cellulose acylate film 1 (TAC base material with a thickness of 40 μm; TG40, manufactured by FUJIFILM Corporation) was saponified with an alkaline solution and coated with the following coating solution 1 for forming an alignment layer using a wire bar. The support on which the coating film had been formed was dried with hot air at 60° C. for 60 seconds and further dried with hot air at 100° C. for 120 seconds to Conn an alignment layer, thereby obtaining a TAC film 1 with an alignment layer.

The film thickness of the alignment layer was 0.5 μm.

| (Coating solution 1 for forming alignment layer) | |
|---|---|
| Modified polyvinyl alcohol shown below: | 3.80 parts by mass |

| (Coating solution 1 for forming alignment layer) | |
|---|---|
| Initiator Irg2959: | 0.20 parts by mass |
| Water: | 70 parts by mass |
| Methanol: | 30 parts by mass |

Modified polyvinyl alcohol
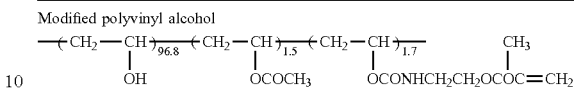

(Formation of Light Absorption Anisotropic Layer P1)

The obtained alignment layer was continuously coated with the following composition P1 for forming a light absorption anisotropic layer with a wire bar to form a coating layer P1.

Next, the coating layer P1 was heated at 120° C. for 30 seconds, and the coating layer P1 was cooled to room temperature (23° C.).

Next, the coating layer was heated at 80° C. for 60 seconds and cooled to room temperature again.

Thereafter, the coating layer was irradiated with an LED lamp (center wavelength of 365 nm) for 2 seconds under an irradiation condition of an illuminance of 200 mW/cm² to prepare a light absorption anisotropic layer P1 on the alignment layer, thereby obtaining an optically anisotropic film 1.

The film thickness of the light absorption anisotropic layer P1 was 2.7 μm, and the degree of alignment at a wavelength of 550 nm was 0.96. The angle between the transmittance central axis of the light absorption anisotropic layer P1 and the normal line of the film (the normal direction with respect to the surface of the light absorption anisotropic layer) was 0°. Further, the transmittance in a case where P polarized light having a wavelength of 550 am was incident in a direction inclined by 30° on a side of the film surface from the transmittance central axis was 20% or less.

| Composition of composition P1 for forming light absorption anisotropic layer | |
|---|---|
| Dichroic substance D-1 shown below: | 0.40 parts by mass |
| Dichroic substance D-2 shown below: | 0.15 parts by mass |
| Dichroic substance D-3 shown below: | 0.63 parts by mass |
| Polymer liquid crystal compound P-1 shown below: | 3.20 parts by mass |
| Low-molecular-weight liquid crystal compound M-1 shown below: | 0.45 parts by mass |
| Polymerization initiator IRGACURE OXE-02 (manufactured by BASF SE): | 0.040 parts by mass |
| Compound E-1 shown below: | 0.060 parts by mass |
| Compound E-2 shown below: | 0.060 parts by mass |
| Surfactant F-1 shown below: | 0.001 parts by mass |
| Surfactant F-2 shown below: | 0.002 parts by mass |
| Cyclopentanone: | 90.00 parts by mass |
| N-methylpyrrolidone: | 3.00 parts by mass |
| 1,3-dimethyl-2-imidazolidinone: | 2.00 parts by mass |

Dichroic substance D-1
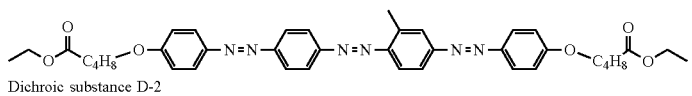

Dichroic substance D-2
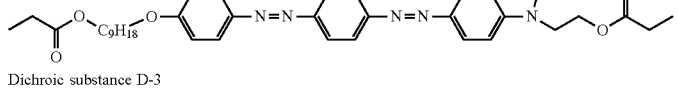

Dichroic substance D-3
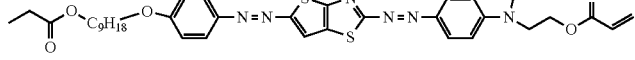

Composition of composition P1 for forming light absorption anisotropic layer

Polymer liquid crystal compound P-1

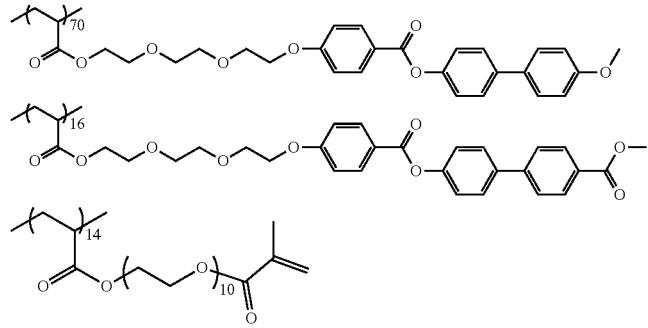

Low-molecular-weight liquid crystal compound M-1

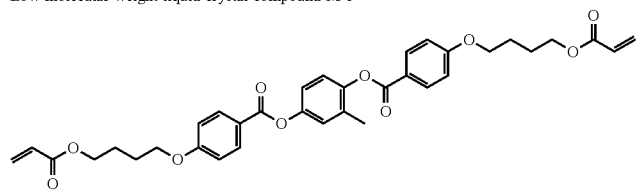

Compound E-1

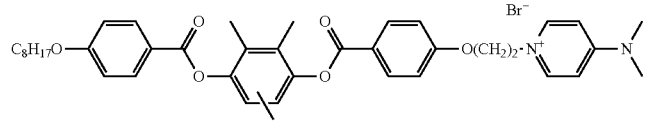

Compound E-2

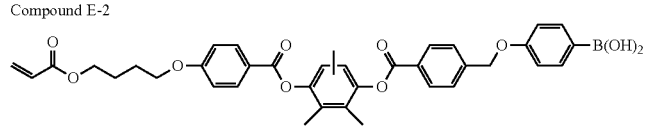

Surfactant F-1

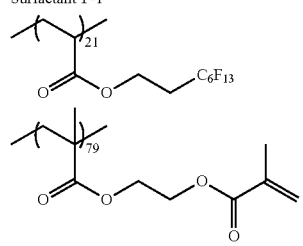

Surfactant F-2

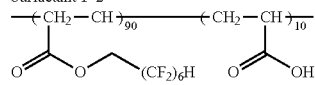

(Preparation of Laminate A1)

A polarizing plate 1 in which the thickness of the polarizer was 8 μm and one surface of the polarizer was exposed was prepared by the same method as that for a polarizing plate 02 with a one-surface protective film described in WO2015/166991A.

The surface of the polarizing plate 1 in which the polarizer was exposed and the surface of the light absorption anisotropic layer P1 of the light absorption anisotropic film 1 prepared above were subjected to a corona treatment, and both surfaces were bonded to each other using the following PVA adhesive 1, thereby preparing a laminate A1. Here, the transmittance central axis of the light absorption anisotropic layer P1 and the normal line of the film surface coincided with each other.

(Preparation of PVA Adhesive 1)

20 parts by mass of methylol melamine with respect to 100 parts by mass of a polyvinyl alcohol based resin containing an acetoacetyl group (average degree of polymerization: 1200, degree of saponification: 98.5% by mole, degree of acetoacetylation: 5% by mole) was dissolved in pure water under a temperature condition of 30° C. to prepare an aqueous solution in which the concentration of solid contents was adjusted to 3.7% by mass.

(Preparation of Liquid Crystal Display Device B1)

A Wi-Fi model iPad Air (registered trademark, the same applies hereinafter, manufactured by APPLE, Etc.) with a capacity of 16 GB, which is an IPS mode liquid crystal display device, was disassembled to take out the liquid crystal cell. The laminate A1 prepared above was bonded to the surface formed by peeling the viewing-side polarizer off from the liquid crystal cell such that the polarizing plate 1 side was the liquid crystal cell side, using the following pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A1 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B1.

(Preparation of Pressure Sensitive Adhesive Sheet 1)

Next, an acrylate-based polymer was prepared according to the following procedures.

95 parts by mass of butyl acrylate and 5 parts by mass of acrylic acid were polymerized by a solution polymerization method in a reaction container equipped with a cooling pipe, a nitrogen introduction pipe, a thermometer, and a stirrer, thereby obtaining an acrylate-based polymer A1 with an average molecular weight of 2000000 and a molecular weight distribution (Mw/Mn) of 3.0.

Next, the obtained acrylate-based polymer A1 (100 parts by mass), coronate L (75% by mass ethyl acetate solution of trimethylolpropane adduct of tolylene isocyanate, number of isocyanate groups in one molecule: 3, manufactured by Nippon Polyurethane Industry Co., Ltd.) (1.0 parts by mass), and a silane coupling agent KBM-403 (manufactured by Shin-Etsu Chemical Co., Ltd.) (0.2 parts by mass) were mixed with each other, and ethyl acetate was finally added to the mixture such that the concentration of the total solid contents reached 10% by mass, thereby preparing a composition for forming a pressure sensitive adhesive. A separate film subjected to a surface treatment with a silicone-based release agent was coated with the composition using a die coater and dried in an environment of 90° C. for 1 minute, thereby obtaining an acrylate-based pressure sensitive adhesive sheet. The film thickness was 25 μm, and the storage elastic modulus was 0.1 MPa.

Examples 2 to 5

(Preparation of Transparent Support 2)

A TAC film 1 with an alignment layer was prepared in the same manner as in Example 1, and the alignment layer was coated with the following composition liquid E1 for forming a photoalignment layer and dried at 60° C. for 2 minutes.

Thereafter, the obtained coating film was irradiated with ultraviolet rays (irradiation amount of 2000 mJ/cm$^2$) in an oblique direction using an ultraviolet exposure device to prepare a photoalignment layer having a thickness of 0.03 μm.

(Preparation of Composition Liquid E1 for Forming Photoalignment Layer)

The composition liquid E1 for forming a photoalignment layer was prepared with the following composition, dissolved for 1 hour while being stirred, and filtered through a filter with a hole diameter of 0.45 μm.

| Composition liquid E1 for forming photoalignment layer | |
|---|---|
| Photoalignment material E-1 shown below: | 0.3 parts by mass |
| 2-Butoxyethanol: | 41.6 parts by mass |
| Dipropylene glycol monomethyl ether: | 41.6 parts by mass |
| Pure water: | 16.5 parts by mass |

Photoalignment material E-1

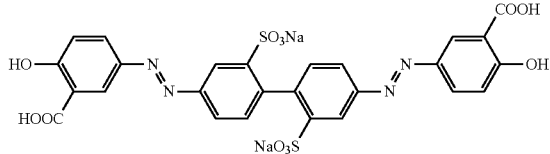

(Formation of Light Absorption Anisotropic Layer P2)

A coating layer P2 was formed by continuously coating the obtained photoalignment layer E1 with the following composition P2 for forming a light absorption anisotropic layer using a wire bar.

Next, the coating layer P2 was heated at 120° C. for 30 seconds, and the coating layer P2 was cooled to room temperature (23° C.), Next, the coating layer was heated at 80° C. for 60 seconds and cooled to room temperature again.

Thereafter, the coating layer was irradiated with an LED lamp (center wavelength of 365 μm) for 2 seconds under an irradiation condition of an illuminance of 200 mW/cm$^2$ to prepare a light absorption anisotropic layer P2 on the alignment layer 1, thereby obtaining an optically anisotropic film 2.

The film thickness of the light absorption anisotropic layer P2 was 2.7 μm. The angle between the transmittance central axis of the light absorption anisotropic layer P2 and the normal line of the film was 15°.

| Composition of composition P2 for forming light absorption anisotropic layer |
|---|
| Dichroic substance D-1 shown above: 0.40 parts by mass |
| Dichroic substance D-2 shown above: 0.15 parts by mass |
| Dichroic substance D-3 shown above: 0.63 parts by mass |
| Polymer liquid crystal compound P-1 shown above: 3.20 parts by mass |
| Low-molecular-weight liquid crystal compound M-1 shown above: 0.45 parts by mass |
| Polymerization initiator |
| IRGACURE OXE-02 (manufactured by BASF SE): 0.040 parts by mass |
| Compound E-1 shown above: 0.060 parts by mass |
| Compound E-2 shown above: 0.060 parts by mass |
| Surfactant F-1 shown above: 0.010 parts by mass |
| Surfactant F-2 shown above: 0.015 parts by mass |
| Cyclopentanone: 90.00 parts by mass |
| Benzyl alcohol: 5.00 parts by mass |

(Preparation of Laminate A2)

The surface of the polarizing plate 1 in which the polarizer was exposed and the surface of the light absorption anisotropic layer of the light absorption anisotropic film 2 prepared above were subjected to a corona treatment, and both surfaces were bonded to each other using the above-described PVA adhesive 1, thereby preparing a laminate A2. Here, the angle between the plane including the transmittance central axis of the light absorption anisotropic layer and the normal line of the film surface (the normal line with respect to the surface of the light absorption anisotropic layer) and the absorption axis of the polarizer in the polarizing plate 1 was 90°.

(Preparation of Laminate A3)

The surface of the polarizing plate 1 in which the polarizer was exposed and the surface of the light absorption anisotropic layer of the light absorption anisotropic film 2 prepared above were subjected to a corona treatment, and both surfaces were bonded to each other using the above-described PVA adhesive 1, thereby preparing a laminate A3. Here, the angle between the plane including the transmittance central axis of the light absorption anisotropic layer and the normal line of the film surface and the absorption axis of the polarizer in the polarizing plate 1 was 64°.

(Preparation of Liquid Crystal Display Device B2 of Example 2)

A Wi-Fi model iPad Air (manufactured by APPLE, Inc.) with a capacity of 16 GB, which is an IPS mode liquid crystal display device, was disassembled to take out the liquid crystal cell. The laminate A2 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A1 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B2.

(Preparation of Liquid Crystal Display Device B3 of Example 3)

A model iPad Air (manufactured by APPLE, Inc.) with a capacity of 16 GB, which is an IPS mode liquid crystal display device, was disassembled to take out the liquid crystal cell. The laminate A3 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A1 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B3.

(Preparation of Liquid Crystal Display Device B4 of Example 4)

A model iPad Air (manufactured by APPLE, Inc.) with a capacity of 16 GB, which is an IPS mode liquid crystal display device, was disassembled to take out the liquid crystal cell. The laminate A1 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A2 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B4.

(Preparation of Liquid Crystal Display Device B5 of Example 5)

A model iPad Air (manufactured by APPLE, Inc.) with a capacity of 16 GB, which is an IPS mode liquid crystal display device, was disassembled to take out the liquid crystal cell. The laminate A2 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A2 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B5.

Examples 6 and 7

(Preparation of Light Absorption Anisotropic Layer P3)

A light absorption anisotropic film 3 including a light absorption anisotropic layer P3 was prepared according to the same preparation procedures as those for the light absorption anisotropic film 1 of Example 1 except that only the film thickness of the light absorption anisotropic layer P1 was changed to 2.0 μm from 2.7 μm.

The degree of alignment of the light absorption anisotropic layer P3 at a wavelength of 550 am was 0.96. The angle between the transmittance central axis of the light absorption anisotropic layer P3 and the normal line of the film was 0°.

Further, the transmittance in a case where P polarized light having a wavelength of 550 nm was incident in a direction inclined by 30° on the side of the film surface from the transmittance central axis was 20% or less.
(Formation of Light Absorption Anisotropic Layer P4)

A light absorption anisotropic film 4 including a light absorption anisotropic layer P4 was prepared according to the same preparation procedures as those for the light absorption anisotropic film 1 of Example 1 except that only the film thickness of the light absorption anisotropic layer P1 was changed to 1.5 μm from 2.7 μm.

The degree of alignment of the light absorption anisotropic layer P4 at a wavelength of 550 nm was 0.96. The angle between the transmittance central axis of the light absorption anisotropic layer P4 and the normal line of the film was 0°. Further, the transmittance in a case where P polarized light having a wavelength of 550 am was incident in a direction inclined by 30° in the normal direction from the transmittance central axis was greater than 20% and 30% or less.
(Preparation of Laminate A4)

The surface of the polarizing plate 1 in which the polarizer was exposed and the surface of the light absorption anisotropic layer of the light absorption anisotropic film 3 prepared above were subjected to a corona treatment, and both surfaces were bonded to each other using the above-described PVA adhesive 1, thereby preparing a laminate A4. Here, the transmittance central axis of the light absorption anisotropic layer and the normal line of the film surface coincided with each other.
(Preparation of Laminate A5)

The surface of the polarizing plate 1 in which the polarizer was exposed and the surface of the light absorption anisotropic layer of the light absorption anisotropic film 4 prepared above were subjected to a corona treatment, and both surfaces were bonded to each other using the above-described PVA adhesive 1, thereby preparing a laminate A5. Here, the transmittance central axis of the light absorption anisotropic layer and the normal line of the film surface coincided with each ether.
(Preparation of Liquid Crystal Display Device B6 of Example 6)

A Wi-Fi model iPad Air (manufactured by APPLE, Inc.) with a capacity of 16 GB, which is an IPS mode liquid crystal display device, was disassembled to take out the liquid crystal cell. The laminate A4 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A4 prepared above was bonded to the surface formed by Peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B6.
(Preparation of Liquid Crystal Display Device B7 of Example 7)

A Wi-Fi model iPad Air (manufactured by APPLE, Inc.) with a capacity of 16 GB, which is an IPS mode liquid crystal display device, was disassembled to take out the liquid crystal cell. The laminate A5 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A5 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B7.

Example 8

(Preparation of Light Absorption anisotropic Layer P5)

A light absorption anisotropic film 5 including a light absorption anisotropic layer P5 was prepared according to the same preparation procedures as those for the light absorption anisotropic film 1 of Example 1 except that only the composition P1 for forming a light absorption anisotropic layer was changed to the following composition P5 for forming a light absorption anisotropic layer.

The film thickness of the light absorption anisotropic layer P5 was 2.2 μm, and the degree of alignment at a wavelength of 550 nm was 0.91. The angle between the transmittance central axis of the light absorption anisotropic layer P5 and the normal line of the film was 0°.

| Composition of composition P5 for forming light absorption anisotropic layer | |
|---|---|
| Dichroic substance D-5 shown below: | 8.71 parts by mass |
| Dichroic substance D-6 shown below: | 10.59 parts by mass |
| Polymer liquid crystal compound P-3 shown below: | 44.13 parts by mass |
| Polymerization initiator | |
| IRGACURE OXE-02 (manufactured by BASF SE): | 0.040 parts by mass |
| Compound E-1 shown above: | 0.800 parts by mass |
| Compound E-2 shown above: | 0.800 parts by mass |
| Surfactant F-2 shown above: | 0.960 parts by mass |
| Cyclopentanone: | 793.90 parts by mass |
| Tetrahydrofuran: | 140.10 parts by mass |

Dichroic substance D-5

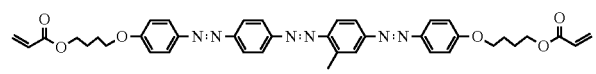 [SMILES: C=CC(=O)OCCCCOc1ccc(N=Nc2ccc(N=Nc3ccc(N=Nc4ccc(OCCCCOC(=O)C=C)cc4)cc3C)cc2)cc1]

Dichroic substance D-6

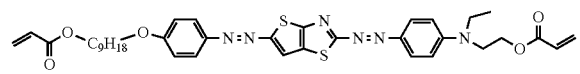

Polymer liquid crystal compound P-3

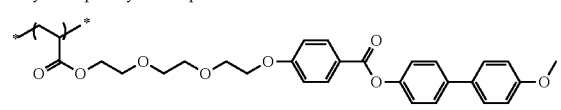

(Preparation of Laminate A6)

The surface of the polarizing plate 1 in which the polarizer was exposed and the surface of the light absorption anisotropic layer of the light absorption anisotropic film 5 prepared above were subjected to a corona treatment, and both surfaces were bonded to each other using the above-described PVA adhesive 1, thereby preparing a laminate A6. Here, the transmittance central axis of the light absorption anisotropic layer and the normal line of the film surface coincided with each other.

(Preparation of Liquid Crystal Display Device B8 of Example 8)

A Wi-Fi model iPad Air (manufactured by APPLE, Inc.) with a capacity of 16 GB, which is an IPS mode liquid crystal display device, was disassembled to take out the liquid crystal cell. The laminate A6 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A6 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B8.

Example 9

<Formation of Light Absorption Anisotropic Layer P6>

A light absorption anisotropic film 6 including a light absorption anisotropic layer P6 was prepared according to the same preparation procedures as those for the light absorption anisotropic film 1 of Example 1 except that the composition P1 for forming a light absorption anisotropic layer was changed to the following composition P6 for forming a light absorption anisotropic layer and the film thickness thereof was changed to 4.0 μm from 2.7 μm.

The angle between the transmittance central axis of the light absorption anisotropic layer P6 and the normal line of the film was 0°.

| Composition of composition P6 for forming light absorption anisotropic layer | |
|---|---|
| Dichroic substance D-1 shown above: | 0.14 parts by mass |
| Dichroic substance D-2 shown above: | 0.05 parts by mass |
| Dichroic substance D-3 shown above: | 0.22 parts by mass |
| Low-molecular-weight liquid crystal compound M-2 shown below: | 3.31 parts by mass |
| Low-molecular-weight liquid crystal compound M-3 shown below: | 1.10 parts by mass |
| Polymerization initiator | |
| IRGACURE OXE-02 (manufactured by BASF SE): | 0.040 parts by mass |
| Compound E-1 shown above: | 0.060 parts by mass |
| Compound E-2 shown above: | 0.060 pails by mass |
| Surfactant F-1 shown above: | 0.010 parts by mass |
| Surfactant F-2 shown above: | 0.015 parts by mass |
| Cyclopentanone: | 90.00 parts by mass |
| Benzyl alcohol: | 5.00 parts by mass |

Low-molecular-weight liquid crystal compound M-2

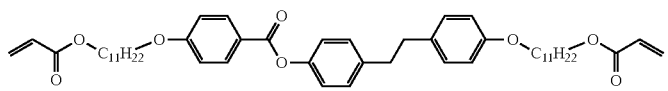

Low-molecular-weight liquid crystal, compound M-3

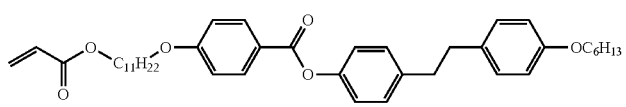

(Preparation of Laminate A7)

The surface of the polarizing plate 1 in which the polarizer was exposed and the surface of the light absorption anisotropic layer of the light absorption anisotropic film 6 prepared above were subjected to a corona treatment, and both surfaces were bonded to each other using the above-described PVA adhesive 1, thereby preparing a laminate A7. Here, the transmittance central axis of the light absorption anisotropic layer and the normal line of the film surface coincided with each other.

(Preparation of liquid crystal display device B9 of Example 9)

A Wi-Fi model iPad Air (manufactured by APPLE, Inc.) with a capacity of 16 GB, which is an IPS mode liquid crystal display device, was disassembled to take out the liquid crystal cell. The laminate A7 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A7 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B9.

Example 10

<Formation of Light Absorption Anisotropic Layer P7>

A light absorption anisotropic film 7 including a light absorption anisotropic layer P7 was prepared according to the same preparation procedures as those for the light absorption anisotropic film 1 of Example 1 except that the composition P1 for forming a light absorption anisotropic layer was changed to the following composition P7 for forming a light absorption anisotropic layer and the film thickness thereof was changed to 4.0 μm from 2.7 μm.

The angle between the transmittance central axis of the light absorption anisotropic layer P7 and the normal line of the film was 0°.

(Preparation of Liquid Crystal Display Device B10 of Example 10)

A Wi-Fi model iPad Air (manufactured by APPLE, Inc) with a capacity of 16 GB, which is an IPS mode liquid crystal display device, was disassembled to take out the liquid crystal cell. The laminate A8 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A8 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B10.

Example 11

(Formation of Light Absorption Anisotropic Layer P8)

A light absorption anisotropic film 8 including a light absorption anisotropic layer P8 was prepared according to

| Composition of composition P7 for forming light absorption anisotropic layer | |
|---|---|
| Dichroic substance D-1 shown above: | 0.14 parts by mass |
| Dichroic substance D-2 shown above: | 0.05 parts by mass |
| Dichroic substance D-3 shown above: | 0.22 parts by mass |
| Low-molecular-weight liquid crystal compound M-4 shown below: | 3.31 parts by mass |
| Low-molecular-weight liquid crystal compound M-5 shown below: | 1.10 parts by mass |
| Polymerization initiator IRGACURE OXE-02 (manufactured by BASF SE): | 0.040 parts by mass |
| Compound E-1 shown above: | 0.060 parts by mass |
| Compound E-2 shown above: | 0.060 parts by mass |
| Surfactant F-1 shown above: | 0.010 parts by mass |
| Surfactant F-2 shown above: | 0.015 parts by mass |
| Cyclopentanone: | 90.00 parts by mass |
| Benzyl alcohol: | 5.00 parts by mass |

Low-molecular-weight liquid crystal compound M-4

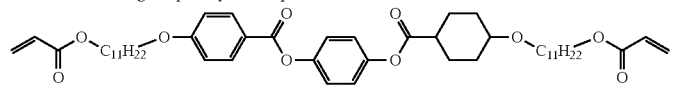

Low-molecular-weight liquid crystal compound M-5

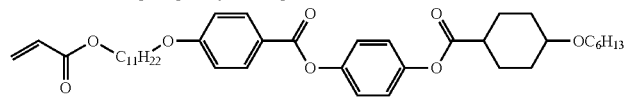

(Preparation of Laminate A8)

The surface of the polarizing plate 1 in which the polarizer was exposed and the surface of the light absorption anisotropic layer of the light absorption anisotropic film 7 prepared above were subjected to a corona treatment, and both surfaces were bonded to each other using the above-described PVA adhesive 1, thereby preparing a laminate A8. Here, the transmittance central axis of the light absorption anisotropic layer and the normal line of the film surface coincided with each other.

the same preparation procedures as those for the light absorption anisotropic film 1 of Example 1 except that only the film thickness of the light absorption anisotropic layer P1 was changed to 1.0 μm from 2.7 μm.

The degree of alignment of the light absorption anisotropic layer P8 at a wavelength of 550 nm was 0.96. The angle between the transmittance central axis of the light absorption anisotropic layer P8 and the normal line of the film was 0°. Further, the transmittance in a case where P polarized light having a wavelength of 550 nm was incident in a direction inclined by 30° on the side of the film surface from the transmittance central axis was greater than 30% and 40% or less.

(Preparation of Laminate A9)

The surface of the polarizing plate 1 in which the polarizer was exposed and the surface of the light absorption anisotropic layer of the light absorption anisotropic film 8 prepared above were subjected to a corona treatment, and both surfaces were bonded to each other using the above-described PVA adhesive 1, thereby preparing a laminate A9. Here, the transmittance central axis of the light absorption anisotropic layer and the normal line of the film surface coincided with each other.

(Preparation of Liquid Crystal Display Device B11 of Example 11)

A Wi-Fi model iPad Air (manufactured by APPLE, Inc.) with a capacity of 16 GB, which is an IPS mode liquid crystal display device, was disassembled to take out the liquid crystal cell. The laminate A9 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. Further, the laminate A9 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B11.

Example 12

(Formation of Light Absorption Anisotropic Layer P9)

A light absorption anisotropic film 9 including a light absorption anisotropic layer P9 was prepared according to the same preparation procedures as those for the light absorption anisotropic film 1 of Example 1 except that the composition P1 for forming a light absorption anisotropic layer was changed to the following composition P9 for forming a light absorption anisotropic layer.

The film thickness of the light absorption anisotropic layer P9 was 3.5 μm, and the degree of alignment at a wavelength of 550 nm was 0.96. The angle between the transmittance central axis of the light absorption anisotropic layer P9 and the normal line of the film was 0°.

| Composition of composition P9 for forming light absorption anisotropic layer | |
|---|---|
| Dichroic substance D-1 shown above: | 5.30 parts by mass |
| Dichroic substance D-2 shown above: | 1.30 parts by mass |
| Dichroic substance D-3 shown above: | 8.60 parts by mass |
| Polymer liquid crystal compound P-4 shown below: | 50.00 parts by mass |
| Low-molecular-weight liquid crystal compound M-1 shown above: | 30.90 parts by mass |
| Polymerization initiator | |
| IRGACURE OXE-02 (manufactured by BASF SE): | 1.50 parts by mass |
| Compound E-1 shown above: | 1.20 parts by mass |
| Compound E-2 shown above: | 1.20 parts by mass |
| Surfactant F-2 shown above: | 0.03 parts by mass |
| Cyclopentanone: | 800.00 parts by mass |
| Benzyl alcohol: | 100.00 parts by mass |

Polymer liquid crystal compound P-4

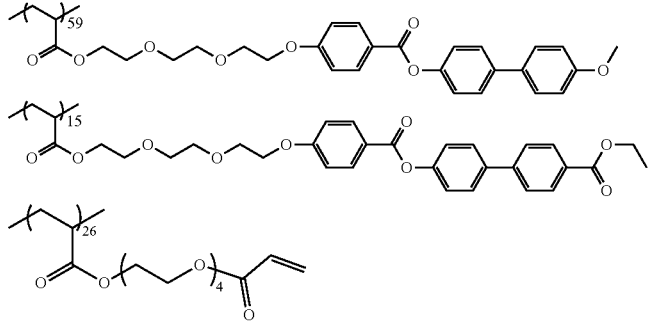

(Preparation of Laminate A10)

The surface of the polarizing plate 1 in which the polarizer was exposed and the surface of the light absorption anisotropic layer of the light absorption anisotropic film 9 prepared above were subjected to a corona treatment, and both surfaces were bonded to each other using the above-described PVA adhesive 1, thereby preparing a laminate A10. Here, the transmittance central axis of the light absorption anisotropic layer and the normal line of the film surface coincided with each other.

(Preparation of Liquid Crystal Display Device B12 of Example 12)

A Wi-Fi model iPad Air (manufactured by APPLE, Inc.) with a capacity of 16 GB, which is an IPS mode liquid crystal display device, was disassembled to take out the liquid crystal cell. The laminate A10 prepared above was bonded to the surface formed by peeling the viewing-side polarizer off from the liquid crystal cell such that the polarizing plate 1 side was the liquid crystal cell side, using the above-described pressure sensitive adhesive sheet 1, Here, the laminate was bonded to the surface such that the direction of the absorption axis of the polarizer in the polarizing plate 1 was set as the longitudinal direction of the liquid crystal screen. Further, the laminate A10 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B12.

Comparative Examples 1 and 2

(Preparation of Liquid Crystal Display Device B13 of Comparative Example 1)

A Wi-Fi model iPad Air (manufactured by APPLE, Inc.) with a capacity of 16 GB, which is an IPS mode liquid crystal display device, was disassembled to take out the liquid crystal cell. The laminate A1 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the direction of the absorption axis of the polarizer in the polarizing plate 1 was set as the longitudinal direction of the liquid crystal screen. The device was reassembled after the bonding to the liquid crystal cell to prepare a liquid crystal display device B13.

(Preparation of Liquid Crystal Display Device B14 of Comparative Example 2)

A Wi-Fi model iPad Air (manufactured by APPLE, Inc.) with a capacity of 16 GB, which is an IPS mode liquid crystal display device, was disassembled to take out the liquid crystal cell. The laminate A1 prepared above was bonded to the surface formed by peeling the non-viewing-side polarizer off from the liquid crystal cell such that the polarizing plate 1 side was the liquid crystal cell side, using the above-described pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B14.

<Performance Evaluation>

(1) Evaluation of upper and lower CR and left and right CR

The brightness at a polar angle of 0° (front direction) to 65° and an azimuthal angle of 0° (rightward toward the front surface) to 360° of a white display screen of each of the liquid crystal display devices B1 to B14 prepared above was measured using a measuring device (EZ-Contrast XL88, manufactured by ELDIM). A brightness Y0 obtained by setting a direction in which the brightness was maximized as the center of the viewing angle, a brightness Y (U30) obtained by deviating the direction by 30° upward from the center of the viewing angle, and a brightness Y (R30) obtained by deviating the direction by 30° rightward from the center of the viewing angle were defined, and the following equations were calculated.

Upper and lower CR=Y0/Y (U30)

Left and right CR=Y0/Y (R30)

Further, the evaluations of the upper and lower CR and the left and right CR are listed in Table 1 as follows.

AA: CR was 5 or greater
A: CR was 3.5 or greater and less than 5
B: CR was 2.5 or greater and less than 3.5
C: CR was 1.5 or greater and less than 2.5
D: CR was less than 1.5

In Table 1, the columns of "θ1" denote the angle θ1 between the transmittance central axis of the first light absorption anisotropic layer and the normal line of the film (the normal direction with respect to the surface of the first light absorption anisotropic layer).

The columns of "φ1" denote the angle φ1 between the plane including the transmittance central axis of the first light absorption anisotropic layer and the normal line of the film surface and the absorption axis of the first polarizer.

The columns of "φ2" denote the angle φ2 between the transmittance central axis of the second light absorption anisotropic layer and the normal line of the film (the normal direction with respect to the surface of the second light absorption anisotropic layer).

The columns of "φ2" denote the angle φ2 between the plane including the transmittance central axis of the second light absorption anisotropic layer and the normal line of the film surface and the absorption axis of the second polarizer.

The columns of "Coating amount of coloring agent (g/m$^2$)" denote the content (g/m$^2$) of the organic dichroic coloring agent in the light absorption anisotropic layer per unit area.

Further, "center of viewing angle" listed in the columns for remarks denotes the direction with the highest transmittance.

TABLE 1

| | First light absorption anisotropic layer | | | | Second light absorption anisotropic layer | | | | Evaluation | | |
|---|---|---|---|---|---|---|---|---|---|---|---|
| | Type | θ1 | φ1 | Coating amount of coloring agent (g/m$^2$) | Type | θ2 | φ2 | Coating amount of coloring agent (g/m$^2$) | Upper and lower CR | Left and right CR | Remarks |
| Example 1 | P1 | 0° | — | 0.64 | P1 | 0° | — | 0.64 | AA | AA | Center of viewing angle was front surface |
| Example 2 | P2 | 15° | 90° | 0.64 | P1 | 0° | — | 0.64 | AA | AA | Center of viewing angle was deviated by 15° upward |
| Example 3 | P2 | 15° | 64° | 0.64 | P1 | 0° | — | 0.64 | A | AA | Center of viewing angle was deviated by 13° upward |

TABLE 1-continued

| | First light absorption anisotropic layer | | | Second light absorption anisotropic layer | | | Evaluation | | | |
|---|---|---|---|---|---|---|---|---|---|---|
| | Type | θ1 | φ1 | Coating amount of coloring agent (g/m²) | Type | θ2 | φ2 | Coating amount of coloring agent (g/m²) | Upper and lower CR | Left and right CR | Remarks |
| Example 4 | P1 | 0° | — | 0.64 | P2 | 15° | 90° | 0.64 | AA | AA | Center of viewing angle was deviated by 15° rightward |
| Example 5 | P2 | 15° | 90° | 0.64 | P2 | 15° | 90° | 0.64 | AA | AA | Center of viewing angle was deviated by 20° from angle of 45° in obliquely upper right direction |
| Example 6 | P3 | 0° | — | 0.47 | P3 | 0° | — | 047 | A | A | Center of viewing angle was front surface |
| Example 7 | P4 | 0° | — | 0.35 | P4 | 0° | — | 0.35 | B | B | Center of viewing angle was front surface |
| Example 8 | P5 | 0° | — | 0.64 | P5 | 0° | — | 0.64 | A | A | Center of viewing angle was front surface |
| Example 9 | P6 | 0° | — | 0.33 | P6 | 0° | — | 0.33 | B | B | Center of viewing angle was front surface |
| Example 10 | P7 | 0° | — | 0.33 | P7 | 0° | — | 0.33 | B | B | Center of viewing angle was front surface |
| Example 11 | P8 | 0° | — | 0.24 | P8 | 0° | — | 0.24 | C | C | Center of viewing angle was front surface |
| Example 12 | P9 | 0° | — | 0.53 | P9 | 0° | — | 0.53 | AA | AA | Center of viewing angle was front surface |
| Comparative Example 1 | P1 | 0° | — | 0.64 | None | | | | AA | D | — |
| Comparative Example 2 | None | | | | P1 | 0° | — | 0.64 | D | AA | — |

As listed in Table 1, it was confirmed that the liquid crystal display device of the present invention exhibits desired effects.

Based on the comparison between Example 11 and other examples, it was confirmed that more excellent effects were obtained in a ease where the content of the dichroic substance in the light absorption anisotropic layer per unit area was 0.30 g/m² or greater.

Based on the comparison between Examples 6, 7, and 9 to 10, it was confirmed that more excellent effects were obtained in a case where the content of the dichroic substance in the light absorption anisotropic layer per unit area was 0.40 g/m² or greater.

Based on the comparison between Examples 1 and 8, it was confirmed that more excellent effects were obtained in a case where the degree of alignment at a wavelength of 550 nm was 0.95 or greater.

Based on the comparison between Examples 2 and 3, it was confirmed that more excellent effects were obtained in a case where the angle φ1 between the plane including the transmittance central axis of the light absorption anisotropic layer and the normal line of the film surface and the absorption axis of the polarizer was in a range of 80° to 90°.

Example 13

A light absorption anisotropic layer having a pattern of the region A and the region B was prepared as follows.
(Formation of Patterned Light Absorption anisotropic Layer)
A TAC film 1 with an alignment layer was prepared in the same manner as in Example 2, and the alignment layer was coated with the above-described composition liquid E1 for forming a photoalignment layer and dried at 60° C. for 2 minutes. Thereafter, the obtained coating film was irradiated with ultraviolet rays (irradiation amount of 2000 mJ/cm²) via a mask in a left oblique direction using an ultraviolet exposure device. Further, the mask was deviated by one pattern and irradiated with ultraviolet rays (irradiation amount of 2000 mJ/cm²) in a right oblique direction using an ultraviolet exposure device, thereby preparing a patterned photoalignment layer EP1 having a thickness of 0.03 μm. Further, a mask pattern having a rectangular light transmitting portion as the region A and a rectangular light shielding portion as the region B and formed by alternately arranging the regions A and the regions B was used for the mask to respond to the liquid crystal pixel size of the iPad Air Wi-Fi model 16 GB (manufactured by APPLE Inc.).

As a result of coating the photoalignment layer EP1 with the composition P2 for forming a light absorption anisotropic layer in the same manner as in Example 2 and performing heat aging and IJV curing, a patterned light absorption anisotropic film 10 including a light absorption anisotropic layer P10 in which the region A and the region B with transmittance central axes in different directions were patterned at the liquid crystal pixel size was able to be prepared.
(Preparation of Laminate A11)
The surface of the polarizing plate 1 in which the polarizer was exposed and the surface of the light absorption anisotropic layer of the patterned light absorption anisotropic film 10 prepared above were subjected to a corona treatment, and both surfaces were bonded to each other using the above-described PVA adhesive 1, thereby preparing a laminate A11. Here, the angle between the plane including the transmittance central axis of the light absorption anisotropic layer and the normal line of the film surface and the absorption axis of the polarizer in the polarizing plate 1 was 90°.

(Preparation of Liquid Crystal Display Device B15 of Example 13)

A model iPad Air (manufactured by APPLE, Inc.) with a capacity of 16 GB, which is an IPS mode liquid crystal display device, was disassembled to take out the liquid crystal cell. The laminate A11 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the pattern of the region A and the region B of the patterned light absorption anisotropic film P10 coincided with the pixel pattern of the liquid crystal cell and the direction of the absorption axis of the polarizer in the polarizing plate 1 was set as the longitudinal direction of the liquid crystal screen. Further, the laminate A1 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B15.

An image a for displaying an image only on the pixels overlapping the region A and an image β for displaying an image only on the pixels overlapping the region B were prepared for the liquid crystal display device B15 prepared above. In a case where the image a was displayed, the visibility was the highest as viewed from the left side just beside the liquid crystal display device B15, and the image was darkened as viewed from the right side just beside the liquid crystal display device B15, and thus the image was not able to be recognized in a case where the image β was displayed, the visibility was the highest as viewed from the right side just beside the liquid crystal display device, and the image was darkened as viewed from the left side just beside the liquid crystal display device, and thus the image was not able to be recognized. Therefore, it was confirmed that a liquid crystal display device capable of switching the direction of the center of the visual field was able to be prepared by using the patterned light absorption anisotropic film P10.

Example 14

A light absorption anisotropic layer having a pattern of the region C and the region D was prepared as follows.
(Formation of Patterned Light Absorption anisotropic Layer)

A TAC film 1 with an alignment layer was prepared in the same manner as in Example 1, and the alignment layer was coated with the above-described composition P2 far forming a light absorption anisotropic layer using a wire bar, thereby forming a coating layer P2.

Next, the coating layer P2 was heated at 120° C. for 30 seconds, and the coating layer P2 was cooled to room temperature (23° C.).

Next, the coating layer was heated at 80° C. for 60 seconds and cooled to room temperature again.

Thereafter, the obtained coating layer was irradiated with light emitted by a high-pressure mercury lamp under an irradiation condition of an illuminance of 2.8 mW/cm$^2$ for 60 seconds via a mask, thereby preparing a light absorption anisotropic layer having a cured region and an uncured region of a liquid crystal compound in the plane of the alignment layer. Further, a mask pattern having a rectangular light transmitting portion as the region C and a rectangular light shielding portion as the region D and formed by alternately arranging the regions C and the regions D was used for the mask to respond to the liquid crystal pixel size of the iPad Air Wi-Fi model 16 GB (manufactured by APPLE Inc.).

A film provided with a polarizing layer having a cured region (region C) and an uncured region (region D) of the liquid crystal compound in the prepared plane was immersed in ethanol for 3 minutes and the non-polymerized liquid crystal compound was washed and removed to form a patterned light absorption anisotropic film P11 provided with a patterned light absorption anisotropic layer having the region C and the region D with different transmittances in a direction inclined by 30° on the side of the film surface from the transmittance central axis in the plane. In the region C, the transmittance of P polarized light having a wavelength of 550 nm in a direction inclined by 30° on the side of the film surface from the transmittance central axis corresponding to the normal direction was 30% or less, and the front transmittance was 75% or greater hr the region D, both the transmittance and the front transmittance of P polarized light having a wavelength of 550 nm in a direction inclined by 30° on the side of the film surface from the transmittance central axis corresponding to the normal direction were 80% or greater.
(Preparation of Laminate A12)

The surface of the polarizing plate 1 in which the polarizer was exposed and the surface of the light absorption anisotropic layer of the patterned light absorption anisotropic film P11 prepared above were subjected to a corona treatment, and both surfaces were bonded to each other using the above-described PVA adhesive 1, thereby preparing a laminate A12. Here, the transmittance central axis of the region C of the light absorption anisotropic layer coincided with the normal line of the film surface, and the angle between the transmittance central axis and the absorption axis of the polarizer in the polarizing plate 1 was 90°.
(Preparation of Liquid Crystal Display Device B16 of Example 14)

A Wi-Fi model iPad Air (manufactured by APPLE, Inc.) with a capacity of 16 GB, which is an IPS mode liquid crystal display device, was disassembled to take out the liquid crystal cell. The laminate A12 prepared above was bonded to the surface formed by peeling the viewing-side polarizer off from the liquid crystal cell such that the polarizing plate 1 side was the liquid crystal cell side, using the above-described pressure sensitive adhesive sheet 1. Here, the laminate was bonded to the surface such that the pattern of the region C and the region D of the patterned light absorption anisotropic film P11 coincided with the pixel pattern of the liquid crystal cell and the direction of the absorption axis of the polarizer in the polarizing plate 1 was set as the longitudinal direction of the liquid crystal screen. Further, the laminate A1 prepared above was bonded to the surface formed by peeling the non-viewing-side polarizer off from the liquid crystal cell such that the polarizing plate 1 side was the liquid crystal cell side, using the following pressure sensitive adhesive sheet 1. Here, the laminate was bonded to the surface such that the direction of the transmission axis of the polarizer in the polarizing plate 1 was set as the longitudinal direction of the liquid crystal screen. The device was reassembled after the bonding to the liquid crystal cell to prepare a liquid crystal display device B16.

An image α for displaying an image only on the pixels overlapping the region C and an image β for displaying an image only on the pixels overlapping the region D were prepared for the liquid crystal display device B16 prepared above. In a case where the image α was displayed, the visibility was the highest as viewed from the front side of the liquid crystal display device B16, and the image was darkened as viewed at an angle of 30° in the lateral direction just beside the liquid crystal display device B16, and thus the image was not able to be recognized. Further, in a case where the image β was displayed, the visibility was high even as viewed at an angle of 30° in the lateral direction just beside the liquid crystal display device or from the front side of the liquid crystal display device, and thus the image was able to be recognized. Therefore, it was confirmed that a liquid crystal display device capable of switching the range of the viewing angle was able to be prepared by using the patterned light absorption anisotropic film 11.

EXPLANATION OF REFERENCES

1: first light absorption anisotropic layer
2: viewing-side polarizer
3: liquid crystal cell
4: non-viewing-side polarizer
5: second light absorption anisotropic layer
100: liquid crystal display device

What is claimed is:
1. A liquid crystal display device comprising:
a first polarizer;
a liquid crystal cell; and
a second polarizer in this order from a viewing side,
wherein a first light absorption anisotropic layer is disposed on the viewing side of the liquid crystal cell,
a second light absorption anisotropic layer is disposed on a non-viewing side of the liquid crystal cell,
the first polarizer and the second polarizer each have an absorption axis in a film surface,
the absorption axis of the first polarizer is orthogonal to the absorption axis of the second polarizer,
an angle $θ1$ between a transmittance central axis of the first light absorption anisotropic layer and a normal line of the film is in a range of 0° to 45°, and
an angle $θ2$ between a transmittance central axis of the second light absorption anisotropic layer and a normal line of the film is in a range of 0° to 45°.
2. The liquid crystal display device according to claim 1, wherein at least one of the angle $θ1$ or the angle $θ2$ is not 0°,
an angle $φ1$ between a plane including the transmittance central axis of the first light absorption anisotropic layer and the normal line of the film surface and the absorption axis of the first polarizer is in a range of 80° to 90°, and
an angle $φ2$ between a plane including the transmittance central axis of the second light absorption anisotropic layer and the normal line of the film surface and the absorption axis of the second polarizer is in a range of 80° to 90°.
3. The liquid crystal display device according to claim 1, wherein the first light absorption anisotropic layer and the second light absorption anisotropic layer contain an organic dichroic coloring agent.
4. The liquid crystal display device according to claim 1, wherein the first light absorption anisotropic layer and the second light absorption anisotropic layer are formed of a composition containing an organic dichroic coloring agent and a polymerizable liquid crystal compound.
5. The liquid crystal display device according to claim 4, wherein a content of the organic dichroic coloring agent per unit area in the first light absorption anisotropic layer and the second light absorption anisotropic layer is 0.30 $g/m^2$ or greater.
6. The liquid crystal display device according to claim 3, wherein a degree of alignment of the first light absorption anisotropic layer and the second light absorption isotropic layer at a wavelength of 550 nm is 0.90 or greater.
7. The liquid crystal display device according to claim 1, wherein at least one of the first light absorption anisotropic layer or the second light absorption anisotropic layer has a region A and a region B with transmittance central axes different from each other.
8. The liquid crystal display device according to claim 1, wherein at least one of the first light absorption anisotropic layer or the second light absorption anisotropic layer has a region C and a region D, and
a transmittance at a wavelength of 550 nm in a direction inclined by 30° on a side of a film surface from a transmittance central axis of the region C in a plane including the transmittance central axis of the region C and a normal line of the film surface is different from a transmittance at a wavelength of 550 nm in a direction inclined by 30° on the side of the film surface from a transmittance central axis of the region D in a plane including the transmittance central axis of the region D and the normal line of the film surface.
9. The liquid crystal display device according to claim 2, wherein the first light absorption anisotropic layer and the second light absorption anisotropic layer contain an organic dichroic coloring agent.
10. The liquid crystal display device according to claim 2, wherein the first light absorption anisotropic layer and the second light absorption anisotropic layer are formed of a composition containing an organic dichroic coloring agent and a polymerizable liquid crystal compound.
11. The liquid crystal display device according to claim 10, wherein a content of the organic dichroic coloring agent per unit area in the first light absorption anisotropic layer and the second light absorption anisotropic layer is 0.30 $g/m^2$ or greater.
12. The liquid crystal display device according to claim 4, wherein a degree of alignment of the first light absorption anisotropic layer and the second light absorption anisotropic layer at a wavelength of 550 nm is 0.90 or greater.
13. The liquid crystal display device according to claim 2, wherein at least one of the first light absorption anisotropic layer or the second light absorption anisotropic layer has a region A and a region B with transmittance central axes different from each other.
14. The liquid crystal display device according to claim 2, wherein at least one of the first light absorption anisotropic layer or the second light absorption anisotropic layer has a region C and a region D, and
a transmittance at a wavelength of 550 nm in a direction inclined by 30° on a side of a film surface from a transmittance central axis of the region C in a plane including the transmittance central axis of the region C and a normal line of the film surface is different from a transmittance at a wavelength of 550 nm in a direction inclined by 30° on the side of the film surface from a transmittance central axis of the region D in a plane including the transmittance central axis of the region D and the normal line of the film surface.

15. The liquid crystal display device according to claim 3, wherein the first light absorption anisotropic layer and the second light absorption anisotropic layer are formed of a composition containing an organic dichroic coloring agent and a polymerizable liquid crystal compound.

16. The liquid crystal display device according to claim 15, wherein a content of the organic dichroic coloring agent per unit area in the first light absorption anisotropic layer and the second light absorption anisotropic layer is 0.30 g/m$^2$ or greater.

17. The liquid crystal display device according to claim 5, wherein a degree of alignment of the first light absorption anisotropic layer and the second light absorption anisotropic layer at a wavelength of 550 nm is 0.90 or greater.

18. The liquid crystal display device according to claim 3, wherein at least one of the first light absorption anisotropic layer or the second light absorption anisotropic layer has a region A and a region B with transmittance central axes different from each other.

19. The liquid crystal display device according to claim 3, wherein at least one of the first light absorption anisotropic layer or the second light absorption anisotropic layer has a region C and a region D, and
a transmittance at a wavelength of 550 nm in a direction inclined by 30° on a side of a film surface from a transmittance central axis of the region C in a plane including the transmittance central axis of the region C and a normal line of the film surface is different from a transmittance at a wavelength of 550 nm in a direction inclined by 30° on the side of the film surface from a transmittance central axis of the region D in a plane including the transmittance central axis of the region D and the normal line of the film surface.

20. The liquid crystal display device according to claim 4, wherein at least one of the first light absorption anisotropic layer or the second light absorption anisotropic layer has a region A and a region B with transmittance central axes different from each other.

* * * * *